US010375321B2

(12) United States Patent
Yoon et al.

(10) Patent No.: US 10,375,321 B2
(45) Date of Patent: Aug. 6, 2019

(54) IMAGING PROCESSING METHOD AND ELECTRONIC DEVICE SUPPORTING THE SAME

(71) Applicant: Samsung Electronics Co., Ltd., Gyeonggi-do (KR)

(72) Inventors: Youngkwon Yoon, Seoul (KR); Jin Hee Na, Seoul (KR); Pyojae Kim, Gyeonggi-do (KR); Jonghoon Won, Gyeonggi-do (KR); Jongmin Hyun, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 15/484,601

(22) Filed: Apr. 11, 2017

(65) Prior Publication Data
US 2017/0295325 A1    Oct. 12, 2017

(30) Foreign Application Priority Data
Apr. 11, 2016   (KR) .......................... 10-2016-0044049

(51) Int. Cl.
H04N 5/265      (2006.01)
H04N 5/232      (2006.01)
G06T 5/50       (2006.01)
H04N 9/04       (2006.01)
H04N 5/262      (2006.01)
H04N 5/345      (2011.01)

(52) U.S. Cl.
CPC .............. *H04N 5/265* (2013.01); *G06T 5/50* (2013.01); *H04N 5/23232* (2013.01);
(Continued)

(58) Field of Classification Search
CPC ............... H04N 5/265; H04N 5/23245; H04N 5/23293; H04N 5/2323; H04N 5/23232;
(Continued)

(56) References Cited

U.S. PATENT DOCUMENTS 8,218,068 B2 * 7/2012 Deever ................ H04N 5/3456
                                                    348/362
9,100,514 B2   8/2015 Gu et al.
(Continued)

FOREIGN PATENT DOCUMENTS

KR        100500152        2/2005

OTHER PUBLICATIONS

Dengyu Liu, et al. "Efficient Space-Time Sampling with Pixel-wise Coded Exposure for High Speed Imaging", IEEE Transactions on Pattern Analysis and Machine Intelligence, pp. 1-14.
(Continued)

*Primary Examiner* — Luong T Nguyen
(74) *Attorney, Agent, or Firm* — The Farrell Law Firm, P.C.

(57) ABSTRACT

An electronic device and a method thereof are provided for processing stored images to reconstruct a high-resolution image. The electronic device includes an image sensor configured to acquire an image through a plurality of pixels including a first pixel set and a second pixel set; and a processor configured to acquire at least one first image through the first pixel set; acquire at least one second image through the second pixel set; and generate at least one third image according to a selected mode for generating the at least one third image, by using the at least one first image and the at least one second image.

19 Claims, 32 Drawing Sheets

(52) U.S. Cl.
CPC ..... *H04N 5/23245* (2013.01); *H04N 5/23254* (2013.01); *H04N 5/23293* (2013.01); *H04N 5/2628* (2013.01); *H04N 5/3452* (2013.01); *H04N 9/045* (2013.01); *G06T 2207/20208* (2013.01)

(58) Field of Classification Search
CPC ............. H04N 5/23254; H04N 5/2628; H04N 5/3452; H04N 9/045; G06T 5/50; G06T 2207/20208
See application file for complete search history.

(56) References Cited

U.S. PATENT DOCUMENTS

| | | | |
|---|---|---|---|
| 2012/0300105 A1* | 11/2012 | Deever | H04N 5/3456 348/302 |
| 2013/0070121 A1* | 3/2013 | Gu | H04N 5/2329 348/239 |
| 2014/0192235 A1 | 7/2014 | Hitomi et al. | |
| 2015/0189201 A1 | 7/2015 | Bridges | |
| 2016/0037043 A1* | 2/2016 | Wang | H04N 5/2355 382/275 |

OTHER PUBLICATIONS

Jinwei Gu, et al. "Coded Rolling Shutter Photography: Flexible Space-Time Sampling", pp. 1-8.

* cited by examiner

|     | CL1 | CL2 | CL3 | CL4 | CL5 | CL6 | CL7 | CL8 |
|-----|-----|-----|-----|-----|-----|-----|-----|-----|
| RL1 | $P_1$ | $P_2$ | $P_1$ | $P_2$ | $P_1$ | $P_2$ | $P_1$ | $P_2$ |
| RL2 | $P_3$ | $P_4$ | $P_3$ | $P_4$ | $P_3$ | $P_4$ | $P_3$ | $P_4$ |
| RL3 | $P_1$ | $P_2$ | $P_1$ | $P_2$ | $P_1$ | $P_2$ | $P_1$ | $P_2$ |
| RL4 | $P_3$ | $P_4$ | $P_3$ | $P_4$ | $P_3$ | $P_4$ | $P_3$ | $P_4$ |
| RL5 | $P_1$ | $P_2$ | $P_1$ | $P_2$ | $P_1$ | $P_2$ | $P_1$ | $P_2$ |
| RL6 | $P_3$ | $P_4$ | $P_3$ | $P_4$ | $P_3$ | $P_4$ | $P_3$ | $P_4$ |
| RL7 | $P_1$ | $P_2$ | $P_1$ | $P_2$ | $P_1$ | $P_2$ | $P_1$ | $P_2$ |
| RL8 | $P_3$ | $P_4$ | $P_3$ | $P_4$ | $P_3$ | $P_4$ | $P_3$ | $P_4$ |

FIG.8A

|     | CL1 | CL2 | CL3 | CL4 | CL5 | CL6 | CL7 | CL8 |
|-----|-----|-----|-----|-----|-----|-----|-----|-----|
| RL1 | $P_1$ | $P_2$ | $P_3$ | $P_4$ | $P_1$ | $P_2$ | $P_3$ | $P_4$ |
| RL2 | $P_5$ | $P_6$ | $P_7$ | $P_8$ | $P_5$ | $P_6$ | $P_7$ | $P_8$ |
| RL3 | $P_9$ | $P_{10}$ | $P_{11}$ | $P_{12}$ | $P_9$ | $P_{10}$ | $P_{11}$ | $P_{12}$ |
| RL4 | $P_{13}$ | $P_{14}$ | $P_{15}$ | $P_{16}$ | $P_{13}$ | $P_{14}$ | $P_{15}$ | $P_{16}$ |
| RL5 | $P_1$ | $P_2$ | $P_3$ | $P_4$ | $P_1$ | $P_2$ | $P_3$ | $P_4$ |
| RL6 | $P_5$ | $P_6$ | $P_7$ | $P_8$ | $P_5$ | $P_6$ | $P_7$ | $P_8$ |
| RL7 | $P_9$ | $P_{10}$ | $P_{11}$ | $P_{12}$ | $P_9$ | $P_{10}$ | $P_{11}$ | $P_{12}$ |
| RL8 | $P_{13}$ | $P_{14}$ | $P_{15}$ | $P_{16}$ | $P_{13}$ | $P_{14}$ | $P_{15}$ | $P_{16}$ |

IMAGING PROCESSING METHOD AND ELECTRONIC DEVICE SUPPORTING THE SAME

PRIORITY

The present application claims priority under 35 U.S.C. § 119 to Korean Application Serial No. 10-2016-0044049, which was filed in the Korean Intellectual Property Office on Apr. 11, 2016, the content of which is incorporated herein by reference.

BACKGROUND

1. Field of the Disclosure

The present disclosure relates generally to an image device and an operating method thereof for acquiring and processing an image.

2. Description of the Related Art

With the recent enhancement of digital technology, various types of electronic devices, such as mobile communication terminals, smart phones, tablet personal computers (PCs), personal digital assistants (PDAs), electronic schedulers, notebooks, wearable devices, etc., are widely used. Such electronic devices are in the mobile convergence stage encompassing functions of other devices.

These electronic devices may be provided with image sensors.

A complementary metal-oxide semiconductor (CMOS) image sensor has a pixel configuration of a two-dimensional form, and may acquire an image using a rolling shutter method by exposing and reading out in sequence on a row basis. When a motion occurs in an image acquired by the image sensor of this rolling shutter method, a skew artifact unavoidably appears on a row basis.

SUMMARY

The present disclosure has been made to address at least the problems and/or disadvantages described above and to provide at least the advantages described below.

Accordingly, an aspect of the present disclosure is to provide an apparatus and a method that acquire and store an image at high speed when an image is captured in an electronic device provided with an image sensor, and can reconstruct a high-resolution image from the stored image.

Another aspect of the present disclosure is to provide an apparatus and a method that acquire a plurality of low-resolution sub-frame images at high speed at a first timing in an electronic device provided with an image sensor, and reconstruct high-resolution images from the acquired plurality of sub-frame images at a second timing.

Another aspect of the present disclosure is to provide an apparatus and a method that reconstruct high-resolution frame images from stored sub-frame images in an electronic device provided with an image sensor, and process the reconstructed frame images into an image according to a set mode.

In accordance with an aspect of the present disclosure, an electronic device is provided, which includes an image sensor configured to acquire an image through a plurality of pixels including a first pixel set and a second pixel set; and a processor configured to acquire at least one first image corresponding to a first time through the first pixel set; acquire at least one second image corresponding to a second time through the second pixel set; select, based on an input, a mode for generating at least one third image; and generate the at least one third images corresponding to the selected mode by using the at least one first image and the at least one second image.

In accordance with another aspect of the present disclosure, an electronic device is provided, which includes an image sensor configured to acquire an image through a plurality of pixels including a first pixel set and a second pixel set; and a processor configured to acquire at least one first image through the first pixel set; acquire at least one second image through the second pixel set; and generate at least one third image according to a selected mode for generating the at least one third image, by using the at least one first image and the at least one second image.

In accordance with another aspect of the present disclosure, an operating method of an electronic device is provided, which includes acquiring at least one first images corresponding to a first time through a first pixel set of an image sensor including a plurality of pixels; acquiring at least one second image corresponding to a second time through a second pixel set of the image sensor; selecting, based on an input, a mode for generating at least one third image; and generating the at least one third image corresponding to the selected mode by using the at least one first image and the at least one second images.

In accordance with another aspect of the present disclosure, an operating method of an electronic device is provided, which includes acquiring at least one first image through a first pixel set of an image sensor including a plurality of pixels; acquiring at least one second image through a second pixel set of the image sensor; and generating at least one third image according to a selected mode for generating the at least one third image, by using the at least one first image and the at least one second image.

BRIEF DESCRIPTION OF THE DRAWINGS

The above and other aspects, features, and advantages of certain embodiments of the present invention will be more apparent from the following detailed description taken in conjunction with the accompanying drawings, in which:

FIGS. 8A to 8D illustrate a method for acquiring a plurality of sub-frame images in an electronic device according to an embodiment of the present disclosure;

FIG. 10 illustrates a method for reading out 16 sub frame images in an electronic device according to an embodiment of the present disclosure;

FIG. 11 illustrates a method of acquiring a plurality of sub-frame images in an electronic device including an image sensor of a Bayer pattern according to an embodiment of the present disclosure;

DETAILED DESCRIPTION

Figure 1:
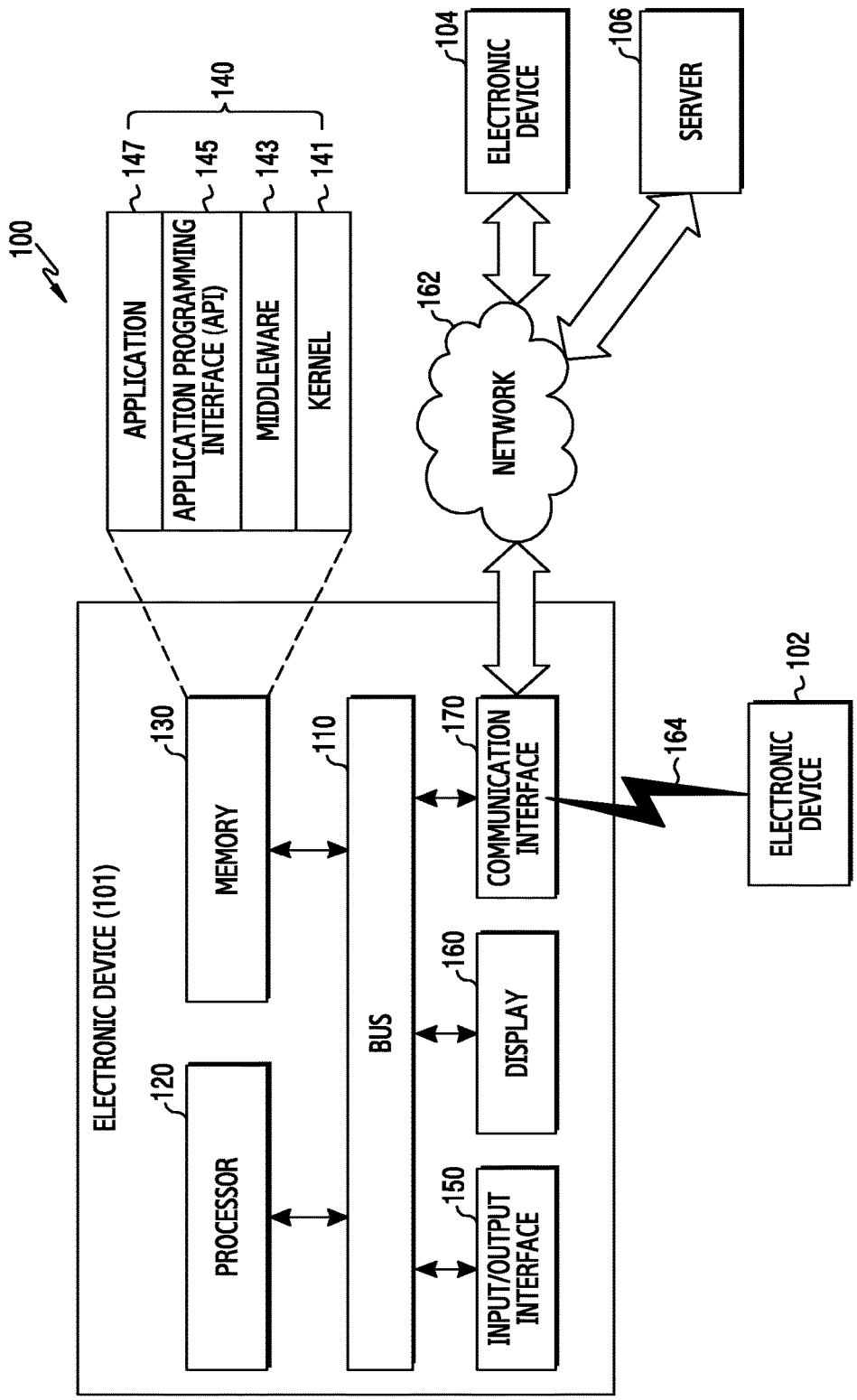
FIG. 1 illustrates a network environment including an electronic device according to an embodiment of the present disclosure.

Hereinafter, various embodiments of the present disclosure will be described in detail with reference to the accompanying drawings. In the following description, specific details such as detailed configuration and components are provided to assist the overall understanding of these embodiments of the present disclosure, but it should be apparent to those skilled in the art that various changes and modifications of the embodiments described herein may be made without departing from the scope and spirit of the present disclosure. In addition, descriptions of well-known functions and constructions are omitted for clarity and conciseness.

In describing the drawings, similar reference numerals may be used to designate similar elements.

The terms as used herein are used merely to describe certain embodiments and are not intended to limit the present disclosure. As used herein, singular forms may include plural forms as well unless the context explicitly indicates otherwise. Further, all the terms used herein, including technical and scientific terms, should be interpreted to have the same meanings as commonly understood by those skilled in the art to which the present disclosure pertains, and should not be interpreted to have ideal or excessively formal meanings unless explicitly defined in as such.

Herein, the terms "have", "may have", "include", and "may include" indicate the presence of disclosed corresponding features, numbers, steps, functions, operations, elements, parts, etc., and do not limit additional one or more features, numbers, steps, functions, operations, elements, parts, etc.

The terms "A or B", "at least one of A or/and B", and "one or more of A or/and B" include any and all combinations of items enumerated thereafter. For example, "A or B", "at lest one of A and B" or "at least one of A or B" indicates (1) at least one A, (2) at least one B, or (3) both at least one A and at least one B.

Although the term such as "first" and "second" may be used herein to modify various elements, these terms do not limit the corresponding elements. For example, these terms do not limit an order and/or importance of the corresponding elements, but may be used for the purpose of distinguishing one element from another element. Accordingly, a first user device and a second user device all indicate user devices and may indicate different user devices. Therefore, a first element may be referred to as a second element without departing from the scope of right of various embodiments of the present disclosure, and similarly, a second element may be referred to as a first element.

When an element (e.g., a first element) is "connected to" or "(operatively or communicatively) coupled with/to" to another element (e.g., a second element), the first element may be directly connected or coupled to the second element, or there may be an intervening element (e.g., a third element) between the first element and the second element. To the contrary, when the first element is "directly connected" or "directly coupled" to the second element, there is no intervening element therebetween.

The expression "configured to (or set to)" us may be used interchangeably with "suitable for", "having the capacity to", "designed to", "adapted to", "made to", or "capable of" according to context. The term "configured to (set to)" does not necessarily mean "specifically designed to" in a hardware level. Instead, the expression "apparatus configured to . . . " may mean that the apparatus is "capable of . . . " along with other devices or parts in a certain situation. For example, "a processor configured to (set to) perform A, B, and C" may be a dedicated processor, e.g., an embedded processor, for performing a corresponding operation, or a generic-purpose processor, e.g., a Central Processing Unit (CPU) or an application processor (AP), capable of performing a corresponding operation by executing one or more software programs stored in a memory device.

An electronic device, for example, may include a smartphone, a tablet PC, a mobile phone, a video phone, an electronic book (e-book) reader, a desktop PC, a laptop PC, a netbook computer, a workstation, a server, a PDA, a portable multimedia player (PMP), an MP3 player, a mobile medical appliance, a camera, or a wearable device (e.g., smart glasses, a head-mounted-device (HMD), electronic clothes, an electronic bracelet, an electronic necklace, an electronic appcessory, an electronic tattoo, a smart mirror, or a smart watch).

An electronic device may also be a home appliance, such as a television, a Digital Video Disk (DVD) player, an audio player, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, or an electronic photo frame.

An electronic device may also include a medical device (e.g., a portable medical measuring device, such as a blood glucose monitoring device, a heart rate monitoring device, a blood pressure measuring device, a body temperature measuring device, etc., a Magnetic Resonance Angiography (MRA) device, a Magnetic Resonance Imaging (MRI) device, a Computed Tomography (CT) machine, and an ultrasonic machine), a navigation device, a Global Positioning System (GPS) receiver, an Event Data Recorder (EDR), a Flight Data Recorder (FDR), a Vehicle Infotainment Device, an electronic devices for a ship (e.g., a navigation device for a ship, and a gyro-compass), avionics, a security device, an automotive head unit, a robot for home or industry, an automatic teller machine (ATM), point of sales (POS) device, or an Internet device of things (IoT) device (e.g., a light bulb, a sensor, an electric or gas meter, a sprinkler device, a fire alarm, a thermostat, a streetlamp, a toaster, a sporting good, a hot water tank, a heater, a boiler, etc.).

An electronic device may also include a part of furniture and/or a building/structure, an electronic board, an electronic signature receiving device, a projector, or a measuring instrument (e.g., a water meter, an electric meter, a gas meter, and a radio wave meter). An electronic device may also be a flexible device. An electronic device may also be a combination of one or more of the aforementioned various devices.

Further, an electronic device according to an embodiment of the present disclosure is not limited to the aforementioned devices, and may include a new electronic device according to the development of new technology.

Herein, the term "user" may indicate a person who uses an electronic device or a device (e.g., an artificial intelligence electronic device) that uses an electronic device.

FIG. 1 illustrates a network environment including an electronic device according to an embodiment of the present disclosure.

Referring to FIG. 1, the electronic device 101 includes a bus 110, a processor 120, a memory 130, an input output interface 150, a display 160, and a communication interface 170. Alternatively, the electronic device 101 may omit at least one of the constituent elements or additionally have another constituent element.

The bus 110 may include a circuit coupling the constituent elements 120 to 170 with one another and forwarding communication (e.g., a control message and/or data) between the constituent elements.

The processor 120 may include one or more of a CPU, an AP, a Communication Processor (CP) or an Image Signal Processor (ISP). The processor 120 may execute operation or data processing for control and/or communication of at least one other constituent element of the electronic device 101.

The memory 130 may include a volatile and/or non-volatile memory. The memory 130 may store an instruction or data related to at least one other constituent element of the electronic device 101. The memory 130 stores a software and/or program 140. The program 140 includes a kernel 141, a middleware 143, an Application Programming Interface (API) 145, and an application program (or "application") 147. At least a part of the kernel 141, the middleware 143, or the API 145 may be referred to as an Operating System (OS).

The kernel 141 may control or manage system resources (e.g., the bus 110, the processor 120, the memory 130, etc.) that are used for executing operations or functions implemented in other programs (e.g., the middleware 143, the API 145, or the application 147). The kernel 141 can provide an interface that is capable of controlling or managing the system resources by enabling the middleware 143, the API 145, or the application 147 to gain access to the individual constituent element of the electronic device 101.

The middleware 143 may perform a relay role of enabling the API 145 or the application 147 to communicate and exchange data with the kernel 141. The middleware 143 can process one or more work requests received from the application 147 in accordance with the order of priority. For example, the middleware 143 can grant at least one of the applications 147 the order of priority capable of using the system resources (e.g., the bus 110, the processor 120, the memory 130, etc.) of the electronic device 101, and process the one or more work requests. The API 145 may act as an interface for the application 147 to control a function of the kernel 141 or the middleware 143, and may include at least one interface or function (e.g., instruction) for file control, window control, picture processing, character control, etc.

The input/output interface 150 may function as an interface that may transfer instructions or data input from a user or another external device to the other element(s) of the electronic device 101. The input/output interface 150 may output the instructions or data received from the other element(s) of the electronic device 101 to the user or another external device.

The display 160 may include a Liquid Crystal Display (LCD), a Light-Emitting Diode (LED) display, an Organic Light-Emitting Diode (OLED) display, a MicroElectroMechanical Systems (MEMS) display, and an electronic paper display. The display 160 may display various content (e.g., text, images, videos, icons, symbols, etc.) for the user. The display 160 may include a touch screen that receives a touch input, a gesture input, a proximity input, and/or a hovering input by using an electronic pen or the user's body part. Thus, the display 160 may be referred to as a touch screen.

The communication interface 170 may set communication between the electronic device 101 and a first external electronic device 102, a second external electronic device 104, and/or a server 106. The communication interface 170 may be connected to a network 162 through wireless or wired communication to communicate with the second external electronic device 104 or the server 106.

The wireless communication may use Long Term Evolution (LTE), LTE-Advance (LTE-A), Code Division Multiple Access (CDMA), Wideband CDMA (WCDMA), Universal Mobile Telecommunications System (UMTS), WiBro (Wireless Broadband), and/or Global System for Mobile Communications (GSM), as a cellular communication protocol. Further, the wireless communication may include short-range communication 164. The short-range communication may include Wi-Fi, Bluetooth, Near Field Communication (NFC), and/or Global Navigation Satellite System (GNSS). The GNSS may include at least one of a Global Positioning System (GPS), a Global Navigation Satellite System (Glonass), a Beidou Navigation Satellite System (Beidou), and/or a European Global Satellite-based Navigation System (Galileo), according to a use area, a bandwidth, etc. Herein, "GPS" may be interchangeably used with "GNSS".

The wired communication may include a Universal Serial Bus (USB), a High Definition Multimedia Interface (HDMI), Recommended Standard-232 (RS-232, and/or a Plain Old Telephone Service (POTS).

The network 162 may include at least one of a communication network such as a computer network (e.g., a local area network (LAN) or a wide area network (WAN)), the Internet, and a telephone network.

Each of the first and second external electronic devices 102 and 104 may be the same or different type of device as the electronic device 101. The server 106 may include a group of one or more servers. All or some of the operations performed in the electronic device 101 may be performed in the electronic devices 102 and 104 and/or the server 106. When the electronic device 101 has to perform some functions or services automatically or in response to a request, the electronic device 101 may make a request for performing at least some functions relating thereto to the electronic device 102 or 104 and/or the server 106, instead of performing the functions or services by itself or in addition. The electronic device 102 or 104 and/or the server 106 may execute the requested functions or the additional functions, and may deliver a result of the execution to the electronic device 101. The electronic device 101 may process the received result as received or additionally to provide the requested functions or services. For example, cloud computing, distributed computing, or client-server computing technology may be used.

Figure 2:
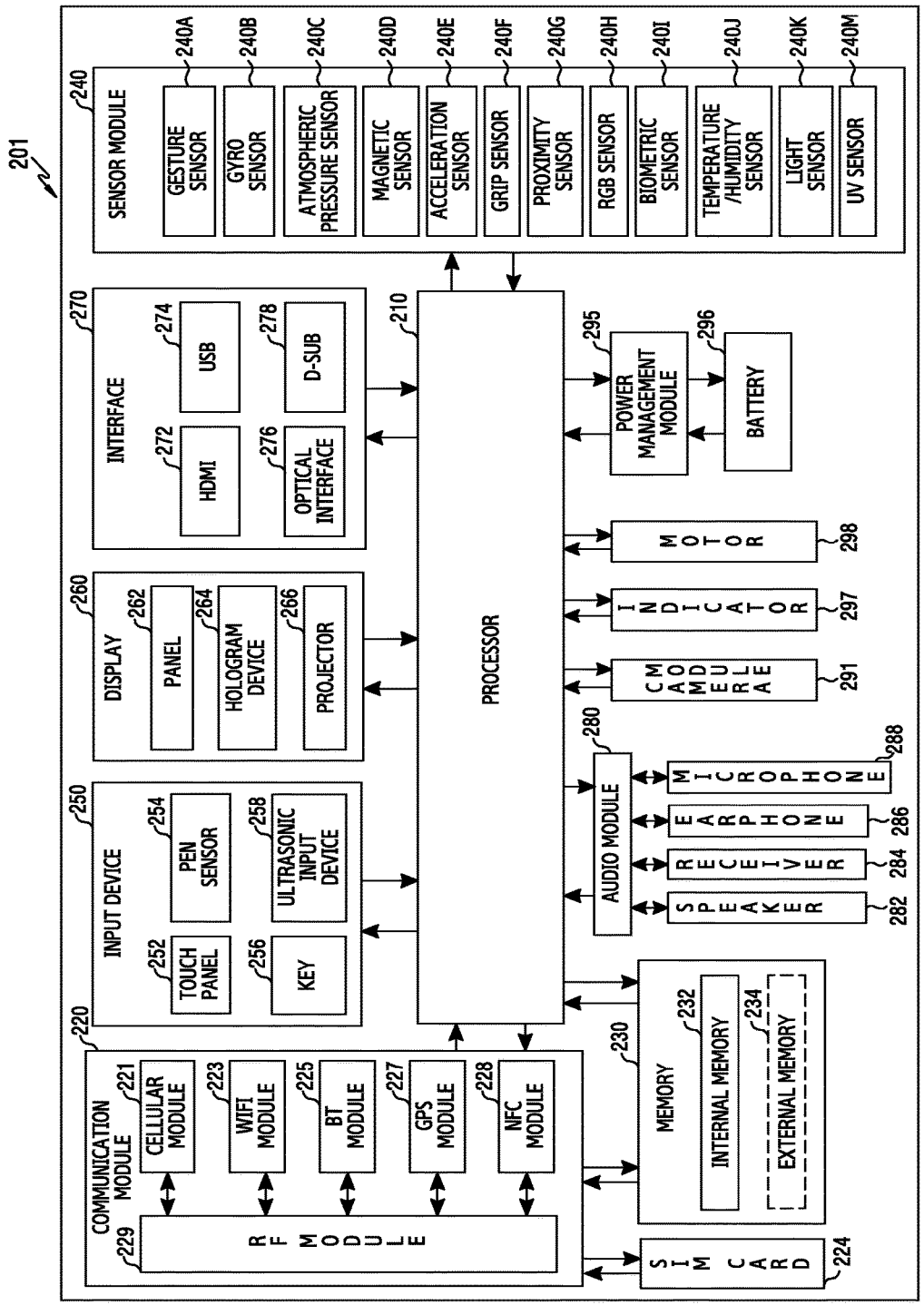
FIG. 2 illustrates an electronic device according to an embodiment of the present disclosure.

FIG. 2 illustrates an electronic device according to an embodiment of the present disclosure. In the following description, the electronic device 201 may be, for example, the entire electronic device 101 illustrated in FIG. 1 or part of the electronic device 101.

Referring to FIG. 2, the electronic device 201 includes a processor 210 (e.g., an AP), a communication module 220, a subscriber identity module (SIM) card 224, a memory 230, a sensor module 240, an input device 250, a display 260, an interface 270, an audio module 280, a camera module 291, a power management module 295, a battery 296, an indicator 297, and a motor 298.

The processor 210 may run an OS or application program to control a plurality of hardware or software components connected to the processors 210 and may perform various kinds of data processing and operations. The processors 210 may be configured as a system on chip (SoC). The processors 210 may further include a graphic processing unit (GPU) and/or an ISP. The processors 210 may include at least part of the components illustrated in FIG. 2 (e.g., a cellular module 221). The processors 210 may load a command or data received from at least one of other components (e.g., a nonvolatile memory) into a volatile memory to process the command or data and may store various kinds of data in the nonvolatile memory.

The communication module 220 includes the cellular module 221, a Wi-Fi module 223, a Bluetooth (BT) module 225, a global navigation satellite system (GNSS) module 227, an NFC module 228, and a radio frequency (RF) module 229.

The cellular module 221 may provide a voice call, a video call, a text message service, an Internet service, etc., through a communication network. The cellular module 221 may identify and authenticate the electronic device 201 within a communication network using the SIM card 224. The cellular module 221 may perform at least some of the functions that the processor 210 may provide. The cellular module 221 may include a CP.

The Wi-Fi module 223, the BT module 225, the GNSS module 227, and/or the NFC module 228 may include a processor for processing data that is transmitted and received through the corresponding module. At least two of the cellular module 221, the Wi-Fi module 223, the Bluetooth module 225, the GNSS module 227, and the NFC module 228 may be included in one Integrated Chip (IC) or IC package.

The RF module 229 may transmit and receive a communication signal (e.g., an RF signal). The RF module 229 may include a transceiver, a power amplifier module (PAM), a frequency filter, a low noise amplifier (LNA), an antenna, etc. At least one of the cellular module 221, the Wi-Fi module 223, the Bluetooth module 225, the GNSS module 227, and the NFC module 228 may transmit and receive an RF signal through a separate RF module.

The SIM card 224 may include a card including an SIM and/or an embedded SIM and may include unique identification information (e.g., an integrated circuit card identifier (ICCID)) or subscriber information (e.g., an international mobile subscriber identity (IMSI)).

The memory 230 includes an internal memory 232 and an external memory 234. The internal memory 232 may include at least one of a volatile memory (e.g., a dynamic random-access memory (DRAM), a static RAM (SRAM), a synchronous dynamic RAM (SDRAM), etc.) and a nonvolatile memory (e.g., a one-time programmable read-only memory (OTPROM), a programmable ROM (PROM), an erasable and programmable ROM (EPROM), an electrically erasable and a programmable ROM (EEPROM), a mask ROM, a flash ROM, a flash memory (e.g., a NAND flash, a NOR flash, etc.), a hard drive, or a solid state drive (SSD)).

The external memory 234 may further include a flash drive, such as a compact flash (CF), a secure digital (SD), a micro secure digital (micro-SD), a mini secure digital (mini-SD), an extreme digital (xD), a multi-media card (MMC), a memory stick, etc. The external memory 234 may be functionally and/or physically connected to the electronic device 201 through various interfaces.

The sensor module 240 may measure physical quantities or detect an operation state of the electronic device 201 and convert measured or detected information into an electrical signal. The sensor module 240 includes a gesture sensor 240A, a gyro sensor 240B, an atmospheric pressure sensor 240C, a magnetic sensor 240D, an acceleration sensor 240E, a grip sensor 240F, a proximity sensor 240G, a red, green, and blue (RGB) sensor 240H, a biometric sensor 240I, a temperature/humidity sensor 240J, a light sensor 240K, and an ultraviolet (UV) sensor 240M. Additionally or alternatively, the sensor module 240 may include a galvanic skin reflex (GRS) sensor, an E-nose sensor, an electromyography (EMG) sensor, an electroencephalogram (EEG) sensor, an electrocardiogram (ECG) sensor, an infrared (IR) sensor, an iris sensor, a force touch sensor, an ultrasonic sensor, and/or a fingerprint sensor. The sensor module 240 may further include a control circuit to control at least one or more sensors belonging thereto.

The electronic device 201 may further include a processor configured, as a part of the processors 210 or separately from the processors 210, to control the sensor module 240, thereby controlling the sensor module 240 while the processors 210 is in a sleep state.

The input device 250 includes a touch panel 252, a (digital) pen sensor 254, a key 256, and an ultrasonic input device 258. The touch panel 252 may use at least one of an electrostatic type, a pressure-sensitive type, an infrared type, and an ultrasonic type. Further, the touch panel 252 may further include a control circuit. The touch panel 252 may further include a tactile layer to provide a user with a tactile response.

The (digital) pen sensor 254 may be part of the touch panel or include a separate recognition sheet.

The key 256 may include a physical button, an optical key, or a keypad.

The ultrasonic input device 258 may detect ultrasonic waves generated in an input tool through a microphone 288 and identify data corresponding to the detected ultrasonic waves.

The display 260 includes a panel 262, a hologram device 264, and a projector 266. The panel 262 may be configured to be flexible, transparent, and/or wearable. The panel 262 may be formed with the touch panel 252 in a single module. The panel 262 may include a pressure sensor (or force sensor) to measure the strength of pressure by a user touch. The pressure sensor may be configured in an integrated form with the touch panel 252 or be configured as one or more sensors separate from the touch panel 252.

The hologram device 264 may display a three-dimensional image in the air using the interference of light.

The projector 266 may project light onto a screen to display an image. The screen may be disposed inside or outside the electronic device 201.

The display 260 may further include a control circuit to control the panel 262, the hologram device 264, and/or the projector 266.

The interface 270 includes a high-definition multimedia interface (HDMI) 272, a universal serial bus (USB) 274, an optical interface 276, and a D-subminiature (D-sub) 278. Additionally or alternatively, the interface 270 may include a mobile high-definition link (MHL) interface, an SD card/MMC interface, and/or an Infrared Data Association (IrDA) interface.

The audio module 280 may convert a sound and an electrical signal reciprocally. The audio module 280 may process sound information input or output, for example, through a speaker 282, a receiver 284, earphones 286, and/or the microphone 288.

The camera module 291 is a device that takes a still image and a video. The camera module 291 may include one or more image sensors (e.g., a front sensor or a rear sensor), a lens, an ISP, and/or a flash (e.g., an LED, a xenon lamp, etc.).

The power management module 295 may manage the power of the electronic device 201. The power management module 295 may include a power management integrated circuit (PMIC), a charger integrated circuit (IC), and/or a battery gauge. The power management module 295 may be supplied with power from the outside via a cable and/or wirelessly. For example, the power management module 295 may be supplied with power from the outside using a wireless charging method, such as a magnetic resonance method, a magnetic induction method, or an electromagnetic wave method. The power management module 295 may further include an additional circuit, such as a coil loop, a resonance circuit, or a rectifier, to be supplied with power wirelessly. The battery gauge may measure the remaining battery charge, the charging voltage, the current, and/or a temperature of the battery 296.

The battery 296 may include a rechargeable battery and/or a solar battery. The battery 296 may include a plurality of cells connectable in series or in parallel.

The indicator 297 may display a specific state of the electronic device 201, such as a booting state, a message state, or a charging state, or a component thereof (e.g., the processors 210).

The motor 298 may convert an electrical signal into mechanical vibrations and may generate vibrations or a haptic effect. The electronic device 201 may include a processing device for supporting a mobile TV (e.g., a GPU). The processing device for supporting the mobile TV may process media data in accordance with digital multimedia broadcasting (DMB), digital video broadcasting (DVB), and/or mediaFlo™ standards.

Each of the above-described component elements of hardware according to the present disclosure may be configured with one or more components, and the names of the corresponding component elements may vary based on the type of electronic device. An electronic device according to an embodiment of the present disclosure may include at least one of the aforementioned elements, although some elements may be omitted or other additional elements may be further included in the electronic device. Also, some of the hardware components according to various embodiments may be combined into one entity, which may perform functions identical to those of the relevant components before the combination.

Figure 3:
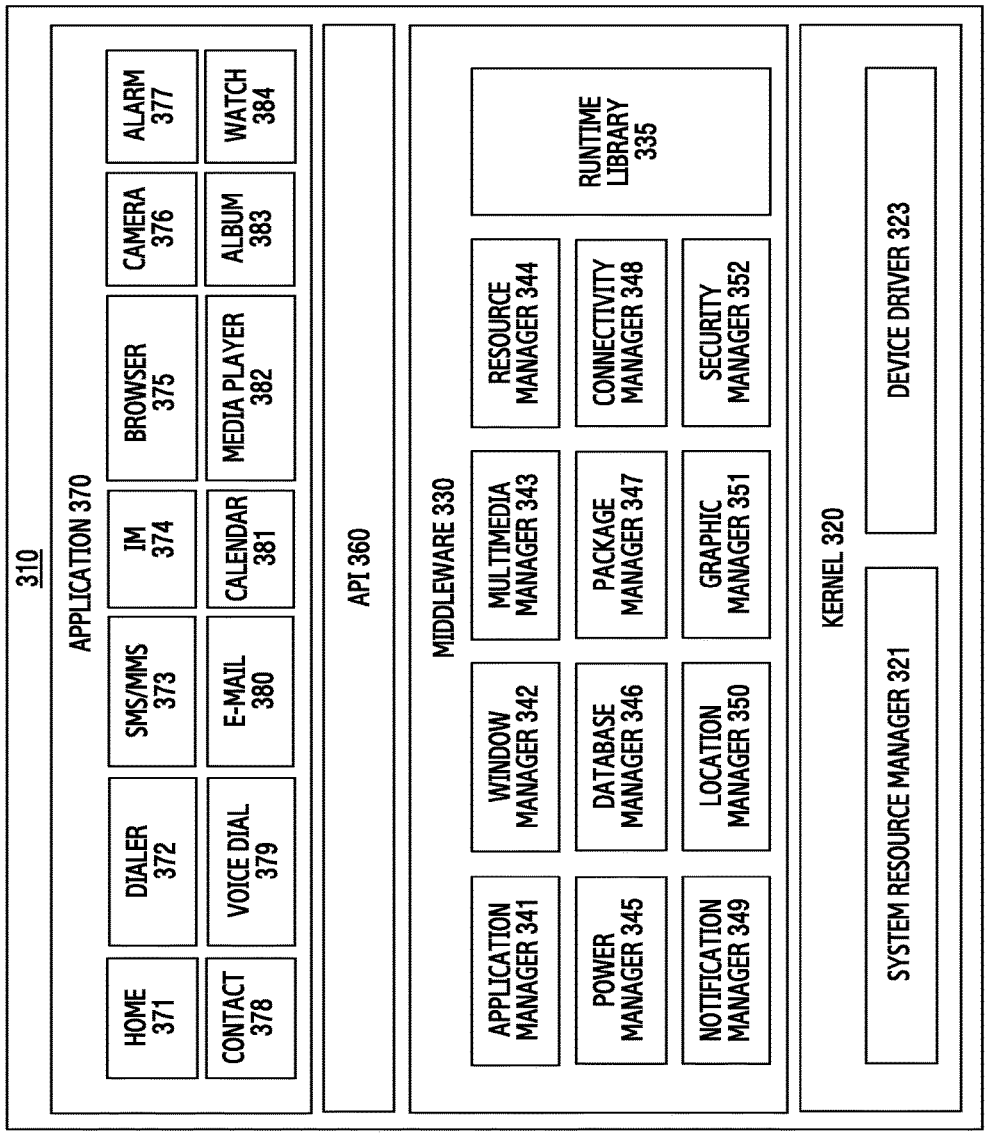
FIG. 3 illustrates a program module according to an embodiment of the present disclosure.

FIG. 3 illustrates a program module according to an embodiment of the present disclosure.

Referring to FIG. 3, the program module 310 may include an OS controlling resources related to an electronic device, and/or various applications run on the OS, e.g., Android™, iOS™, Windows™, Symbian™, Tizen™, or Bada™.

The program module 310 includes a kernel 320, a middleware 330, an API 360, and an application 370. At least some of the program module 310 can be preloaded onto an electronic device, or can be downloaded from an external electronic device.

The kernel 320 includes a system resource manager 321 and a device driver 323. The system resource manager 321 can perform the control of system resources, the allocation thereof, or the recovery thereof. The system resource manager 321 can include a process management unit, a memory management unit, or a file system management unit. The device driver 323 may include a display driver, a camera driver, a Bluetooth driver, a shared memory driver, a USB driver, a keypad driver, a WiFi driver, an audio driver, and/or an Inter-Process Communication (IPC) driver. The middleware 330 may provide a function that the application 370 commonly sues, or provide various functions to the application 370 through the API 360 so that the application 370 may make use of restricted system resources within an electronic device.

The middleware 330 includes a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include a library module that a compiler uses to add a new function through a programming language while the application 370 is executed. The runtime library 335 can perform input output management, memory management, or arithmetic function processing. The application manager 341 may manage a lifecycle of the application 370. The window manager 342 can manage a GUI resource that is used in a screen. The multimedia manager 343 can determine a format required for playing of media files, and perform the encoding or decoding of the media file by using a codec suitable for the corresponding format. The resource manager 344 can manage a source code of the application 370 or a space of a memory. The power manager 345 may manage a battery capacity or a power source, and provide power information required for an operation of an electronic device. The power manager 345 can interwork with a Basic Input/Output System (BIOS). The database manager 346 may generate, search and/or change a database that will be used in the application 370. The package manager 347 can manage the installation or updating of an application distributed in a form of a package file.

The connectivity manager 348 may manage wireless connectivity. The notification manager 349 may provide events such as an arrival message, an appointment, a proximity notification, etc., to a user. The location manager 350 may manage location information of an electronic device. The graphic manager 351 may manage a graphic effect that will be provided to the user, or a user interface related with this. The security manager 352 may provide system security or user authentication.

The middleware 330 may include a telephony manager for managing a voice or video telephony function of the electronic device, or a middleware module capable of forming a combination of functions of the aforementioned constituent elements. The middleware 330 can provide a module that is specialized by operating system type. The middleware 330 can dynamically delete some of the existing constituent elements or add new constituent elements.

The API 360 is a set of API programming functions, which can be provided to have another construction in accordance with an OS. For example, Android or iOS may provide one API set by platform, and Tizen may provide two or more API sets by platform.

The application 370 includes a home application 371, a dialer application 372, a Short Message Service (SMS)/Multimedia Message Service (MMS) application 373, an Instant Message (IM) application 374, a browser application 375, a camera application 376, an alarm application 377, a contact application 378, a voice dial application 379, an electronic mail (e-mail) application 380, a calendar application 381, a media player application 382, an album application 383, and a watch application 384. Additionally or alternatively, the application 370 may include a health care application (e.g., an application for measuring a momentum, a blood sugar, etc.), or an environment information application (e.g., an application providing air pressure, humidity, and/or temperature information). The application 370 can include an information exchange application capable of supporting information exchange between an electronic device and an external electronic device. The information exchange application may include a notification relay application for relaying specific information to the external electronic device, or a device management application for managing the external electronic device. For example, the notification relay application can relay notification information, which is generated in another application of the electronic device, to the external electronic device, or can receive notification information from the external electronic device and provide the received notification information to a user. The device management application may install, delete, and/or update a function of the external electronic device communicating with the electronic device (e.g., the turn-on/turn-off of the external electronic device itself or some constituent components thereof or the adjustment of a brightness or resolution of a display), or an application operating in the external electronic device.

The application 370 may include an application designated according to an attribute of the external electronic device (e.g., a health care application of a mobile medical instrument). The application 370 may include an application received from the external electronic device. At least a part of the program module 310 may be implemented (e.g., executed) by software, firmware, hardware (e.g., the processor 210) or a combination of at least two or more thereof, and can include a module for performing one or more functions, a program, a routine, sets of instructions, or a process.

Herein, the term "module" may mean a unit including at least one of hardware, software, and firmware. The term "module" may be interchangeably used with "unit", "logic", "logical block", "component", or "circuit". A "module" may be a minimum unit of an integrated component element or a part thereof. A "module" may be a minimum unit for performing one or more functions or a part thereof. A "module" may be mechanically or electronically implemented. For example, a "module" according to the present disclosure may include at least one of an Application-Specific Integrated Circuit (ASIC) chip, a Field-Programmable Gate Arrays (FPGA), and a programmable-logic device for performing operations that are known or to be developed hereinafter.

At least some of the devices (e.g., modules or functions thereof) or the method (e.g., operations) according to an embodiment of the present disclosure may be implemented by a command stored in a computer-readable storage medium in a programming module form. The instruction, when executed by a processor (e.g., the processor 120), may cause the one or more processors to execute the function corresponding to the instruction. The computer-readable storage medium may be, e.g., the memory 130.

The computer readable recoding medium may include a hard disk, a floppy disk, magnetic media (e.g., a magnetic tape), optical media (e.g., a Compact Disc Read Only Memory (CD-ROM) and a DVD), magneto-optical media (e.g., a floptical disk), a hardware device (e.g., a Read Only Memory (ROM), a Random Access Memory (RAM), a flash memory), etc. In addition, the program instructions may include high class language codes, which can be executed in a computer by using an interpreter, as well as machine codes made by a compiler. The aforementioned hardware device may be configured to operate as one or more software modules in order to perform the operations of the present disclosure, and vice versa.

A programming module according to the present disclosure may include one or more of the aforementioned components or may further include other additional components, or some of the aforementioned components may be omitted. Operations executed by a module, a programming module, or other component elements according to various embodiments of the present disclosure may be executed sequentially, in parallel, repeatedly, or in a heuristic manner. Further, some operations may be executed according to another order or may be omitted, or other operations may be added. Various embodiments disclosed herein are provided merely to easily describe technical details of the present disclosure and to help the understanding of the present disclosure, and are not intended to limit the scope of the present disclosure. Accordingly, the scope of the present disclosure should be construed as including all modifications or various other embodiments based on the technical idea of the present disclosure.

Various embodiments of the present disclosure relate to an electronic device including an image sensor, and an operating method thereof, which acquire a plurality of sub-frame images at a time of capturing, and reconstruct high-resolution images from the acquired plurality of sub-frame images.

Herein, the term "sub-frame image" may refer to multi-field sub-sampled data of the image sensor. The sub-sampling may be performed in the row direction and the column direction of the image sensor. The number of samplings in the row direction (m) and the number of samplings in the column direction (n) may have a pre-set format or may be changed. The number of sub-frame images acquired in the image sensor may be m*n. A resolution of the sub-frame image may be 1/(m*n) of the resolution of the image sensor, and a frame rate of the sub-frame image may be (m*n) times the frame rate of the image sensor.

The term "sub-frame image" may have the same meaning as a "first image" and a "second image." A "high-resolution image" may be a full resolution image of the image sensor, and may have the same meaning as a "reconstructed image" or a "third image." The term "pixel set" may have the same meaning as the sub-frame image in the image sensor. The term "parity" may be a basic pixel unit for acquiring a sub-frame image, and may have the same meaning as a "sub-pixel set." The parity may be a pixel unit for sub-sampling, and may include at least one RGB pixel. The term "first timing" may be a time at which sub-frame images are acquired in the image sensor, and the term "second timing" may be a time at which images are reconstructed from acquired sub-frame images. For example, the first timing may be a capturing time of acquiring and storing sub-frame images, and the second timing may be a time of reconstructing high-resolution images from stored sub-frame images and displaying/storing.

The plurality of sub-frame images may be acquired as corresponding parity data, and the parity data may be read out from different locations at different times. For example, a first image (e.g., a first sub-frame image) may be a set of first parities acquired at a first time, and a second image may be a set of second parities acquired at a second time. In addition, a third image may be an image which is generated by the first image and the second image.

Hereinafter, an electronic device, a wearable device, and a device are distinguished from one another for convenience of explanation, and an operation which is performed between the electronic device and the wearable device in association with a function corresponding to the device, according to whether the device is connected to or disconnected from the electronic device when the electronic device and the wearable device are connected with each other, will be described. However, in various embodiments of the present disclosure, the wearable device and the device may be included in the range of the electronic device, and an interworking operation among the electronic devices may be performed in various electronic devices in addition to the wearable device and the device. For example, the electronic device may include all devices that use one or more of various processors (e.g., the processor 120 or 210), such as an AP, a CP, a GPU, and a CPU, like all information and communication devices, multimedia devices, wearable devices, and application devices therefor, which support functions according to various exemplary embodiments of the present disclosure.

In various embodiments described below, a hardware-based approach method is described by way of an example. However, because various embodiments of the present disclosure include technology using both hardware and software, the various embodiments of the present disclosure do not exclude software-based approach methods.

Figure 4:
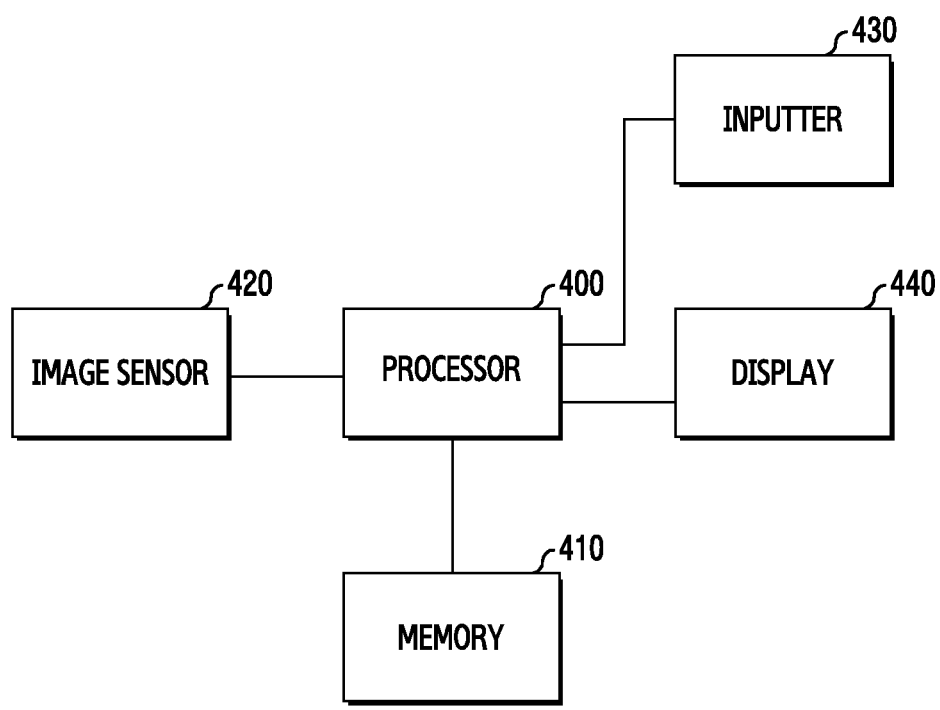
FIG. 4 illustrates an electronic device including an image sensor according to an embodiment of the present disclosure.

FIG. 4 illustrates an electronic device including an image sensor according to an embodiment of the present disclosure.

Referring to FIG. 4, the electronic device includes a processor 400, a memory 410, an image sensor 420, an inputter 430, and a display 440. The processor 400 may be the processor 120 of FIG. 1 and/or the processor 210 of FIG. 2. The memory 410 may be the memory 130 of FIG. 1 and/or the memory 230 of FIG. 2. The image sensor 420 may be a part of the input and output interface 150 of FIG. 1 and/or the camera module 291 of FIG. 2. The inputter 430 may be a part of the input and/or output interface 150 of FIG. 1 and a part of the input device 250 of FIG. 2.

The processor 400 may acquire a plurality of sub-frame images by controlling to drive image sensors in the row direction and the column direction when driving a camera, and may reconstruct high-resolution images from the acquired plurality of sub-frame images and process the high-resolution images. For example, the processor 400 may acquire and store the plurality of sub-frame images by controlling the camera at a first timing, and may reconstruct high-resolution images from the stored plurality of sub-frame images at a second timing.

The memory 410 may include a table which stores information and data for synchronizing access periods of the plurality of image sensors. The memory 410 may store the plurality of sub-frame images.

The image sensor 420 may include a row driver, a pixel array, and a column driver. The image sensor 420 may include a plurality of pixel sets for generating the plurality of sub-frame images. The image sensor 420 may have the pixel sets activated according to the row and column control of the processor 400, and may output the plurality of sub-frame images.

The inputter 430, e.g., a touch screen, may receive an input and generate data for controlling the operations of the electronic device.

The display 440 may display image data acquired in the image sensor 420.

The image sensor 420 may include a CMOS or a charge coupled device (CCD) (a CMOS image sensor (CIS) or CCD), and may include a pixel array and a part for controlling the pixel array (row control) and reading out the pixel array (readout). In the image sensor 420, a block for controlling the pixel array (row control block) controls an operation of resetting pixels and then accumulating an electric charge in a light detection element (e.g., a photo diode) of the pixel array during a predetermined exposure time, and may perform a function of generating a signal for reading out the accumulated electric charge. An output module (column readout block) may perform an operation of converting the signal (analog pixel signal) accumulated in the light detection element during the row exposure time into a digital signal through an analog to digital converter (ADC). The converted digital data may be output to the outside (e.g., the processor 400) via an internal digital block of the image sensor 420 and an external interface such as a mobile industry processor interface (MIPI).

The image sensor 420 may be a part of the camera module. The camera module may include the image sensor 420, an optical unit, and an optical driver for controlling focusing and tracking of the optical unit. The image sensor 420 may convert an optical signal of a photo subject collected by the optical unit into an electric signal.

When an image (i.e., an optical signal of a subject) is acquired in the image sensor 420 including the pixel array (e.g., when a readout time and an exposure length are controlled), the electronic device may control the process of reading out a specified area (layout, sub-sampling) of the image sensor 420 on a row and column basis of the image sensor 420.

The processor 400 may read out according to a specific pixel array pattern when controlling the image sensor 420, and may read out pixels within a specified area in sequence according to a pre-defined pattern (e.g., a coding sequence or a readout sequence), and generate a sub-frame image for each pixel. The plurality of sub-frame images may be acquired, and the size of the sub-frame image may be smaller than the size (e.g., a full resolution size) of the image sensor 420. A set of pixel array patterns for generating the sub-frame images may include all of the pixel array areas of the image sensor 420. The processor 400 may not read out the whole area of the image sensor 420 and may read out a small area of a specific pattern, and may acquire the plurality of sub-frame images at a time of reading out the full resolution image of the image sensor 420 of one frame.

The processor 400 may display one of the plurality of sub-frame images on the display 440 as a live view (preview) image. The processor 400 may use one of the plurality of sub-frame images to control the operations of the camera module (e.g., auto focusing (AF), auto exposure (AE), auto white balance (AWB), IPC, face detection, object tracking, etc.).

The processor 400 may divide the acquired sub-frame images according to the same parity, and store the divided sub-frame images in the memory 410. The processor 400 may encode the sub-frame images to reduce the sizes of the stored sub-frame images. The processor 400 may encode the sub-frame images independently when storing the acquired sub-frame images in the memory 410, and may decode the sub-frame images independently when reading out from the memory 410. For example, the processor 400 may encode each of the sub-frame images and may decode each of the sub-frame images.

The processor 400 may generate and store the sub-frame images in the middle of capturing, and reconstruct high-resolution images from the sub-frame images after finishing capturing. The processor 400 may reconstruct high-resolution images based on the sub-frame images at each time, and finally, may generate a high-speed and high-resolution image sequence. The processor 400 may adjust the size and/or frame rate of the image based on the reconstructed high-solution and high-speed image sequence, and generate an image of a category desired by the user (e.g., a best photo, a burst shot, a slow motion, etc.). The processor 400 may generate the image of the category desired by the user multiple times, and may generate images of different categories. For example, the processor 400 may generate a video, a still image, a burst shot image, a digital zooming image based on the reconstructed high-resolution and high-speed image sequence. The processor 400 may generate images of a category desired by the user multiple times, and the images may have different characteristics. The processor 400 may generate images having different image sizes and different reproduction speeds (e.g., frame rates).

At a first timing (e.g., at a time of capturing), the processor 400 may acquire the plurality of sub-frame images, and may encode the acquired sub-frame images and store the sub-frame images in the memory 410, and at a second timing (e.g., at a time of displaying high-resolution images), the processor 400 may read out the sub-frame images stored in the memory, may decode the sub-frame images, and may reconstruct high-resolution images from the decoded sub-frame images.

The process of reconstructing the images in the processor 400 may refer to an operation of generating high-resolution output images based on low-resolution sub-frame images. The high-resolution images may be reconstructed by filling pixels of locations which are not sampled (i.e., which are skipped) when the low-resolution sub-frame images are acquired at high speed, by using neighbor pixels of a corresponding sub-frame image and pixels of the other sub-frame images. The method for reconstructing the high-resolution images in the processor 400 may use a motion-based interface deinterlacing method and intraframe deinterlacing methods.

For example, the processor 400 may repeatedly set a sequence (e.g., 4-field sub-sampling sequence) for generating four sub-frame images. The processor 400 may control the readout of the image sensor 420 based on the set readout sequence (e.g., a coding sequence). The image sensor 420 may be controlled by the processor 400 to be sub-sampled into four fields and to read out the four sub-frame images. The processor 400 may perform image processing (e.g., ISP) with respect to the plurality of sub-frame images (e.g., multi-field sub-sampled data) read out in the image sensor 420, and may store the image-processed sub-frame images in the memory 410. The image processing structure (e.g., an image processing pipeline) may be the same as an existing pipeline structure. In addition, the image processing structure may be applied by enhancing an existing pipeline, and a new image processing process may be added. The new image processing process may be a process of generating high-speed and high-resolution images based on the processed sub-frame images (e.g., multi-field sub-sampled data), and may include various image processing processes (e.g., operations related to skew-free, high dynamic range (HDR), zoom, deblurring, etc.) according to a used scenario.

The processor 400 may include an encoder and a decoder. The encoder may encode the sub-frame images (e.g., multi-field sub-sampled image data) in parallel or in sequence. The decoder may decode the encoded plurality of sub-frame images (e.g., multi-field sub-sampled image data) in parallel or in sequence. When the four sub-frame images (e.g., 4-field sub-sampled image data) are read out in the image sensor 420, the encoder may encode the image-processed sub-frame images (e.g., image data of the same field) simultaneously, thereby generating four compressed sub-frame images (e.g., sub-sampled image sequences). The decoder may decode the stored four encoding sub-frame images simultaneously, thereby reconstructing images. The display 440 may display a specific sub-frame image from among the captured plurality of sub-frame images as a live image, and also, may display the images reconstructed in the processor 400. The processor 400 may selectively the first sub-frame image from among the plurality of sub-frame images (e.g., multi-field sub-sampled image data) on the display 440 while capturing the image, and may display the reconstructed high-resolution images on the display 440 when reproducing the image.

The image sensor 420 may use a rolling shutter method.

Figure 5A:
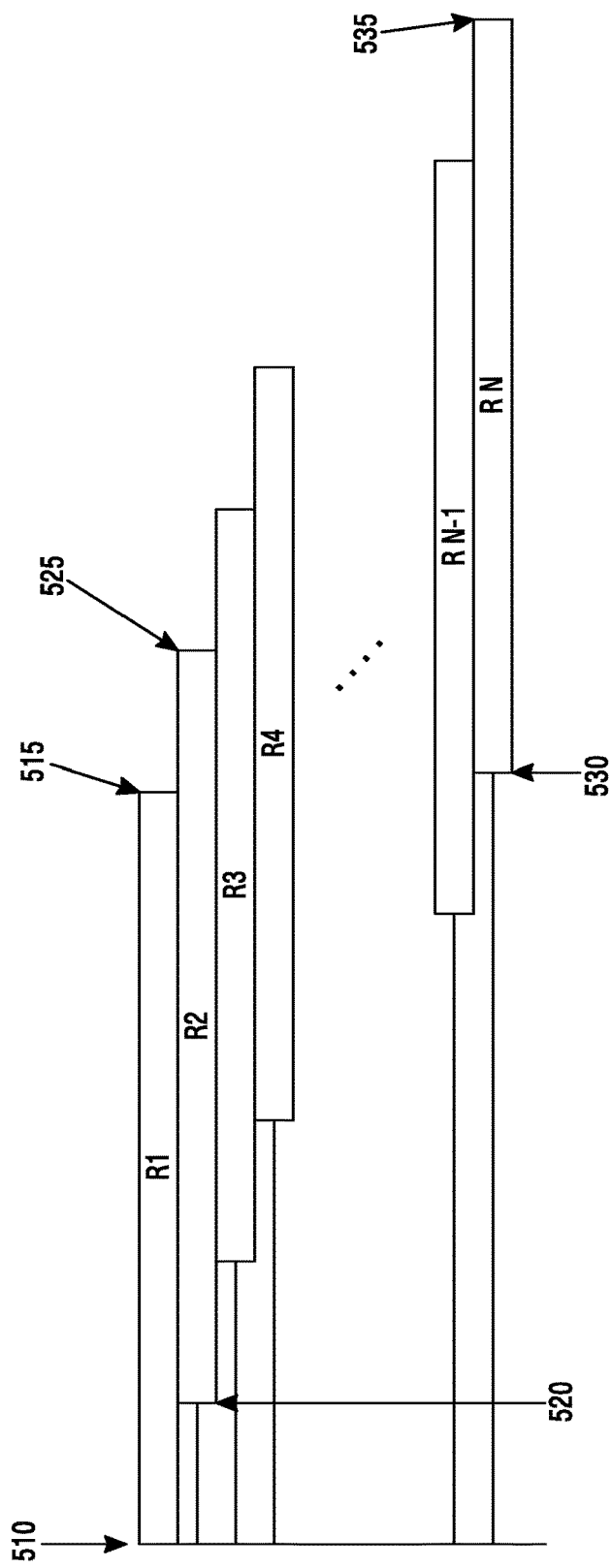
FIGS. 5A and 5B illustrate an example of scanning, by a rolling shutter method, in an electronic device including an image sensor.
Figure 5B:
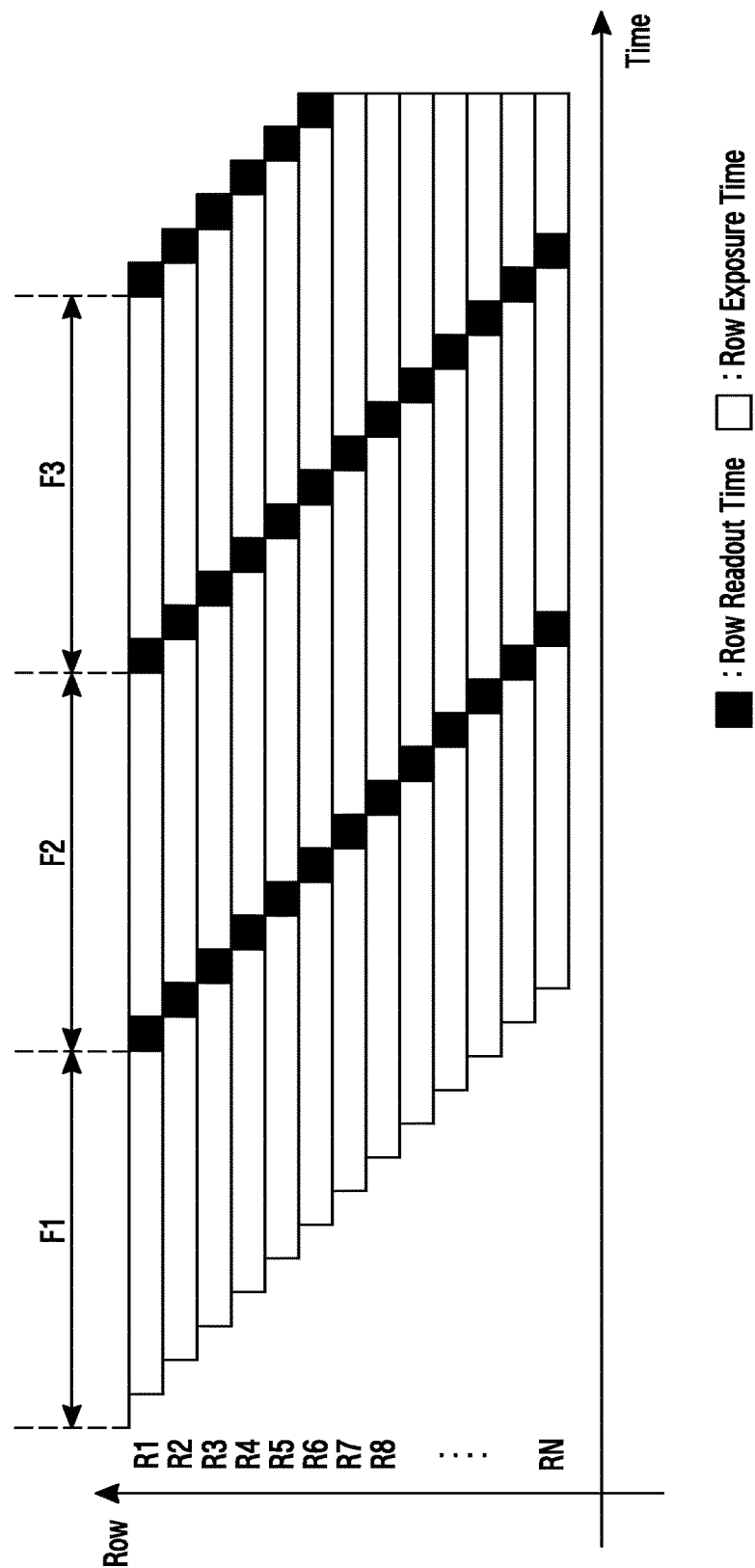

FIGS. 5A and 5B illustrate an example of scanning, by a rolling shutter method, in an electronic device including an image sensor.

Referring to FIG. 5A, an image sensor may be provided with a pixel array having N row lines, and may scan on a basis of a single row line (row by row). The first row line scanning operation may begin an exposure at time 510 (i.e., beginning of exposure of first row) and may end the exposure at time 515 (i.e., end of exposure of first row). The second row line scanning operation may begin an exposure at time 520 after a line delay time elapses (e.g., a 1 line delay time) (beginning of exposure of second row), and may end the exposure at time 525 (i.e., end of exposure of second row). The line delay time may be a line delay time for activating the exposure of row lines. In this way, the N-th row line scanning operation may begin an exposure at time 530, after N line delay times (N*line delay time) elapse (i.e., beginning of exposure of Nth row), and may end the exposure at time 535 (i.e., end of exposure of Nth row). As illustrated in FIG. 5A, the image sensor may select row lines of the pixel array based on the line delay time, and accumulate an electric charge in the light detection element.

Referring to FIG. 5B, the image sensor may activate an exposure time (i.e., a row exposure time) while selecting row lines in sequence, and may activate an output time (i.e., a row readout time) at the time of ending the exposure time to output an electric charge value (i.e., a pixel signal) accumulated in the light detection element of a corresponding line to a column line. When the output time expires, an exposure time for generating a pixel signal of a next frame may be activated. For example, the image sensor using the rolling shutter method may select the row lines in sequence, and there may be a difference in the times of reading the pixel information of each row line, as illustrated in FIG. 5B.

Referring again to FIG. 4, when it is recognized that a capture button is pressed by the user, the electronic device may acquire an image from the image sensor 420, process the acquired image, and display the image on the display 440 and may also store the image in the memory 410. The acquired image may have the same size as that of the image acquired from the image sensor 420 (i.e., a full resolution of the image sensor).

When the electronic device generates sub-frame images without sampling on a row basis or a column basis by controlling the readout time, the resolution of the generated sub-frame image (i.e., resolution of a space-time volume) may be reduced in proportion to the number of non-sampled (skipped) sub-frame images. For example, when the sub-frame images are acquired without sampling by one pixel in the row direction, the resolution of the acquired images (a space resolution of a space-time volume) may be reduced by ½.

When the readout is controlled on a row basis or a column basis, the sub-frame images may capture spaces of different scenes at different times. For example, when the odd-numbered sub-frame image is acquired by reading out odd-numbered row line pixel data of the image sensor 420 and the even-numbered sub-frame image is acquired by reading out even-numbered row line pixel data, there may be a difference in the space between the two sub-frame images. When the whole sub-frame images are arranged in order of reading out when a video is reproduced, there may be blurring in the reproduced video due to a difference in the captured space between the odd-numbered sub-frame image and the even-numbered sub-frame image. When the electronic device acquires the plurality of sub-frame images and processes the acquired sub-frame images, the electronic device may compensate for the blurring by performing an additional image processing operation such as image alignment, etc.

According to an embodiment of the present disclosure, the electronic device (e.g., an imaging device) may acquire and store the plurality of sub-frame images at high speed based on the exposure and the readout based on a selective row and column basis of the image sensor, and may generate high-resolution images based on the stored plurality of sub-frame images.

According to another embodiment of the present disclosure, an apparatus and a method acquire low-resolution images at high speed by acquiring and storing a plurality of sub-frame images at a first timing (e.g., at a time of capturing), and reconstruct high-resolution images (e.g., having a resolution of the image sensor 420 or a set resolution) from the plurality of low-resolution images according to a set mode at a second timing (e.g., at a time of requesting, by the user, processing of an image, or after the first image processing operation is completed), and display and store the reconstructed images.

Figure 6:
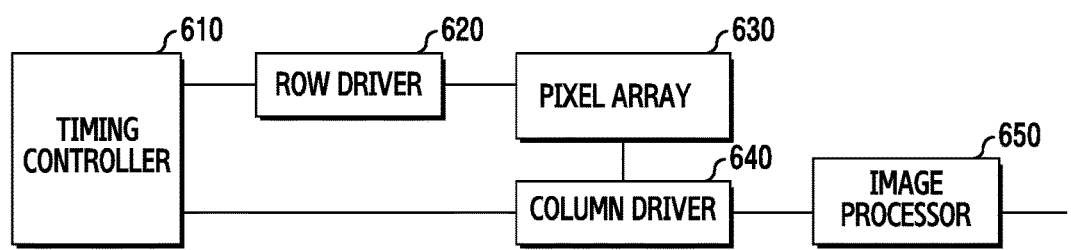
FIG. 6 illustrates an electronic device including an image sensor according to an embodiment of the present disclosure.

FIG. 6 illustrates an electronic device including an image sensor according to an embodiment of the present disclosure. Specifically, FIG. 6 illustrates an image sensor and a configuration for controlling an exposure and a readout of the image sensor.

Referring to FIG. 6, the electronic device includes a timing controller 610, a row driver 620, a pixel array 630, a column driver 640, and an image processor 650.

The timing controller 610 may output information for controlling an access of an image sensor. The timing controller 610 may generate a timing control signal for acquiring a plurality of sub-frame images by controlling an exposure and a readout of the image sensor.

The image sensor (e.g., the image sensor 420) may include the row driver 620, the pixel array 630, and the column driver 640.

The row driver 620 may set a row exposure time of the pixel array 630 according to a control signal of the timing controller 610, and may set a row readout time for reading out pixel information of a row line in a column line. A light detection element connected to a selected row line of the pixel array 630 may detect light and accumulate light as a pixel signal during the row exposure time, and may output the pixel signal to a column line at the row output time. The column driver may include an ADC. The ADC may convert the pixel signal output to the column line into digital data. The column driver 640 may deliver the digital data converted in the ADC to the image processor 650 in an MIPI method.

The image processor 650 may process the pixel signals output from the image sensor. The timing controller 610 and the image processor 650 may be elements of a processor (e.g., the processor 400) or may be configured independently.

Figure 7:
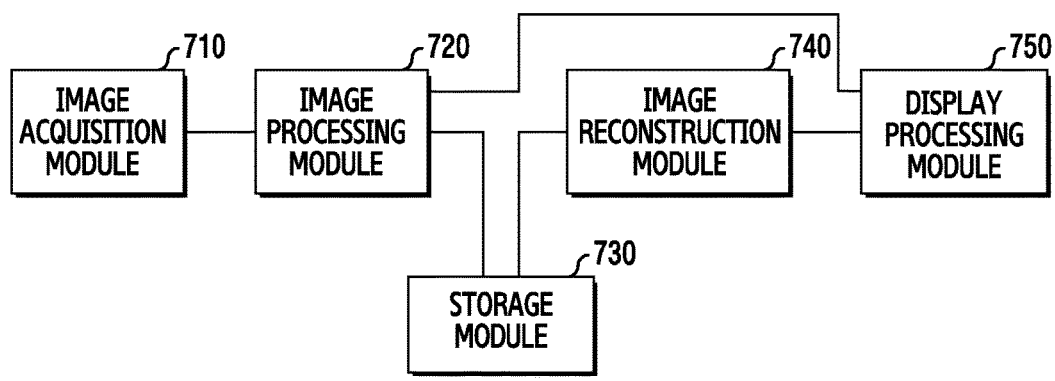
FIG. 7 illustrates an electronic device according to an embodiment of the present disclosure.

FIG. 7 illustrates an electronic device according to an embodiment of the present disclosure.

Referring to FIG. 7, the electronic device includes an image acquisition module 710, an image processing module 720, a storage module 730, an image reconstruction module 740, and a display processing module 750.

The image acquisition module 710 may acquire a plurality of sub-frame images by controlling the row lines and the column lines of an image sensor according to a set pattern (e.g., an exposure and readout pattern). The image acquisition module 710 may include a timing controller (e.g., the timing controller 610 of FIG. 6). The sub-frame images may be pixel images corresponding to pixel sets which are set in the whole area of the image sensor. For example, the image acquisition module 710 may set the number of sub-samplings in the row direction and the column direction of the image sensor according to the set pattern. The number of sub-frame images (m*n=N) may be determined by the number of sub-samplings in the row direction (m) and the number of samplings in the column direction (n). The image acquisition module 710 may generate the plurality of sub-frame images (e.g., multi-field sub-sampled data) by controlling an exposure time (e.g., a length) and a readout time on a row and column basis of the image sensor according to a set sampling pattern. For example, the number of sub-frame images acquired in 1 frame section of the image sensor 420 may be N, the resolution of each of the sub-frame images may be 1/N, and the frame rate of the N sub-frame images may be N times that of the image sensor.

The image processing module 720 may perform image signal processing with respect to the plurality of sub-frame images acquired in the image acquisition module 710. The image processing module 720 may include an image pre-processor, an image post-processor, an encoder, etc.

The image pre-processing operation of the image processing module 720 may perform AWB, AE, AF extraction and processing, lens shading correction, dead pixel correction, knee correction, etc., with respect to the sub-frame images.

The image post-processing operation of the image processing module 720 may include a color interpolator, an IPC, a color converter, etc. The image processing module 720 may perform color interpolation of the image pre-processed sub-frame images through the color interpolator, may perform noise removal, color correction, etc., with respect to the color-interpolated sub-frame images through the IPC, and may convert RGB data into YUV data through the color converter. The image sensor may be a CCD or CMOS image sensor. The CCD/CMOS image sensor may use a color filter array, and accordingly, each pixel sensor may have only one color from among three colors for creating a color image. The color interpolation operation may perform a function of converting pixels output from the image sensor to color including RGB of three colors (full color conversion). The color interpolator may perform a color interpolation function using a correlation between neighbor pixels. The IPC may perform noise reduction, gamma correction, and luminance correction of the color-interpolated images. In addition, the color converter may convert the corrected images (e.g., raw data, Bayer data, etc.) into a YUV image. The image post-processing operation of the image processing module 720 may be an operation of performing color interpolation, noise removal, etc., with respect to the pre-processed image and then converting the image into the YUV image.

The image processing module 720 may encode the image-processed sub-frame images. The image processing module 720 may encode the image-processed sub-frame images in sequence or in parallel according to a configuration of the image processing module 720. As many image processing modules 720 as the number of the sub-frame images may be provided, or the image processing module 720 may process the sub-frame images acquired in sequence by using a single image processing module. In addition, the image processing module 720 may perform the image pre-processing operation and the image post-processing operation through a single image processor, and may encode the image-processed sub-frame images through encoders arranged in parallel. As many encoders as the number of the sub-frame images may be arranged in parallel.

The image processing module 720 may output a set sub-frame image from among the plurality of sub-frame images on a display as a live view image (e.g., a preview). In addition, the image processing module 720 may use the set sub-frame image from among the plurality of sub-frame images to control a camera module including the image sensor and/or the image processing module 720 (e.g., AF, AE, AWB, IPC, face detection, object tracking, etc.).

The storage module 730 may store the plurality of sub-frame images encoded by the image processing module 720 independently. The storage module 730 may store the plurality of sub-frame images in a memory or in an independent buffer.

The image reconstruction module 740 may access the plurality of sub-frame images stored in the storage module 730 and reconstruct high-resolution images. The sub-frame images may be images which are acquired by sub-sampling at different times. The image acquisition module 710 may acquire the sub-frame images by sub-sampling in the row direction and the column direction of the image sensor based on a set pattern (e.g., readout pattern sequence). For example, N sub-frame images acquired in the image acquisition module 710 may be pixels which are located in different spaces of the image sensor and may be sampled at different times.

The image reconstruction module 740 may estimate a motion between a decoded current sub-frame image and a previous sub-frame image (e.g., a reference sub-frame image), and may estimate pixels of images that are not sampled based on the estimated motion information. The image reconstruction module 740 may reconstruct high-resolution images by deinterlacing the estimated pixels with respect to the current sub-frame image. The number of high-resolution images reconstructed in the image reconstruction module 740 may correspond to the number of a plurality of sub-frame images acquired at a time that a single full frame image of the image sensor can be acquired. For example, when a first sub-frame image through a fourth sub-frame image are acquired, the image reconstruction module may estimate a motion between the current first sub-frame image and the previous first sub-frame image, may estimate pixels which are not sampled in the full image based on the estimated motion, and may reconstruct high-resolution images by deinterlacing the estimated pixels with respect to the first sub-frame image. In this way, the second sub-frame image through the fourth sub-frame images may be restored.

The display processing module 750 may generate a new image according to an image processing method selected by the user based on the high-resolution images reconstructed in the image reconstruction module 740, and may store the new image in the memory and display the new image on the display. The image processing method selected by the user may be a method for processing a still image (e.g., for processing a best photo), a burst shot image, a video (e.g., high speed video capture (or slow motion)), a zooming image (e.g., high quality digital zooming), an HDR image (e.g., a high speed HDR), etc.

The electronic device may acquire a plurality of sub-frame images at a time of acquiring a high-resolution image of one frame by controlling an exposure and a readout based on rows and columns of the image sensor, without sampling (e.g., by skipping) pixels of a set section. The electronic device may reconstruct high-resolution images by deinterlacing pixel images that are not sampled from among the acquired plurality of images. The processor may acquire a plurality of sub-frame images (e.g., multi-field sub-sampled image data) by controlling an exposure and a readout (e.g., a readout timing control and exposure time control) on a row and column basis of the image sensor.

The electronic device may use a coding sequence to acquire a plurality of sub-frame images. The coding sequence may be a readout pattern sequence, and the electronic device may sub-sample the row lines and the column lines of the image sensor according to a set coding sequence. The electronic device may acquire a plurality of sub-frame images (e.g., multi-field sub-sampled image data) having a low resolution at a high frame rate at a time of acquiring a full resolution (e.g., a full pixel image) of the image sensor (e.g., at a time of exposing and reading out all pixels of the image sensor, or at a time of generating a full resolution image of one frame). After acquiring the plurality of sub-frame images, the electronic device may reconstruct high-resolution images (e.g., a full pixel image of the image sensor) from the plurality of sub-frame images at a set time (e.g., at a time of displaying).

The electronic device may perform a capturing operation that acquires a plurality of sub-frame images by controlling the image sensor according to a sequence of a set readout pattern, and an imaging operation which reconstructs high-resolution images from the captured plurality of sub-frame images and utilizes the high-resolution images.

The image acquisition module 710 may acquire the plurality of sub-frame images (e.g., multi-field sub-sampled image data) by sub-sampling the image sensor according to the sequence of the set readout pattern. The sub-sampling operation may be performed in the row direction and the column direction of the image sensor. The number of sub-samplings in the row direction (m) and the number of sub-samplings in the column direction (n) may be pre-defined or may be changed in the middle of processing. The image acquisition module 710 may sub-sample pixel images of different row and column lines of the image sensor, and the sub-frame images acquired in this way may be images that are acquired at spatially different locations of the image sensor.

For convenience of explanation, descriptions will be provided below where m=2 and n=2. For example, each of four sub-frame images (i.e., 4-field sub-sampled image data) may have a resolution of ¼ of the maximum resolution (or a full resolution) of the image sensor, and high-resolution images having four full resolutions may be reconstructed when an imaging operation is performed. The sub-frame images may be acquired within a shorter time than when the maximum resolution of the image sensor is acquired. For example, four sub-frame images may be acquired during a time that is required to acquire one frame full-resolution image of the image sensor, and a frame rate of the sub-frame images may be four times the frame rate of one frame full resolution image. An image having a frame rate, which is four times higher than the maximum frame rate supported by the image sensor with reference to the maximum resolution of the image sensor, may be obtained. For example, when frames per second (fps) supported by the image sensor 420 for a maximum resolution image is 60 fps, the sub-frame images (i.e., the 4-field sub-sampled image) may be acquired at 240 fps (=4*60).

When the number of sub-frame images (N) increases, fps of the sub-frame images may increase and the resolution may be reduced. For example, when the image sensor 420 supports full HD (1920*1080)@30 fps and N=4 (4-field sub-sampling), the resolution of the sub-frame image may be 960*540, and the image acquisition module 710 may acquire the sub-frame images of (960*540)@120 fps. In addition, the electronic device may reconstruct high-resolution images of full HD (1920*1080)@120 fps from the acquired sub-frame images. For example, when N=8 (m=2, n=4) and the resolution of the sub-frame image is 480*540, the image acquisition module 710 may acquire sub-frame images of (480*540)@240 fps. In addition, the electronic device may reconstruct high-resolution images of HD (1920*1080)@240 fps from the acquired sub-frame images.

The image-processed sub-frame images may be separately stored in a memory (e.g., according to the same field image) in order to reconstruct high-resolution images. The sub-frame images acquired in the image acquisition module 710 may be stored in the memory without being image-processed. However, the image acquisition module 710 may perform an image processing (an ISP) operation to display at least one of the sub-frame images as a preview image and/or to control (e.g., AE, AF, AWB, flicker correction, etc.). In addition, the sub-frame images may be encoded to reduce the size of the sub-frame images stored in the memory.

The image processing module 710 may image-process the sub-frame images acquired in the image acquisition module 710 through an image pre-processor and an image post-processor. In addition, a set sub-frame image from among the plurality of sub-frame images image-processed in the image processing module 720 may be displayed on the display as a live view (or a preview) image. In addition, the set sub-frame image from among the plurality of sub-frame images processed in the image processing module 720 may be used to control a camera. For example, the set sub-frame image may be the first sub-frame image.

The image processing module 720 may include an encoder and a decoder, and may encode (e.g., compression-encode) the image-processed sub-frame images through the encoder to store the sub-frame images in the memory. The encoder may include a still image encoder and/or a video encoder. Additionally, motion information may be acquired from a video codec when a video is encoded. By using the encoder, time required to reconstruct a final image can be reduced. In addition, the image processing module 720 may decode the sub-frame images stored in the memory and output the sub-frame images.

The encoder and the decoder may be independently configured. For example, the encoder and the decoder may be disposed in the image processing module 720 and the storage module 730. The encoder may encode the image processed in the image processing module 720 and output the image to the storage module 730. The decoder may decode encoded image data accessed at the storage module 730 and output the image data to the image reconstruction module 740.

The image processing module 720 may include a single image pre-processor and a single image post-processor, and may process the sub-frame images acquired in the image acquisition module 710 in sequence. In addition, as many image processing modules 720 as the number of sub-frame images acquired in the image acquisition module 710 may be provided and may be configured in a pipeline structure to process the corresponding sub-frame images.

The storage module 730 may store the sub-frame images processed in the image processing module 720 (e.g., image-processed and compression-encoded sub-frame images) in sub-frame image storage areas of a corresponding field. The encoder may be included in the storage module 730. For example, the image processing module 720 may include an image pre-processor and an image post-processor, and the storage module 730 may include an encoder and a decoder.

High-resolution images may be reconstructed at the time of capturing or at the time that display of the captured plurality of sub-frame images is requested while the sub-frame images are stored. The image reconstruction module 740 may reconstruct high-resolution images from the stored sub-frame images. The storage module 730 may access the sub-frame images stored in the memory and output the sub-frame images to the image reconstruction module 740. When sub-frame data stored in the memory has been encoded, the encoded data may be decoded through the decoder.

The decoder may be included in the image processing module 720, or may be included in the storage module 730. For example, the encoder and the decoder may be included in the image processing module 720 or the storage module 730. The encoder may be included in the image processing module 720 and the decoder may be included in the storage module 730. The encoder and/or the decoder may be configured in parallel in a pipeline structure and may encode/decode the corresponding sub-frame data. The encoder/decoder may be configured to encode/decode the plurality of sub-frame data in sequence.

The image reconstruction module 740 may use the same sub-frame (i.e., same parity) images in order to reconstruct images of the maximum resolution of the image sensor from the plurality of sub-frame images (e.g., multi-field sub-sampled images).

Reconstructing the image may refer to reconfiguring high-resolution images based on the sub-frame images. For example, the image reconstruction module 740 may reconstruct a full-resolution image of the image sensor from the acquired sub-frame images.

As described above, the sub-frame images may be images that are acquired at different locations of the image sensor at different times. When the image reconstruction module 740 reconstructs a high-resolution image from one sub-frame image, the image reconstruction module 740 may detect a motion between a current sub-frame image and the same sub-frame image previously acquired (hereinafter, referred to as a reference sub-frame image), may estimate a pixel image which is not sampled in the sub-frame image using the detected motion information, and may reconstruct a high-resolution image by deinterlacing the estimated image with respect to the non-sampled pixel location.

For example, when the image sensor of the electronic device includes a first pixel set through a fourth pixel set, the image acquisition module 710 of the electronic device may acquire a first sub-frame image through a fourth sub-frame image by reading out images of the pixel sets at different times. The first sub-frame image may be an image of the first pixel set that is acquired at a first time. For example, the first sub-frame image may be the first pixel set image when the first pixel set is sampled and the second, third, and fourth pixel set are not sampled. The second sub-frame image may be an image of the second pixel set that is acquired at a second time. For example, the second sub-frame image may be the second pixel set image when the second pixel set is sampled and the first, third, and fourth pixel sets are not sampled. The third sub-frame image may be an image of the third pixel set that is acquired at a third time. For example, the third sub-frame image may be the third pixel set image when the third pixel set is sampled and the first, second, and fourth pixel sets are not sampled. The fourth sub-frame image may be an image of the fourth pixel set that is acquired at a fourth time. For example, the fourth sub-frame image may be the fourth pixel set image when the fourth pixel set is sampled and the first, second, and third pixel sets are not sampled.

The image reconstruction module 740 may reconstruct high-resolution images from the first sub-frame image through the fourth sub-frame image. For example, when the high-resolution image is reconstructed from the first sub-frame image, the image reconstruction module 740 may calculate motion information between a current first sub-frame image and a previous first sub-frame image, and may estimate the images of the second through the fourth pixel sets which are not sampled based on the calculated motion information. The image reconstruction module 740 may reconstruct the high-resolution image by deinterlacing the images estimated in the current first sub-frame image with respect to corresponding locations of the second through the fourth pixel sets.

High-resolution images may be reconstructed from the second through the fourth sub-frame images in the same method as the method of reconstructing the high-resolution image from the first sub-frame image.

The image reconstruction module 740 may detect a motion between a current sub-frame image and a previous sub-frame image that is acquired at the same location as that of the current sub-frame image. After detecting the motion between the same sub-frame images, the image reconstruction module 740 may calculate a size of an interpolated motion of the other sub-frame images (e.g., intermediate sub-sampled images) located between sub-frame images. The image reconstruction module 720 may reconstruct a maximum resolution image of the image sensor by performing motion-compensated deinterlacing based on the motion information between the same sub-frame images and the size of the interpolated motion of the interpolated other sub-frame images.

As described above, the image reconstruction module 740 may repeat the above-described same image reconstruction operation with respect to the other sub-frame images located before and after one sub-frame image at a corresponding time with reference to a time sequence. In this way, the image reconstruction module 740 may reconstruct images of the high-resolution of the image sensor from the sub-frame images acquired in the image acquisition module 710. For example, assuming the image sensor 420 is able to capture at 12M@60 fps, when four sub-frame images are acquired in the image acquisition module 710, four 3M@60 fps sub-frame images may be acquired. That is, the image acquisition module 710 may acquire the sub-frame images of 3M@240 fps, and, when the image reconstruction module 740 reconstructs high-resolution images from the sub-frame images, image of 12M@240 fps may be reconstructed.

The display processing module 750 may generate a new image by processing the high-resolution images reconstructed in the image reconstruction module 740 according to a set function, and may display the new image on the display (e.g., the display 440 of FIG. 4). Generating the new image may refer to generating a new image by processing the reconstructed high-resolution image sequence based on an image processing technique selected by the user in the display processing module 750. The generated new image may be a best photo, a burst shot, a high-speed digital zooming image, a high-speed video, an HDR image, etc.

The display processing module 750 may determine a best image from among the high-speed and high-resolution images. The high-resolution and high-speed image sequence reconstructed in the image reconstruction module 740 may be an image acquired while the user captures the image (e.g., a high speed and high-resolution image acquired by a frame rate and a sub-sample rate of the image sensor). This is the same result as when a still image is continuously captured at a high-speed frame rate. A still image may be acquired at high speed while a video is made in a method different from the method of acquiring a still image when the user presses a capture button.

When the user sets a best photo setting function, the display processing module 750 may select a best image from among the reconstructed high-resolution images. For example, in an image of people, the electronic device may analyze people in the captured image and may set a best photo (e.g., a photo with a face without closing eyes, a photo with a smiling face, a photo without blurring, etc.).

The high-resolution images reconstructed in the image reconstruction module 740 may obtain the same effect as the effect of capturing a burst shot. When the user sets a burst shot mode, the display processing module 750 may set the acquired high-resolution images as burst shot images or may generate a burst short image by selecting images at a specific interval from the acquired high-resolution image sequence. Since the images reconstructed in the image reconstruction module 740 are based on the high-resolution image sequence, it is possible to freely change the size of the image and adjust the interval between the images. The images acquired in this way may be equally applied to a burst utilization scenario (Shot and More, Best Photo, Eraser, etc.).

When the user maintains the capturing operation for a long time, the image acquisition module 710 may continuously acquire the sub-frame images. In addition, the high-resolution images reconstructed in the image reconstruction module 740 may be video images (e.g., high speed video capture images). When the high-resolution and high-speed image sequences reconstructed in the image reconstruction module 740 are stored, the image sequences may be stored as a high-speed and high-resolution video.

The electronic device may acquire a plurality of sub-frame images during the time of reading out images of one frame, and then may reconstruct high-resolution images (e.g., full-frame images). Since the full-resolution images of the size of the image sensor can be reconstructed from the plurality of sub-frame images, the electronic device may generate videos of various sizes (by cropping or resizing like high definition (HD), full HD (FHD), or ultra HD (UHD)). The electronic device may select images from the generated video sequence at specific intervals and may adjust the frame rate of the video.

For high-speed video, a normal electronic device may acquire a smaller image than the size of the image sensor in order to capture at high speed, and may generate an image of a low resolution by upscaling (S/W upscaling) when performing a zooming function. The electronic device can reconstruct the high-resolution images to have a space-time volume (e.g., a set of multi-field sub-sampled data), and thus, can prevent deterioration in a resolution when performing a digital zooming (e.g., high quality digital zooming) function. Because an amount of information of the space-time volume is larger than an amount of information of a normal video, the resolution of the high-resolution image can be enhanced.

The electronic device may generate an HDR image by using the high-resolution and high-speed image sequence. The electronic device may control the image sensor in the row and column directions (control a readout time and an exposure time), and an image acquired in this way may have the advantage of HDR quality. Reconstructing the HDR image may be applied along with motion detection and compensation techniques and motion and edge adaptive de-interlacing techniques.

FIGS. 8A to 8D illustrate a method for acquiring a plurality of sub-frame images in an electronic device according to an embodiment of the present disclosure.

Specifically, FIG. 8A illustrates a structure of an image sensor.

Referring to FIG. 8A, P1-P4 are parities (i.e., basic unit data) forming respective sub-frame images. In the image sensor, the number of sub-samplings in the row direction is 2 (m=2) and the number of sub-samplings in the column direction is 2 (n=2). A processor may acquire four sub-frame images (i.e., 4-field sub-sampled images). For example, P1 may be a parity of the first sub-frame images, P2 may be a parity of the second sub-frame images, P3 may be a parity of the third sub-frame images, and P4 may be a parity of the fourth sub-frame images. The processor may acquire the sub-frame images by controlling a readout time and an exposure time (length) on a row line (RL) basis and a column line (CL) basis, when acquiring an image from the image sensor.

As illustrated in FIG. 8A, when parities are configured to form the sub-frame images, the electronic device may acquire the sub-frame images in various orders. For example, the electronic device may acquire the first through the fourth sub-frame images by reading out in order of P1, P2, P3, and P4 parities. Alternatively, the electronic device may acquire the first through the fourth sub-frame images by reading out in order of P1, P3, P2, and P4 parities, or by reading out in order of P2, P4, P1, and P3 parities.

Figure 8B:
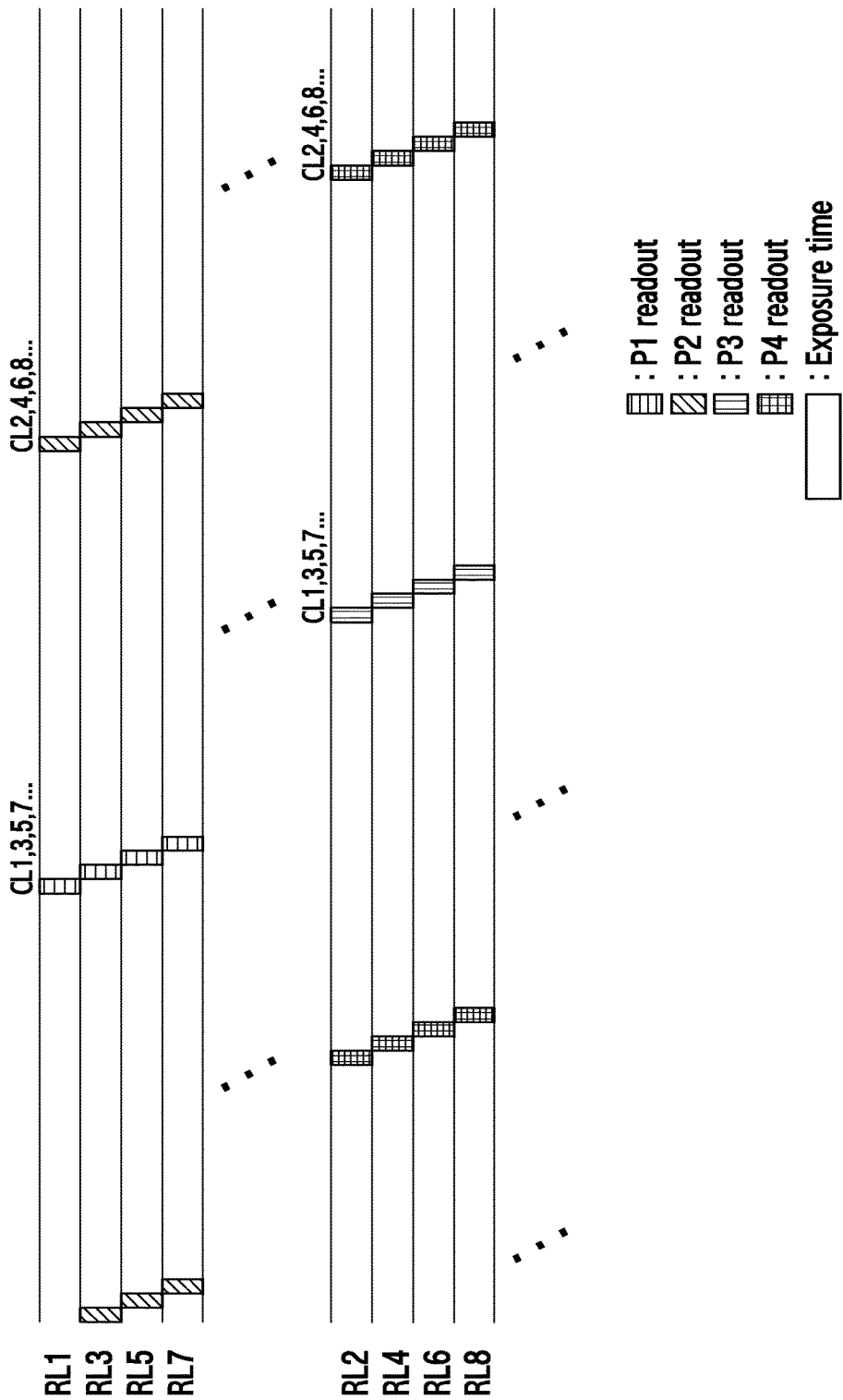

FIG. 8B illustrates an example of acquiring the first through the fourth sub-frame images by reading out in order of P1, P3, P2, and P4 parities.

The electronic device may activate exposure of the odd-numbered row lines (RL1, RL3, RL5, RL7, . . . ) in sequence and may continuously activate exposure of the even-numbered row lines (RL2, RL4, RL6, RL8, . . . ) after activating the exposure of the final odd-numbered row line (e.g., RL N-1). The P1 parities of the first sub-frames may be located in the odd-numbered column lines (CL1, CL3, CL5, CL7, . . . ) of the odd-numbered row lines (RL1, RL3, RL5, RL7, . . . ), and the P2 parities of the third sub-frames may be located in the even-numbered column lines (CL2, CL4, CL6, CL8, . . . ) of the odd-numbered row lines (RL1, RL3, RL5, RL7, . . . ). In addition, the P3 parities of the second sub-frames may be located in the odd-numbered column lines (CL1, CL3, CL5, CL7, . . . ) of the even-numbered row lines (RL1, RL4, RL6, RL8, . . . ), and the P4 parities of the fourth sub-frames may be located in the even-numbered column lines (CL2, CL4, CL6, CL8, . . . ) of the even-numbered row lines (RL2, RL4, RL6, RL8, . . . ).

When the exposure of the odd-numbered row lines (RL1, RL3, RL5, RL7, . . . ) ends in sequence, the electronic device may read out the P1 parities in the odd-numbered column lines (CL1, CL3, CL5, CL7, . . . ) of the odd-numbered row lines which have been exposed. When the readout of the P1 parities ends, the electronic device may activate the exposure of the odd-numbered row lines (RL1, RL3, RL5, RL7, . . . ) again in order to acquire the P2 parities in the next exposure period. When the P1 parities in the final odd-numbered row line is read out, the P1 parities read out in the odd-numbered column lines of the odd-numbered row lines may be the first sub-frame images.

The exposure of the first row line RL2 of the even-numbered row lines may end at the time that the P1 parities in the final odd-numbered row line are read out. When the exposure of the even-numbered row lines (RL2, RL4, RL6, RL8, . . . ) end in sequence, the electronic device may read out the P3 parities in the odd-numbered column lines (CL1, CL3, CL5, CL7, . . . ) of the even-numbered row lines which have been exposed. When the readout of the P3 parities ends, the electronic device may activate the exposure of the even-numbered row lines (RL2, RL4, RL6, RL8, . . . ) again in order to acquire the P4 parities in the next exposure period. When the P3 parities in the final even-numbered row line are read out, the P3 parities read out in the odd-numbered column lines of the even-numbered row lines may be the second sub-frame images.

The exposure of the first row line of the odd-numbered row lines may end at the time that the P3 parities in the final even-numbered row line are read out. When the exposure of the odd-numbered row lines (RL1, RL3, RL5, RL7, . . . ) end in sequence, the electronic device may read out the P2 parities in the even-numbered column lines (CL2, CL4, CL6, CL8, . . . ) of the odd-numbered row lines which have been exposed. When the readout of the P2 parities ends, the electronic device may activate the exposure of the odd-numbered row lines (RL1, RL3, RL5, RL7, . . . ) again in order to acquire the P1 parities in the next exposure period. When the P2 parities in the final odd-numbered row line are read out, the P2 parities read out in the even-numbered column lines of the odd-numbered row lines may be the third sub-frame images.

The exposure of the first row line of the even-numbered row lines may end at the time that the P2 parities in the final odd-numbered row line are read out. When the exposure of the even-numbered row lines (RL2, RL4, RL6, RL8, . . . ) end in sequence, the electronic device may read out the P4 parities in the even-numbered column lines (CL2, CL4, CL6, CL8, . . . ) of the even-numbered row lines which have been exposed. When the readout of the P4 parities ends, the electronic device may activate the exposure of the even-numbered row lines (RL2, RL4, RL6, RL8, . . . ) again in order to acquire the P3 parities in the next exposure period. When the P4 parities in the final even-numbered row line are read out, the P4 parities read out in the even-numbered column lines of the even-numbered row lines may be the fourth sub-frame images.

Figure 8C:
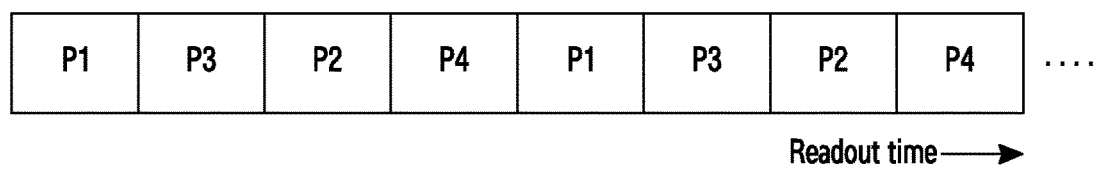

FIG. 8C illustrates an example of the sub-frame images which are acquired by the exposure and the readout illustrated in FIG. 8B.

Referring to FIG. 8C, the electronic device acquires the first sub-frame images by reading out the P1 parities in the odd-numbered row lines of the pixel array. When reading out the P1 parities, the electronic device may not read out the P2 parities. After acquiring the first sub-frame images by reading out the P1 parities, the electronic device acquires the second sub-frame images by reading out the P3 parities in the even-numbered row lines. The electronic device may not read out the P4 parities in the even-numbered row lines. After acquiring the second sub-frame images, the electronic device acquires the third sub-frame images by reading out the P2 parities in the odd-numbered row lines of the pixel array. When reading out the P2 parities, the electronic device may not read out the P1 parities. After acquiring the third sub-frame images by reading out the P2 parities, the electronic device acquires the fourth sub-frame images by reading out the P4 parities in the even-numbered row lines. The electronic device may not read out the P3 parities in the even-numbered row lines.

The electronic device may continuously acquire the first through the fourth sub-frame images by repeating the above-described operations.

Figure 8D:
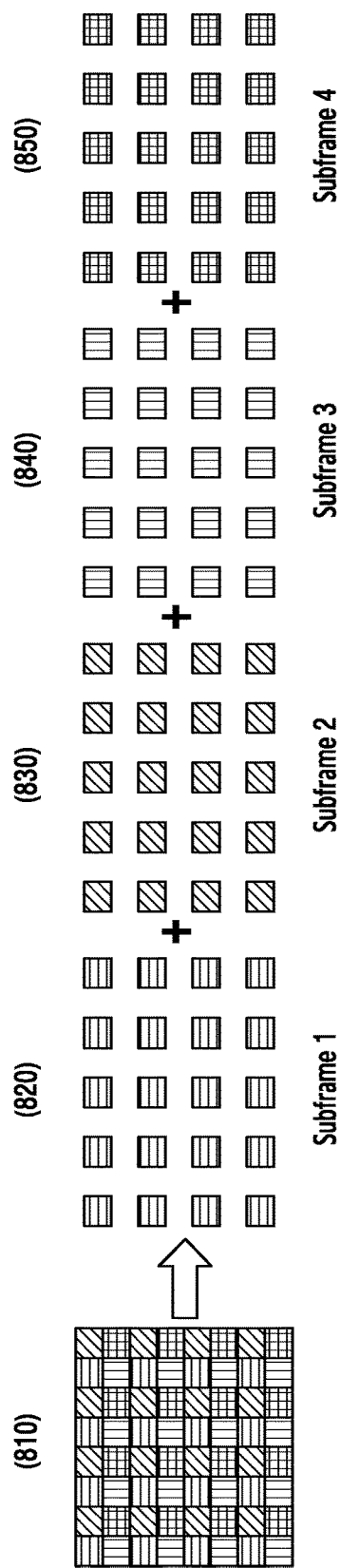

When the image sensor illustrated in FIG. 8A uses the sub-sampling method as illustrated in FIGS. 8B and 8C, the image sensor may acquire the sub-frame images illustrated in FIG. 8D.

In FIG. 8D, an image 810 is a full-resolution image of the image sensor. The electronic device may acquire four sub-frame images 820, 830, 840, and 850 by sampling the full-resolution image 810 two times in the row direction and sampling two times in the column direction as illustrated in FIGS. 8B to 8D. The resolution of each of the sub-frame images 820, 830, 840, and 850 may be ¼ of the resolution of the full resolution image 810 of the image sensor, and the frame rate of the sub-frame images may be four times the frame rate of the full-resolution image 810 of the image sensor. In addition, the sub-frame images 820, 830, 840, and 850 may be acquired at different readout timings as illustrated in FIG. 8D, and may be acquired at spatially different locations of the image sensor.

Figure 9:
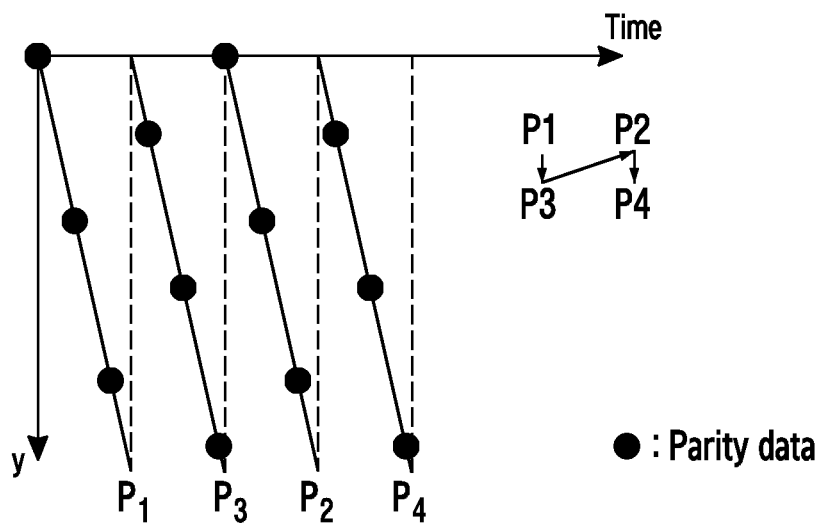
FIG. 9 illustrates a method for reading out parities of sub-frame images in an electronic device according to an embodiment of the present disclosure.

FIG. 9 illustrates a method of reading out parities of sub-frame images in an electronic device according to an embodiment of the present disclosure.

Referring to FIG. 9, when acquiring a plurality of sub-frame images by sub-sampling the image sensor, the electronic device may read out the sub-frame images while selecting row lines in sequence. The electronic device may read out the sub-frame images in a zigzag pattern (i.e., a staggered readout) as illustrated in FIG. 9. The sub-frame images acquired may be images which are different in time and space as illustrated in FIG. 8D. Accordingly, the sub-frame images may be read out in the order in FIG. 9, which may reduce an amount of skew by ½ in comparison to normal methods. An optical flow-based correction method for a skew-free image may use a similar method to normal methods.

FIG. 10 illustrates a method of reading out 16 sub-frame images in an electronic device according to an embodiment of the present disclosure. Specifically, FIG. 10 illustrates an example in which the number of samplings in the row direction is 4 (m=4) and the number of samplings in the column direction is 4 (n=4).

Referring to FIG. 10, P1-P16 are basic units for forming respective sub-frame images in the image sensor. A processor may acquire 16 sub-frame images (i.e., 16-field sub-sampled images). For example, four parities may be arranged in one row line and four parities may be arranged in one column line. That is, 16 parities may be arranged in four row lines and in four column lines. When acquiring an image form the image sensor, the processor may acquire 16 sub-frame images by controlling a readout time and an exposure time (or exposure length) on an RL basis and on a CL basis.

The electronic device may acquire the sub-frame images by selecting parities located in the row lines in sequence. For example, at a time of acquiring the first sub-frame images, the electronic device may acquire the first sub-frame images by reading out pixel data at the intersections of the row lines where the P1 parities are located (RL1, RL5, RL9, . . . ) and the column lines where the P1 parities are located (CL1, CL5, CL9, . . . ). At a time of acquiring the second sub-frame images, after acquiring the first sub-frame images, the electronic device may acquire the second sub-frame images by reading out pixel data at the intersections of the row lines where the P2 parities are located (RL1, RL5, RL9, . . . ) and the column lines where the P2 parities are located (CL2, CL6, CL10, . . . ). At a time of acquiring the third sub-frame images, after acquiring the second sub-frame images, the electronic device may acquire the third sub-frame images by reading out pixel data at the intersections of the row lines where the P3 parities are located (RL1, RL5, RL9, . . . ) and the column lines where the P3 parities are located (CL3, CL7, CL11, . . . ). At a time of acquiring the fourth sub-frame images, after acquiring the third sub-frame images, the electronic device may acquire the fourth sub-frame images by reading out pixel data at the intersections of the row lines where the P4 parities are located (RL1, RL5, RL9, . . . ) and the column lines where the P4 parities are located (CL4, CL8, CL12, . . . ).

At a time of acquiring the fifth sub-frame images, after acquiring the fourth sub-frame images, the electronic device may acquire the fifth sub-frame images by reading out pixel data at the intersections of the row lines where the P5 parities are located (RL2, RL6, RL10, . . . ) and the column lines where the P5 parities are located (CL1, CL5, CL9, . . . ). In this way, the electronic device may acquire the sixth through the sixteenth sub-frame images by reading out pixel data in the row lines and the column lines where the P6-P16 parities are located at times of acquiring the sub-frame images.

When the sub-frame images are acquired in this way, the P1-P16 parities may be acquired as the first through the sixteenth sub-frame images, respectively. In addition, the sub-frame images may be acquired in the column direction in order to reduce skew. For example, when the sub-frame images are acquired, the first through the sixteenth sub-frame images may be acquired by reading out parities in order of P1, P5, P9, P13, P2, P6, P10, P14, P3, P7, P11, P15, P4, P8, P12, and P16 (i.e., a staggered readout). The order of acquiring the sub-frame images may be generated in various combinations in addition to the above-described methods.

When the parities are set as illustrated in FIG. 10, the electronic device may acquire the 16 sub-frame images in various patterns. When P1-P16 parities are included as illustrated in FIG. 10, the electronic device may acquire the 16 sub-frame images by sampling four times in the row direction and sampling four times in the column direction. The resolution of each of the 16 sub-frame images may be 1/16 of the resolution of the full-resolution image of the image sensor 420, and the frame rate of the sub-frame images may be 16 times the frame rate of the full-resolution image of the image sensor. In addition, the 16 sub-frame images may be acquired at different readout timings and may be acquired at spatially different locations of the image sensor.

Figure 11:
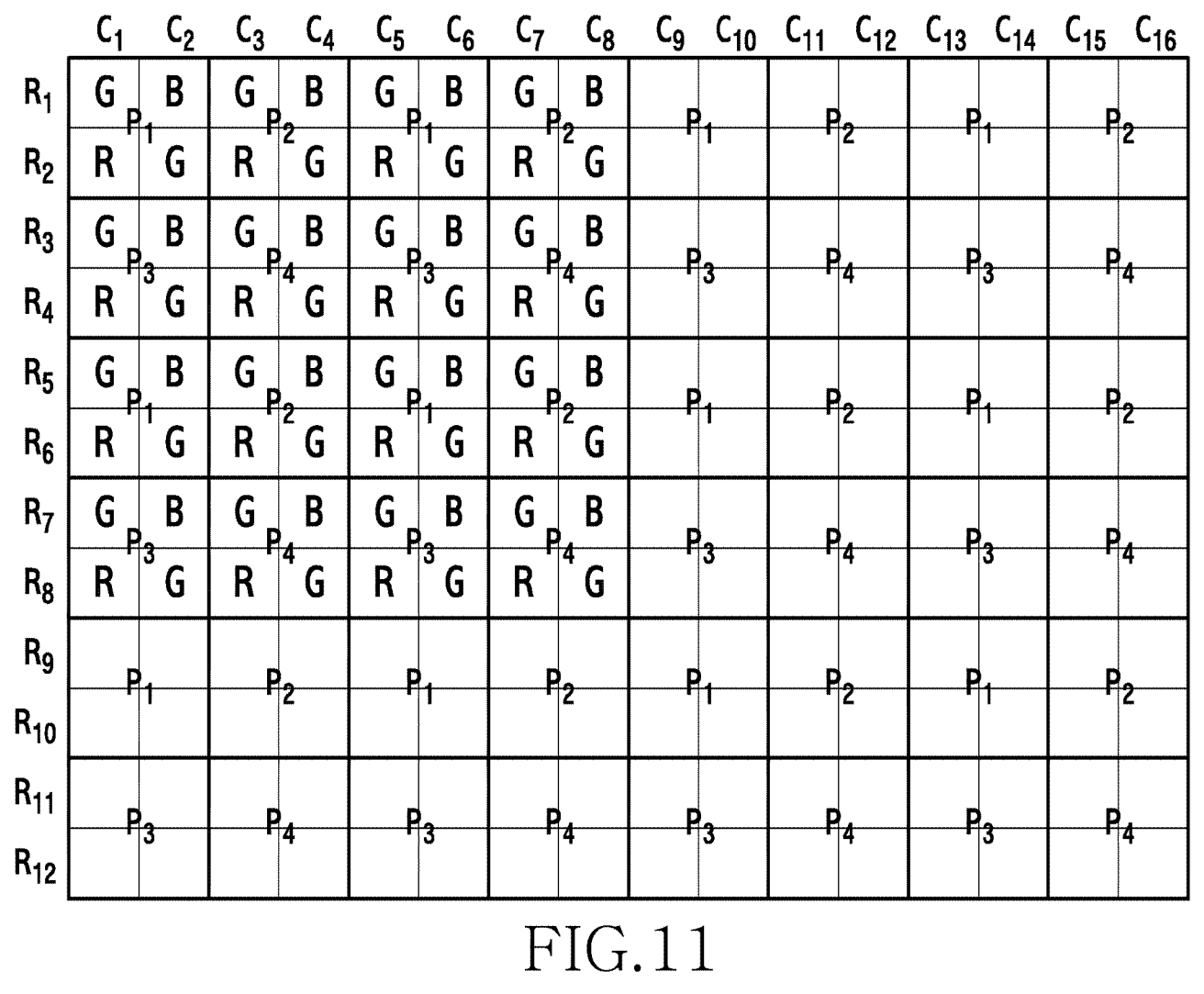

FIG. 11 illustrates a method of acquiring a plurality of sub-frame images in an electronic device including an image sensor of a Bayer pattern according to an embodiment of the present disclosure.

Referring to FIG. 11, the image sensor may have as many cells as the number of pixels and have R, G, B color filters arranged on the cells in a specific pattern. The R filter of the image sensor may be an optical filter that passes only red color, the G filter may be an optical filter that passes only green color, and the B filter may be an optical filter that passes only blue color. Only one of the R, G, B filters may be connected to one sensor cell, and one pixel may detect only one color of the R, G, B colors. The image sensor 420 may have the R, G, and B filters arranged in a regular pattern, and the R, G, B filters may be arranged to intersect in a Bayer pattern in consideration of visual characteristics of human beings, such that G occupies 50% and R and B occupy 25%. The image sensor may detect only one color of R, G, and B colors at each pixel, but a displayed image may display all of the R, G, B colors on every pixel.

The electronic device may acquire a plurality of sub-frames by sub-sampling the row lines and the column lines of the image sensor. When the image sensor of the Bayer pattern is used, one parity may include at least one R pixel, at least one G pixel, and at least one B pixel.

According to an embodiment of the present disclosure, the basic unit of the parity may include four pixels, i.e., R, G, and 2G pixels, as illustrated in FIG. 11.

More Specifically, FIG. 11 illustrates an example of the image sensor for acquiring four sub-frame images.

Referring to FIG. 11, from among the pixels located within the R1-R8 row lines and the C1-C8 column lines, four neighbor pixels located at the intersections of the R1, R2, R5, and R6 row lines and the C1, C2, C5, and C6 column lines may be P1 parities, four neighbor pixels located at the intersections of the R1, R2, R5, and R6 row lines and the C3, C4, C7, and C8 column lines may be P2 parities, four neighbor pixels located at the intersections of the R3, R4, R7, and R8 row lines and the C1, C2, C5, and C6 column lines may be P3 parities, and four neighbor pixels located at the intersections of the R3, R4, R7, and R8 row lines and the C3, C4, C7, and C8 column lines may be P4 parities.

The P1-P4 parities may be basic units for forming the sub-frame images. The configuration of FIG. 11 may be an example in which the number of samplings in the row direction is 2 (m=2) and the number of samplings in the column direction is 2 (n=2). The electronic device may acquire four sub-frame images (i.e., 4-field sub-sampled images). For example, P1 may be the parities of the first sub-frame images, P3 may be the parities of the second sub-frame images, P2 may be the parities of the third sub-frame images, and P4 may be the parities of the fourth sub-frame images.

The electronic device may acquire pixel data on a parity basis. When acquiring the first sub-frame image, the electronic device may read out R, G, B pixels belonging to the P1 parity. R1 and R2, R3 and R4, R5 and R6, R7 and R8, R9 and R10, and R11 and R12 in FIG. 11 may correspond to RL1, RL2, RL3, RL4, RL5, and RL6 of FIG. 8A, respectively. C1 and C2, C3 and C4, C5 and C6, C7 and C8, C9 and C10, and C11 and C 12 of FIG. 11 may correspond to CL1, CL2, CL3, CL4, CL5, and CL6 of FIG. 8A, respectively.

When acquiring the first sub-frame image, the electronic device may read out R, G, and B data forming the P1 parity. For example, when reading out the P1 parities, the electronic device may expose R1 and R2, R5 and R6, and R9 and R10. In addition, when reading out the P1 parities in the R1 row line, the electronic device may read out G and B pixel data of C1 and C2, C5 and C6, C9 and C10, and C13 and C14, and, when reading out the P1 parities in the R2 row line, the electronic device may read out R and G pixel data of C1 and C2, C5 and C6, C9 and C10, and C13 and C14.

Figure 12:
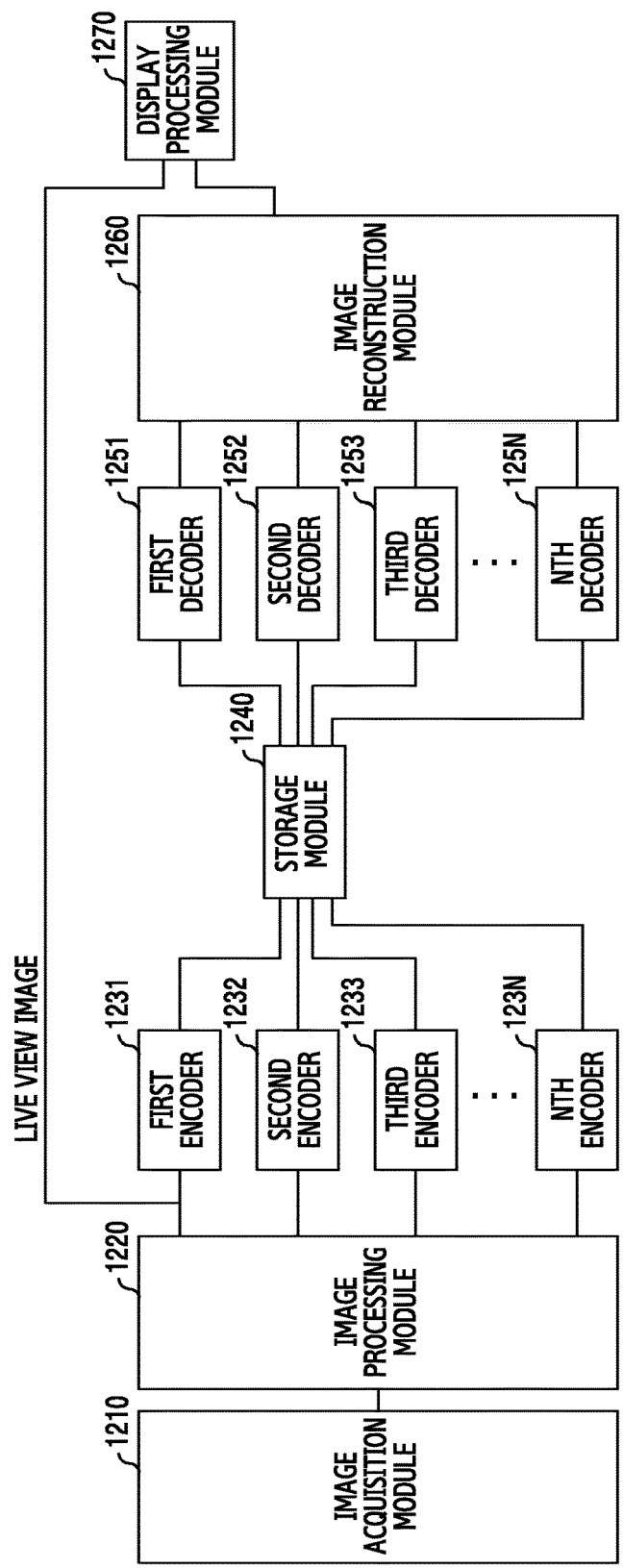
FIG. 12 illustrates an electronic device acquiring a plurality of sub-frame images and reconstructing images according to an embodiment of the present disclosure.

FIG. 12 illustrates an electronic device acquiring a plurality of sub-frame images and reconstructing images according to an embodiment of the present disclosure.

Referring to FIG. 12, the electronic device includes an image acquisition module 1210, an image processing module 1220, encoders 1231-123N, a storage module 1240, decoders 1251-125N, an image reconstruction module 1260, and a display processing module 1270. The image acquisition module 1210 may acquire a plurality of sub-frame images by sub-sampling row lines and column lines of the image sensor according to a set pattern. The image acquisition module 1210 may include a timing controller (e.g., the timing controller 610 of FIG. 6). The sub-frame images may be pixel images corresponding to pixel sets which are set in the whole area of the image sensor. The image acquisition module 1210 may generate the plurality of sub-frame images (i.e., multi-field sub-sampled data) by controlling an exposure time (length) and a readout time on a row and column basis of the image sensor according to a set sampling pattern.

The image processing module 1220 may perform image signal processing with respect to the plurality of sub-frame images acquired in the image acquisition module 1210. The image processing module 1220 may include an image pre-processor and an image post-processor.

An image pre-processing operation of the image processing module 1220 may perform AWB, AE, AF extraction and processing, lens shading correction, dead pixel correction, knee correction, etc., with respect to the sub-frame images. An image post-processing operation of the image processing module 1220 may perform a color interpolation operation with respect to the image pre-processed sub-frame images through a color interpolator, may perform noise removal, color correction, etc., with respect to the color-interpolated sub-frame images through an IPC, and may convert RGB data into YUV data through a color converter.

The image processing module 1220 may output a set sub-frame image from among the plurality of sub-frame images to the display as a live view (or preview) image. In addition, the image processing module 1220 may use the set sub-frame image from among the plurality of sub-frame images to control a camera module including the image sensor and/or the image processing module 1220 (e.g., AF, AE, AWB, IPC, face detection, object tracking, etc.).

As many encoders 1231-123N as the number of sub-frame images acquired in the image acquisition module 1210 may be provided. The encoders 1231-123N may respectively encode the corresponding sub-frame images.

The storage module 1240 may independently store the plurality of sub-frame images encoded by the encoders 1231-123N. The storage module 1240 may store the plurality of sub-frame images in the memory 410 or in an independent buffer.

As many decoders 1251-125N as the number of sub-frame images acquired in the image acquisition module 1210 may be provided. The decoders 1251-125N may decode the encoded sub-frame images that are read out in the storage module 1240.

The image reconstruction module 1260 may reconstruct high-resolution images from the sub-frame images decoded in the decoders 1251-125N. The image reconstruction module 1260 may estimate motion information based on a current sub-frame image and a previous sub-frame image that is obtained based on the same location as the current sub-frame image (e.g., a reference sub-frame image), may estimate pixels of other sub-frame images that are not sampled based on the estimated motion information, and may reconstruct images by deinterlacing the estimated pixels with respect to the current sub-frame image.

The display processing module 1270 may process the high-resolution images reconstructed in the image reconstruction module 1260 according to a set mode, and display the high-resolution images on the display and may store the high-resolution images in the memory. The set mode of the display processing module 1270 may be a still image processing mode (e.g., best photo processing), a burst shot mode, a video processing mode (e.g., high speed video capture), a zooming mode (e.g., high quality digital zooming), an HDR processing mode (e.g., a high speed HDR), etc.

Figure 13:
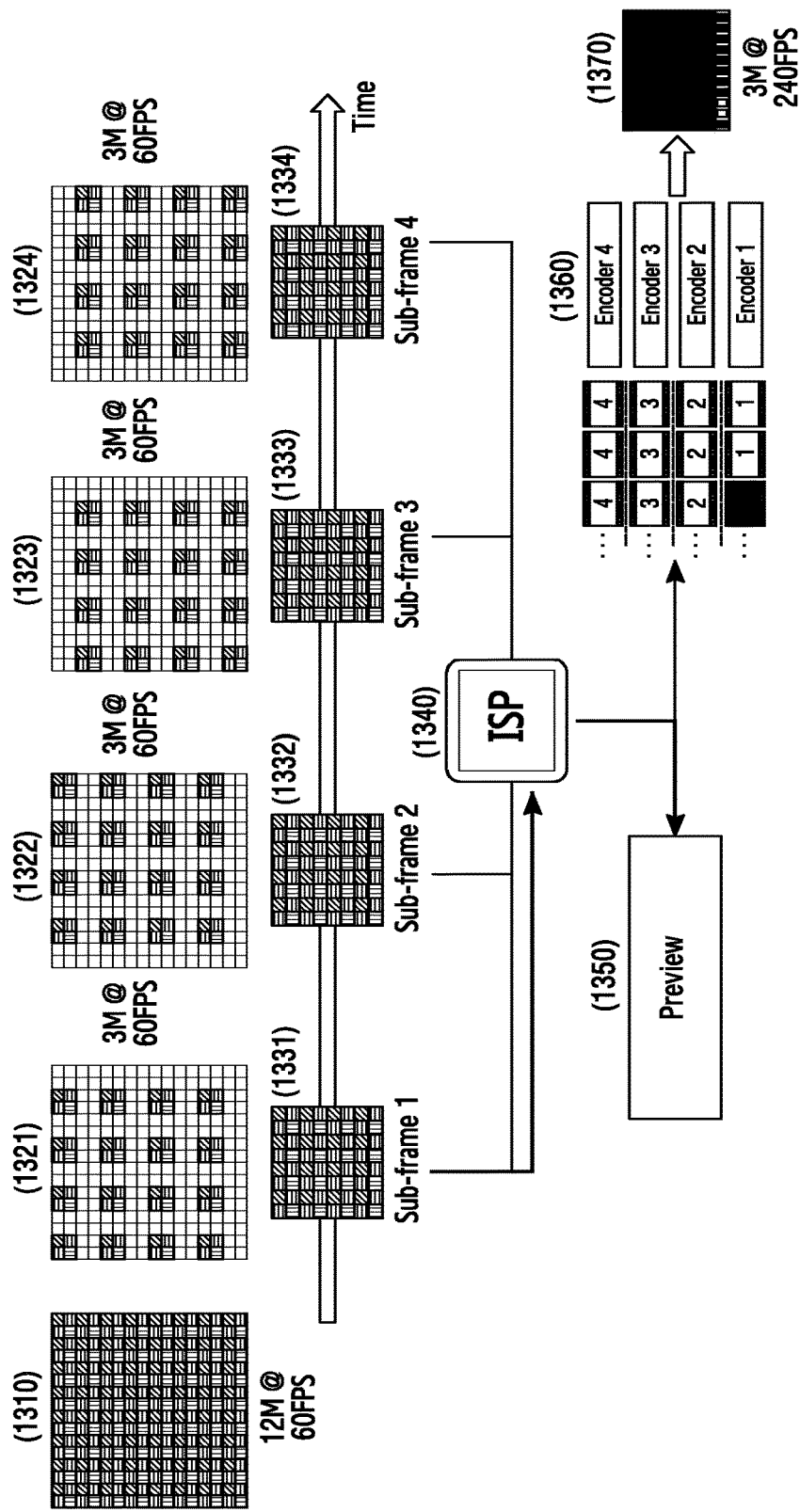
FIG. 13 illustrates a method for acquiring sub-frame images and reconstructing high-resolution images in the electronic device illustrated in FIG. 12.

FIG. 13 illustrates a method for acquiring sub-frame images and reconstructing high-resolution images in the electronic device illustrated in FIG. 12. Specifically, FIG. 13 illustrates an example of a multi-field image data acquisition step in four fields.

Referring to FIG. 13, the image acquisition module 1210 may acquire a plurality of sub-frame images by sub-sampling the image sensor in the row direction and the column direction according to a coding sequence (i.e., a readout sequence). For example, the image sensor may acquire an image of a 12 M resolution at 60 fps, and the image acquisition module 1210 may acquire four sub-frame images. The image sensor may have a pixel array having a pattern as indicated by reference numeral 1310, and the sub-frame images acquired in the image acquisition module 1210 may be formed as indicated by reference numerals 1321-1324. Each of the sub-frame images 1321-1324 may not sample pixels of the other sub-frame images. For example, in the frame image 1310 of the image sensor, the sub-frame image 1321 may be acquired without sampling pixels of the other sub-frame images 1322-1324, the sub-frame image 1322 may be acquired without sampling pixels of the other sub-frame images 1321, 1323, and 1324, the sub-frame image 1323 may be acquired without sampling pixels of the other sub-frame images 1321, 1322, and 1324, and the sub-frame image 1324 may be acquired without sampling pixels of the other sub-frame images 1321-1323.

The sub-frame images 1321-1324 may be acquired as sub-frame images indicated by reference numerals 1331-1334 and may be processed in an ISP 1340. When the full resolution image of the image sensor is 12M/60 fps, each of the sub-frame images 1331-1334 may be 3M/60 fps. The ISP 1340 may be an image processing module (e.g., the image processing module 720). The ISP 1340 may display one of the sub-frame images 1331-1334 as a preview image 1350, and may use one of the sub-frame images 1331-1334 as an image for controlling the function of the image sensor.

The sub-frame images processed in the ISP 1340 may be respectively encoded in corresponding encoders 1360, and then may be stored in the memory. The sub-frame images stored in the memory may be independently stored. The sub-frame memories stored in the memory may be 3M/240 fps 1370.

When a 4-field sub-sampled process is performed in the image sensor, which is able to capture an image at 12M@60 fps, the electronic device may acquire four sub-sampled images of 3M@60 fps. The electronic device may acquire an image of 3M@240 fps and may reconstruct an image of 12M@240 fps by performing a high-resolution reconstruction operation.

Figure 14:
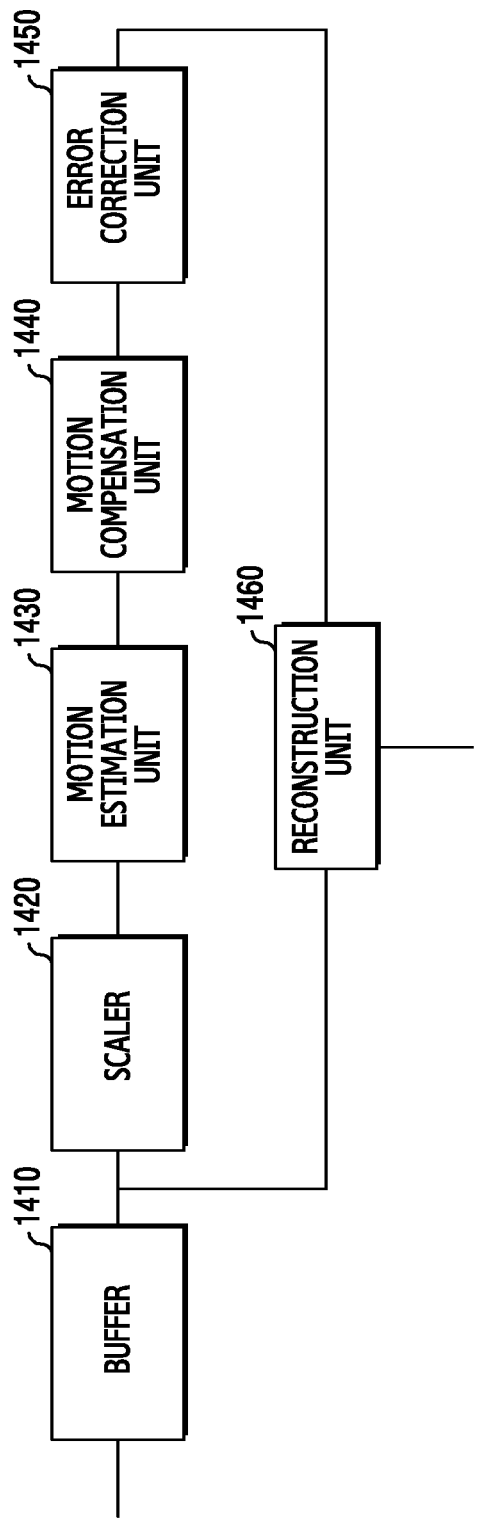
FIG. 14 illustrates an image reconstruction module for reconstructing high-resolution images in an electronic device according to an embodiment of the present disclosure.
Figure 15A:
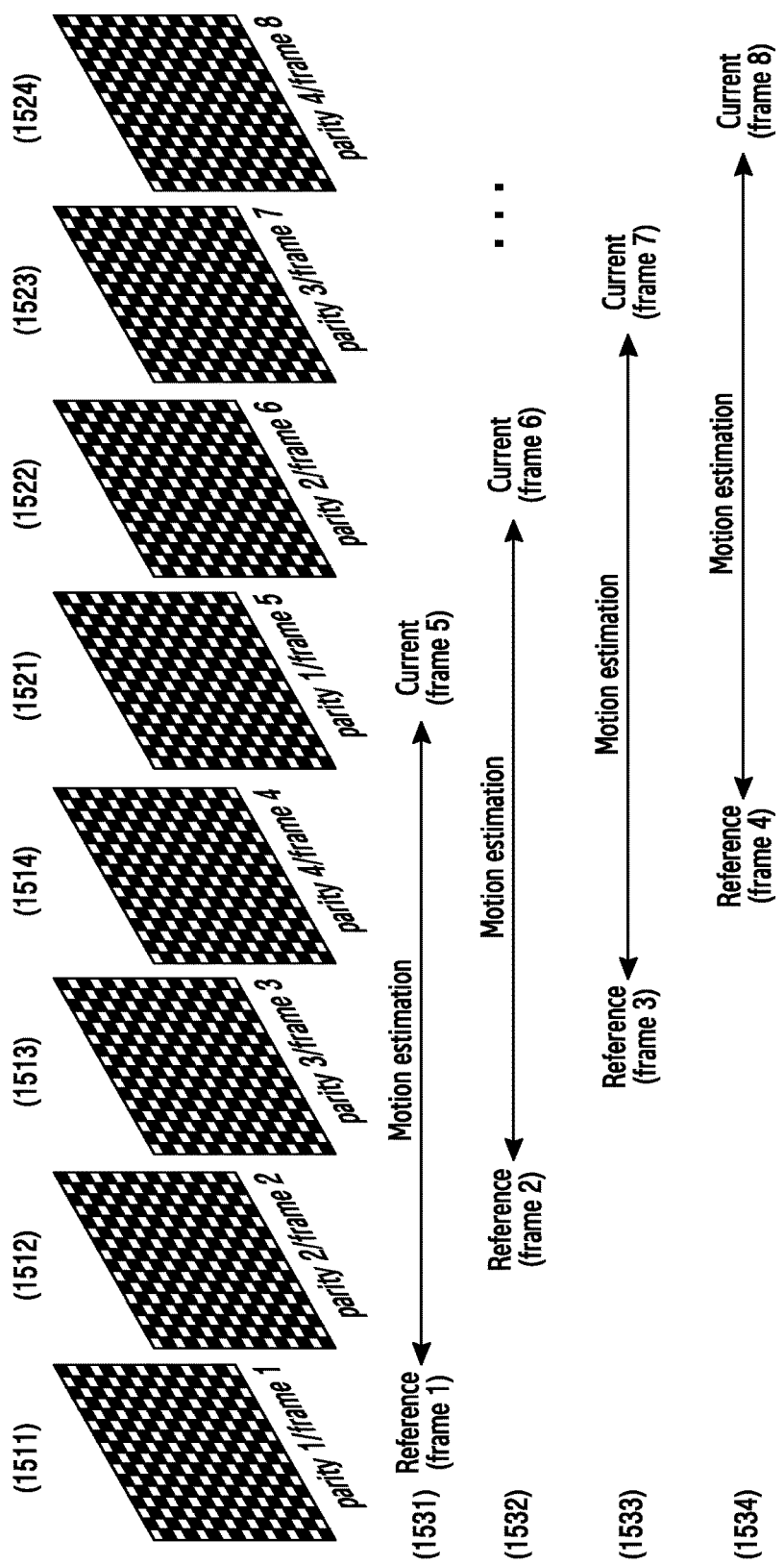
FIG. 15A illustrates estimating an amount of a motion between sub-frame images acquired at different times.
Figure 15B:
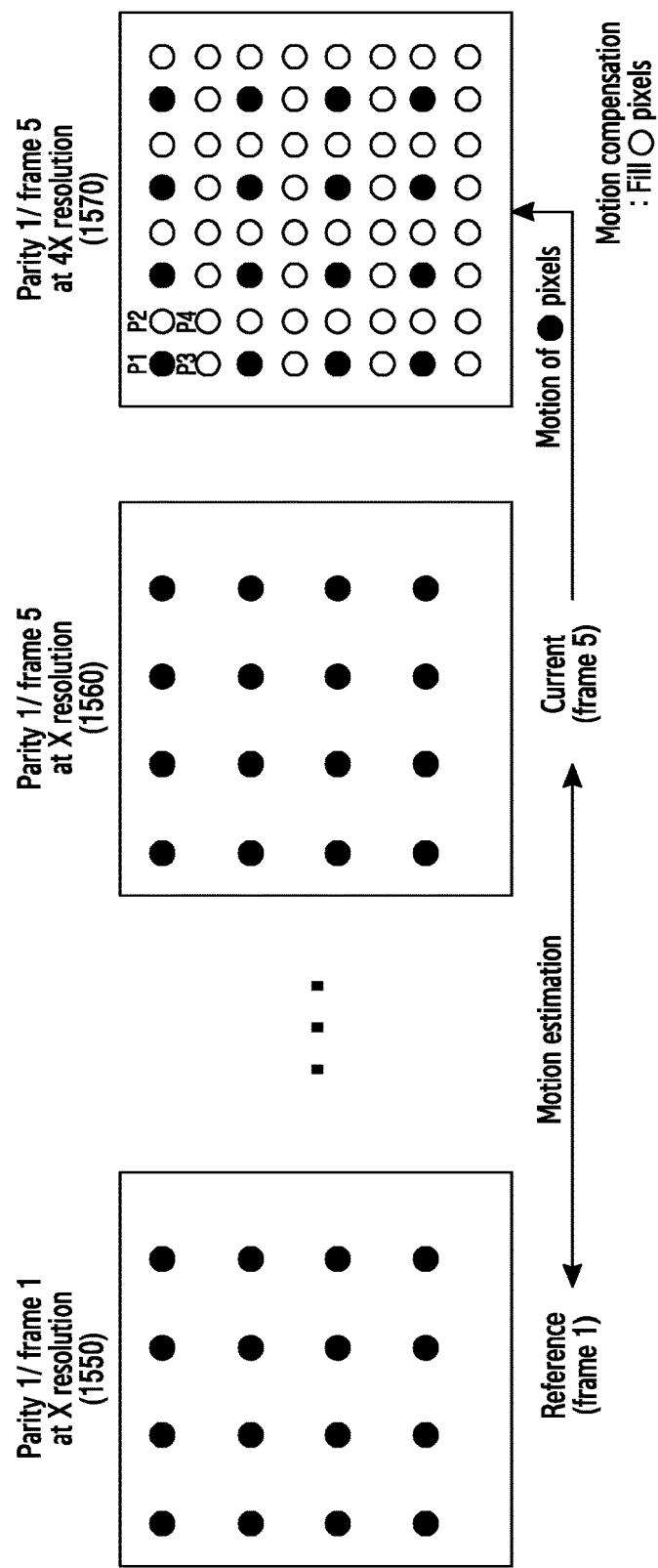
FIG. 15B illustrates interpolating non-sampled pixels by using pixel motion information acquired by estimating a motion.

FIG. 14 illustrates an image reconstruction module for reconstructing a high-resolution image in an electronic device according to an embodiment of the present disclosure. FIG. 15A illustrates estimating an amount of a motion between sub-frame images acquired at different times. FIG. 15B illustrates interpolating non-sampled pixels by using pixel motion information acquired by estimating a motion.

Referring to FIG. 14, the image reconstruction module of the electronic device includes a buffer 1410, a scaler 1420, a motion estimation unit 1430, a motion compensation unit 1440, an error correction unit 1450, and a reconstruction unit 1460.

The image reconstruction module may detect motion information between sub-frame images based on the same parity of a current frame and a previous frame (e.g., a parity P1 of the current frame and a parity P1 of the previous frame, and a parity P2 of the current frame and a parity P2 of the previous frame, . . . ) in order to reconstruct an image of a maximum resolution of the image sensor from the sub-frame images. The image reconstruction module may detect motion information between the sub-frame images of the same parity. The image reconstruction module may calculate an amount of an interpolated motion of other parities between the same parities (e.g., pixels of the other sub-frame images which are not sampled when the sub-frame images are acquired, intermediate sub-sampled data having other parities).

Referring to FIG. 15B, a frame 5 to be reconstructed may be sub-frames which are acquired by a real sensor from pixels corresponding to a readout pattern of a parity P1, and, in order to reconstruct a maximum resolution image in the frame 5, values of pixels corresponding to the other parities P2, P3, and P4, which are not read out, are estimated. To achieve this, the image reconstruction module may reconstruct the maximum resolution image of the image sensor from the sub-frame images by performing pixel-interpolation with respect to the sub-frame images based on the motion information and the calculated amount of the motion (motion compensated deinterlacing).

Motion information between the sub-frame 1 and the sub-frame 5 having the readout pattern of the same parity P1 is calculated first. Thereafter, motion information between the frame 2, the frame 3, the frame 4 and the frame 5 is estimated based on the prior motion information. When an amount of a motion between the frame 5 and the frame 1 at a pixel location of (x,y) is (dx,dy) with reference to the frame 5, the amount of the motion between the other frames may be linearly estimated as (3*dx/4, 3*dy/4) between the frame 5 and the frame 2, (2*dx/4, 2*dy/4) between the frame 5 and the frame 3, and (dx/4, dy/4) between the frame 5 and the frame 4. Other methods of estimating a motion may be used in addition to the linear estimation method. By utilizing the above-described information, the pixel values at the locations of parities P2, P3, and P4, which are not read out at the maximum resolution of the frame 5 to be reconstructed, may be filled by taking the pixel values of the motion-compensated locations of the frame 2, the frame 3, and the frame 4.

When real numbers are considered in addition to natural numbers for the motion-compensated locations, pixel values interpolated based on neighbor values may be filled in the maximum resolution image of the frame 5. The image reconstruction module may apply a deinterlacing technique (e.g., motion and edge adaptive deinterlacing) in order to reduce an artifact occurring at an inner edge of an image and to enhance performance (e.g., motion blur, skew artifact, etc.) when reconstructing the high-resolution image.

Referring again to FIG. 14, the buffer (N-field buffer) 1410 may be a memory that stores the plurality of sub-frame images. In addition or alternatively, the buffer 1410 may use a buffer which is independent from the memory. The buffer 1410 may store a current sub frame and a previous sub frame which is the same as the current sub frame when reconstructing the high-resolution images from the sub-frame images, and may store the other sub-frame images, which are not sampled when the current sub-frame image is acquired. The image reconstruction module may infer a correlation (e.g., motion information) between the frames by using the plurality of sub-frame memories.

The scaler (e.g., a multi-scale pyramid generator) 1420 may scale the resolution of the sub-frame image. When calculating the motion of the sub-frame image, the image reconstruction module may use input information of an original input resolution, but may consider calculation of a motion based on pyramid scaling (e.g., pyramid multi-resolution) in order to enhance a speed or accuracy of calculation. The scaler 1420 may represent and analyze the sub-frame images in multiple scales (e.g., a multi-scale representation). The method of analyzing an image in multiple scales may generate an image pyramid (e.g., a series of image sets generated by reducing a scale) by changing (e.g., reducing) the size of the image in phases and analyzing the image. The scaler 1420 may generate the image pyramid.

The motion estimation unit 1430 may estimate an amount of a motion between the same sub-frame (i.e., same parity frame) images. The motion estimation unit 1430 may calculate a motion based on a scale set by the scaler 1420.

Referring to FIG. 15A, with reference to four sub-frame images (i.e., 4 field subsampling image), the sub-frame image 1511 may be the same as the sub-frame image 1521, the sub-frame image 1512 may be the same as the sub-frame images 1522, the sub-frame image 1513 may be the same as the sub-frame image 1523, and the sub-frame image 1514 may be the same as the sub-frame image 1524, and a time of acquiring the sub-frame images may be a period of one frame of the image sensor. That is, the sub-frame images 1511-1514 may be images one frame before the sub-frame images 1521-1524. The sub-frame images 1511-1514 may be reference sub-frames for estimating motions of the corresponding sub-frames 1521-1524 as indicated by reference numerals 1531-1534.

The motion estimating operation will be described by way of an example of the sub-frame image 1521. The sub-frame image 1511 and the sub-frame image 1521 may be a frame pair having the same parity. The motion estimation unit 1430 may set the sub-frame image 1521 as a current frame and set the sub-frame image 1511 as a reference frame, and may calculate an amount of a motion of a pixel between the two sub-frame images. The amount of the pixel motion between the two sub-frame images may be calculated while updating the sub-frame images 1522-1524 of the current frame and the corresponding sub-frame images 1512-1514 of the reference frame. By repeating the above-described operation, the motion estimation unit 1430 may acquire a motion map corresponding to the resolution of the sub-frame image with respect to all times. By utilizing information such as a size of an area where a motion occurs, the motion estimation unit 1430 may distinguish between a global motion occurrence and a local motion occurrence. The image reconstruction module may apply a different motion compensation scheme according to a size of a motion area, a motion speed, etc.

The image reconstruction module may reconstruct the full resolution image of the image sensor from the sub-frame images through motion compensation. For example, when 4-field sub-sampled images are acquired, the image reconstruction module may reconstruct the full resolution image from the four sub-frame images through motion compensation. The motion compensation unit (e.g., a motion adaptive compensation unit) 1440 may estimate pixels of the other parity fields which are not sampled (i.e., skipped) based on the motion information estimated in the motion estimation unit 1430. The motion estimation unit 1430 may estimate motion information of pixels by comparing the reference sub-frame 1550 (e.g., a previous first sub-frame) and the current sub-frame 1560 (e.g., a current first sub-frame) of FIG. 15B, and the motion compensation unit 1440 may estimate pixel values of the other sub-frames (e.g., the second through the fourth sub-frame images) which are not sampled, by using the motion information of each pixel of the sub-frame 1560.

FIG. 15B illustrates the first sub-frame image to be reconstructed as the high-resolution image as an example of 4-field sub-sampled data.

Referring to FIG. 15B, the first sub-frame image may be acquired with a resolution of ¼ of the resolution of the image sensor. When the reference sub-frame image 1550 is acquired in a frame 1 section, frame 2-4 sections may be frame sections in which the second through the fourth sub-frame images are acquired, and a current frame section may be a frame 5. For example, the frame 5 may be the current first sub-frame image to be reconstructed as the high-resolution image. The first sub-frame image 1560 of FIG. 15B may include actually sampled pixels. The motion compensation unit 1440 may estimate pixels of locations of P2, P3, and P4, which are not sampled, by using motion information between the frames (i.e., parities P1 actually sampled when a readout is controlled), as shown in the sub-frame image 1570. The inter-frame motion information may be motion information between frames of the parity P1. The motion compensation unit 1440 may estimate pixels of the locations of the parity P2 through the parity P4, which are not sampled, by using the motion information between the frames of the parity P1.

Accordingly, the second through the fourth sub-frame images may be reconstructed as the high-resolution image. When the sub-frame images of the parity P2 are reconstructed as the high-resolution image, the electronic device may estimate pixel values of the parities P1, P3, and P4, which are not sampled, based on the P2 sub-frame images of the current and previous frames, and may reconstruct the high-resolution images by inserting the estimated pixel values into locations corresponding to the sub-frame images of the parity P2. When the sub-frame images of the parity P3 are reconstructed as the high-resolution image, the electronic device may estimate pixel values of the parities P1, P2, and P4, which are not sampled, based on the P3 sub-frame images of the current and previous frames, and may reconstruct the high-resolution images by inserting the estimated pixel values into locations corresponding to the sub-frame images of the parity P3.

When the sub-frame images of the parity P4 are reconstructed as the high-resolution image, the electronic device may estimate pixel values of the parities P1, P2, and P3, which are not sampled, based on the P4 sub-frame images of the current and previous frames, and may reconstruct the high-resolution images by inserting the estimated pixel values into locations corresponding to the sub-frame images of the parity P4. When the sub-frame images are acquired by 4 field sub-sampling as illustrated in FIG. 15B, the motion compensation unit 1440 may estimate values of pixels of the other parity fields, which are not sampled, by using motion information of each pixel, and may reconstruct an image having a resolution four times higher than that of the sub-sampled image at the time of processing the current sub-frame image.

The error correction unit (i.e., a motion and edge adaptive deinterlacing) 1450 may mitigate a motion compensation error that may occur during the motion compensation operation. The motion compensation error may occur in an area, e.g., an edge, of an image. The error correction unit 1450 may reduce an error that occurs in an edge area by applying an edge adaptive deinterlacing scheme. The error correction unit 1450 may extract directivity information of an edge in a local area including an interested pixel using an edge adaptive deinterlacing method, and may correct the result of the motion compensation so as to preserve the edge.

The reconstruction unit 1460 may reconstruct the high-resolution image. The reconstruction unit 1460 may reconstruct the high-resolution image by filling the sub-frame image to be reconstructed as the high-resolution image with the pixels of the other parity frames corrected by the error correction unit 1450.

In FIG. 14, the error correction unit 1450 may be omitted. Then, the reconstruction unit 1450 may reconstruct the high-resolution image by filling the current parity frame image with the pixels of the non-sampled parity frame images that are estimated by the motion compensation unit 1440.

For example, when sub-frame images are acquired by 4 field sampling, the image acquisition module may generate four parity frame images. Herein, the first through the fourth party frame images may be generated as four sub-frame images at a readout time of one frame of the image sensor, and their resolution may be ¼. Then, the image reconstruction module may estimate an amount of a pixel motion between corresponding parity frame images at different frame times, may estimate pixel values of the other parity frames by using the estimated amount of the pixel motion, and may reconstruct high-resolution images by inserting the estimated pixels of the other parity frames into the parity frame image. For example, when four sub-frame images are acquired by 4 field sub-sampling, the image reconstruction module may reconstruct the high-resolution image of four frames based on the high-resolution image of one frame.

Figure 16:
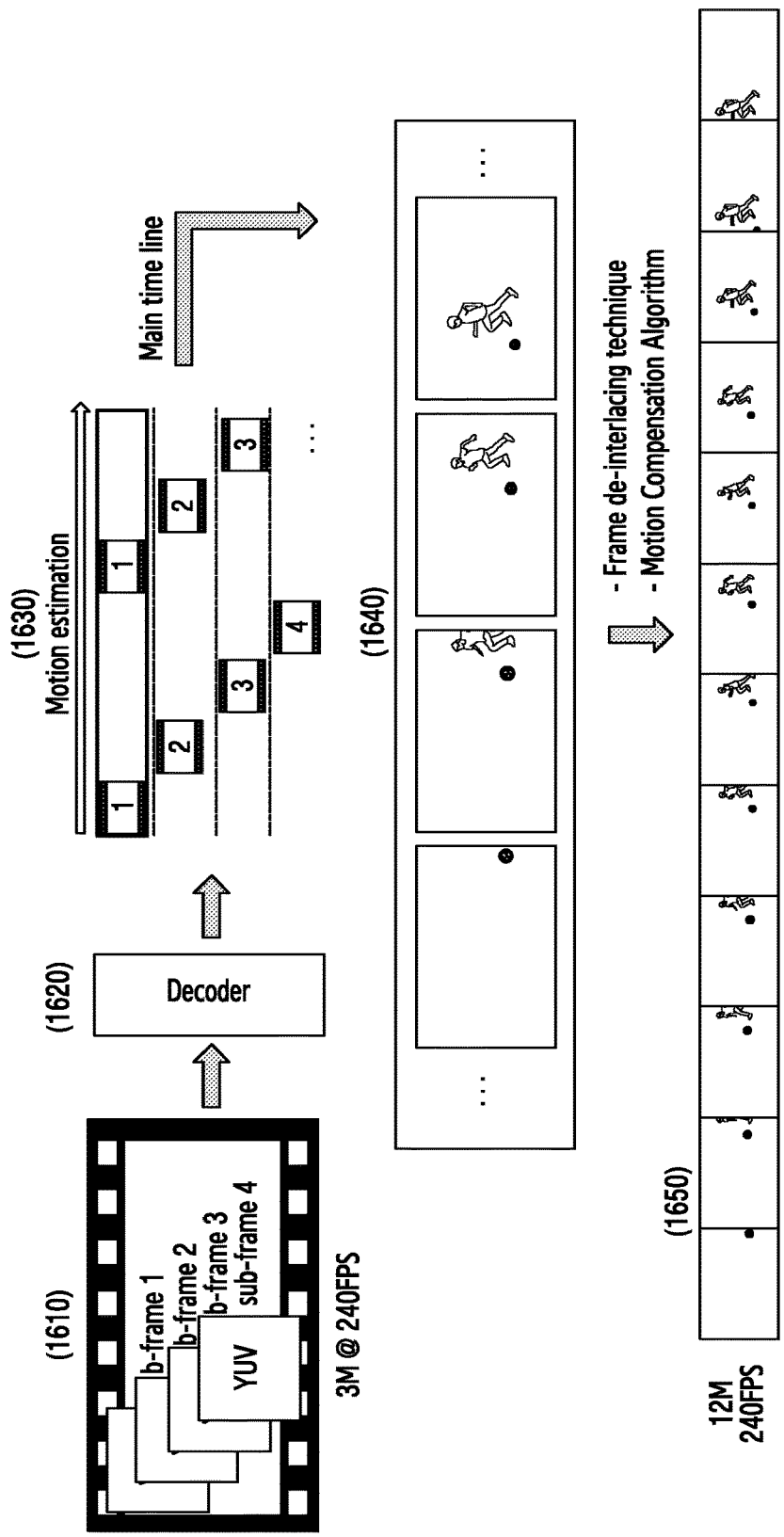
FIG. 16 illustrates a method of reconstructing and processing high-resolution images in an electronic device according to an embodiment of the present disclosure.

FIG. 16 illustrates a method of reconstructing and processing a high-resolution image in an electronic device according to an embodiment of the present disclosure. Specifically, FIG. 16 illustrates an example of acquiring four sub-frame images by four-field sub-sampling.

Referring to FIG. 16, four sub-frame images stored in the storage module may be sub-frame images that are acquired with a resolution of 3M at 240 fps. In order to reconstruct a high-resolution image, the electronic device may read the sub-frame images in operation 1610 and may decode the read sub-frame images in operation 1620. The image reconstruction module may estimate motion information of each of the sub-frame images and estimate pixel values of the other sub-frame images, which are not sampled, in operation 1630, and may reconstruct high-resolution images from the sub-frame images by filling the sub-frame images with the estimated pixels in operation 1640. By performing the image construction operation, the sub-frame images of 3M@240 fps read in operation 1610 may be reconstructed as the high-resolution images of 12M@240 fps in operation 1650.

The electronic device may process a sequence of the high-resolution images reconstructed as illustrated in FIG. 16 in various formats. For example, the electronic device may select a best photo image, generate a burst shot image, a video image, a digital zooming image, or an HDR image by using the high-resolution images generated in operation 1650.

The electronic device may acquire and store sub-frame images at a time of capturing, and then may reconstruct high-resolution images from the stored sub-frame images and process the high-resolution image. The electronic device may acquire sub-frame images and may reconstruct a high-resolution image sequence from the acquired sub-frame images at the time of capturing an image.

Figure 17:
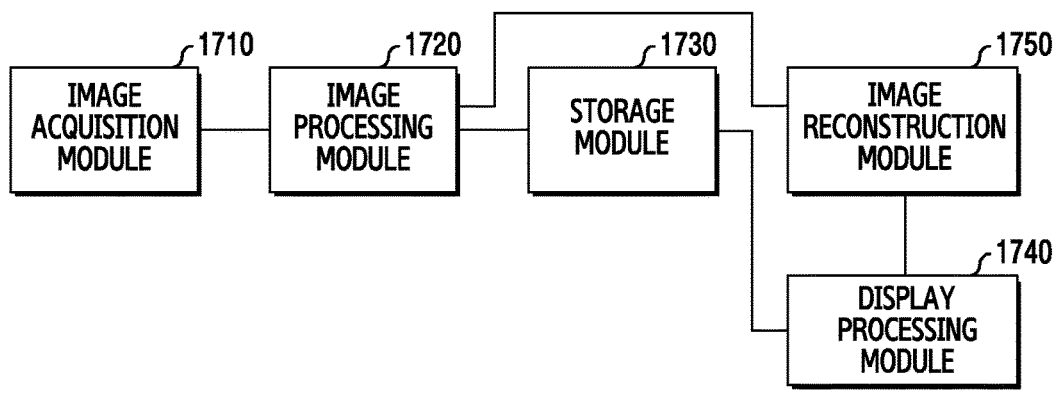
FIG. 17 illustrates an electronic device generating high-resolution images at a time of capturing an image according to an embodiment of the present disclosure.

FIG. 17 illustrates an electronic device generating a high-resolution image at a time of capturing an image according to an embodiment of the present disclosure.

Referring to FIG. 17, the electronic device includes an image acquisition module 1710, an image processing module 1720, an image reconstruction module 1730, a display processing module 1750, and a storage module 1740.

The image acquisition module 1710 may acquire a plurality of sub-frame images by controlling row lines and column lines of the image sensor according to a set pattern (i.e., an exposure and readout pattern). The image acquisition module 1710 may include a timing controller (e.g., the timing controller 610 of FIG. 6).

The sub-frame images may be pixel images corresponding to pixel sets which are set in the whole area of the image sensor. The image acquisition module 1710 may generate the plurality of sub-frame images (e.g., multi-field sub-sampled data) by controlling an exposure time (length) and a readout time on a row and column basis of the image sensor according to a set sampling pattern.

The image processing module 1720 may perform image signal processing with respect to the plurality of sub-frame images acquired in the image acquisition module 1710. The image processing module 1720 may perform an image pre-processing operation and an image post-processing operation. The image pre-processing operation may perform AWB, AE, AF extraction and processing, lens shading correction, dead pixel correction, knee correction, etc., with respect to the sub-frame images. The image post-processing operation may perform color interpolation, IPC, and color conversion with respect to the image pre-processed sub-frame images.

The image processing module 1720 may output a set sub-frame image from among the plurality of sub-frame images on the display as a live view (or preview) image. In addition, the image processing module 1720 may use the set sub-frame image from among the plurality of sub-frame images to control a camera module including the image sensor 420 and/or the image processing module 1720 (e.g., AF, AE, AWB, IPC, face detection, object tracking, etc.).

The image reconstruction module 1730 may reconstruct high-resolution images from the plurality of sub-frame images output from the image processing module 1720. The image reconstruction module 1730 may estimate a motion between a current sub-frame image and a previous sub-frame image (or reference sub-frame image) of the same parity as that of the current sub-frame image, and may estimate pixels of the other sub-frame images, which are not sampled, at a present time based on the estimated motion information. For example, the image reconstruction module 1730 may reconstruct the high-resolution images by deinterlacing the estimated pixels of the other sub-frame images with respect to the current sub-frame image. The image reconstruction module 1730 may generate as many high-resolution images as the number of the plurality of sub-frame images generated in a frame section of the image sensor.

The display processing module 1750 may generate new images by processing the high-resolution images reconstructed in the image reconstruction module 1730 according to an image processing technique selected by the user, and may display the new images on the display. The display processing module 1750 may generate a still image (e.g., a best photo image), a burst shot image, a video (e.g., high speed video capture), a zooming image (e.g., high quality digital zooming), an HDR (e.g., a high speed HDR), etc.

The storage module 1740 may store the high-resolution images processed in the display processing module 1750 in the memory.

The image acquisition module 1710 may acquire a plurality of sub-frame images (e.g., multi-field sub-sampled image data) by sub-sampling the image sensor according to a sequence of a set readout pattern. The image acquisition module 1710 may sub-sample pixel images in the row and column lines of the image sensor. The acquired sub-frame images may be images acquired at spatially different locations of the image sensor. For example, each of the four sub-frame images (or 4-field sub-sampled image data) may have a resolution of ¼ of the maximum resolution (or full resolution) of the image sensor. When the number of sub-frame images increases, fps of the sub-frame images may increase and the resolution thereof may be reduced.

The image processing module 1720 may image-process the sub-frame images acquired in the image acquisition module 1710 through an image pre-processor and an image post-processor. In addition, a set sub-frame image from among the plurality of sub-frame images image-processed in the image processing module 1720 may be output to the display processing module 1750 in order to be displayed on a display (e.g., the display 440 of FIG. 4) as a live view (or preview) image. The set sub-frame image from among the plurality of sub-frame images image-processed in the image processing module 720 may be used to control a camera. For example, the set sub-frame image may be the first sub-frame image.

The image reconstruction module 1730 may reconstruct images of the maximum resolution of the image sensor 420 from the plurality of sub-frame images (i.e., multi-field sub-sampled images) processed in the image processing module 1720. The sub-frame images may be images that are acquired at different locations of the image sensor at different times. When the image reconstruction module 1730 reconstructs a high-resolution image from one sub-frame image, the image reconstruction module 1730 may calculate an amount of a motion between a current sub-frame image and a previous sub-frame image that is the same as the current sub-frame (e.g., a reference sub-frame image), may estimate a pixel image which is not sampled in the sub-frame image by using the calculated motion information, and may reconstruct the high-resolution image by filling the non-sampled pixel location with the estimated image.

The storage module 730 may store the high-resolution images reconstructed in the image reconstruction module 1730 in a memory (e.g., the memory 410 of FIG. 4).

The display processing module 1750 may generate a new image by processing the high-resolution images reconstructed in the image reconstruction module 1730 according to a set function, and display the new image on the display (e.g., the display 440 of FIG. 4). Generating the new image may include applying an image processing technique selected by the user to the high-resolution image sequence reconstructed in the display processing module 1750. The new image may be a best photo, a burst shot, a high-speed digital zooming image, a high-speed video, an HDR image, etc.

An electronic device may include an image sensor and a processor for acquiring an image. The processor may acquire a plurality of sub-frame images by sub-sampling row lines and column lines of the image sensor according to a set readout sequence, store the plurality of sub-frame images, and reconstruct high-resolution images by deinterlacing non-sampled sub-frame images with respect to each of the plurality of sub-frame images, which is stored during the image processing operation.

The processor may acquire a plurality of multi-field sampled sub-frame images by controlling an exposure and a readout on a row and column basis of the image sensor.

The number of the plurality of sub-frame images may be determined by the number of samplings in the row direction (m) and the number of samplings in the column direction (n), and the processor may acquire the sub-frame images by reading out the sub-frame images in the column direction and then moving in the row direction and reading out the sub-frame images in the next column direction.

The processor may acquire a plurality of sub-frame images and process and store the acquired images, and may reconstruct high-resolution images from the stored plurality of sub-frame images at a time of processing an image (e.g., at a time of requesting, by the user, processing of an image).

The processor may encode and store the image-processed sub-frame data at a first timing, and may decode and reconstruct the stored sub-frame data at a second timing.

The processor may display a set sub-frame image from among the image-processed plurality of sub-frame images as a live view image.

The processor may use the set sub-frame image from among the image-processed plurality of sub-frame images to control a camera module.

Controlling the camera module including the image sensor may include at least one of AF, AE, AWB, IPC, face detection, object tracking, etc.

The processor may include the high-resolution image reconstruction unit, which estimates pixels of the other sub-frame images, which are not sampled, by estimating a motion of the sub-frame images, and reconstructs high-resolution images by deinterlacing the estimated other sub-frame images with respect to the sub-frame images.

The high-resolution image reconstruction unit may include a buffer for buffering the plurality of sub-frame images, a motion estimation unit for estimating motion information between a current sub-frame image and a reference sub-frame image that is the same as the current sub-frame image, a motion compensation unit for deinterlacing pixels of the non-sampled other sub-frames based on the estimated motion information, and a reconstruction unit for reconstructing high-resolution images by integrating the sub-frame images and the deinterlaced pixels.

The high-resolution image reconstruction unit may further include a scaler for scaling the size of the sub-frame image by performing pyramid multi-resolution-based motion calculation with respect to the sub-frame images output from the buffer, and outputting the scaled sub-frame images to the motion estimation unit, and an error correction unit for extracting directivity information of an edge of an output from the motion compensation unit, correcting an edge image, and outputting the corrected image to the reconstruction unit.

In a still image capturing mode, the processor may store and display, as a still image, a best photo determined by analyzing the reconstructed high-resolution images.

In a video capturing mode, the processor may adjust a resolution and/or a frame rate of the reconstructed high-resolution images according to a set resolution and/or frame rate, and store and display the images as a video.

In a burst shot mode, the processor may adjust a resolution and/or an interval of the reconstructed high-resolution images according to a set image size and a set interval, and may store and display the images as a burst shot image.

In an HDR capturing mode, the processor may generate a high-resolution image having a dynamic range adjusted by analyzing the reconstructed high-resolution images, and may store and display the high-resolution image.

According to an embodiment of the present disclosure, an electronic device may include an image sensor for acquiring an image through a plurality of pixels include a first pixel set and a second pixel set; and a processor. The processor may be configured to: acquire one or more first images corresponding to a first time through the first pixel set; acquire one or more second images corresponding to a second time through the second pixel set; based on an input, select at least one mode of a plurality of modes for generating one or more third images; and generate the one or more third images corresponding to the at least one mode by using at least a part of the one or more first images and at least a part of the one or more second images.

At least one pixel of the first pixel set and at least one pixel of the second pixel set may be adjacent to each other.

The first pixel set or the second pixel set may include at least one sub-pixel set.

The sub-pixel set may include at least one RGB pixel of a Bayer pattern.

The processor may be configured to estimate pixels of a second image which is not sampled by estimating a motion of the first image, generate a third image by deinterlacing the estimated second image with respect to the first image, estimate pixels of a first image which is not sampled by estimating a motion of the second image, and generate a third image by deinterlacing the estimated first image with respect to the second image.

In a still image capturing mode, the processor may be configured to store and display a best photo determined by analyzing the plurality of third images as a still image.

In a video capturing mode, the processor may be configured to adjust a resolution and/or a frame rate of the plurality of third images according to a set resolution and/or a set frame rate, and store and display the third images as a video.

In a burst shot mode, the processor may be configured to adjust a resolution and/or an interval of the plurality of third images according to a set image size and a set interval, and store and display the third images as a burst shot image.

In an HDR capturing mode, the processor may be configured to generate a dynamic range-adjusted third image by analyzing a plurality of third images, and store and display the third image.

According to an embodiment of the present disclosure, an electronic device may include an image sensor configured to acquire an image through a plurality of pixels including a first pixel set and a second pixel set, and a processor. The processor may be configured to acquire one or more first images through the first pixel set; acquire one or more second images through the second pixel set; and generate one or more third images according to at least one mode selected from a plurality of modes for generating the one or more third images, by using at least a part of the one or more first images and at least a part of the one or more second images.

Figure 18:
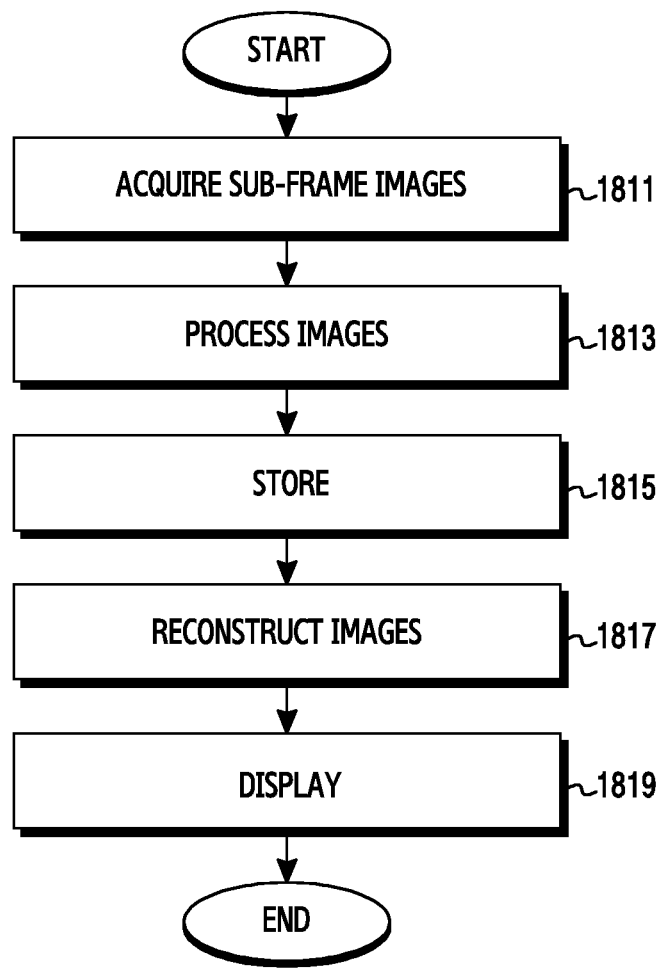
FIG. 18 is a flowchart illustrating a method of acquiring sub-frame images and reconstructing high-resolution images in an electronic device according to an embodiment of the present disclosure.

FIG. 18 is a flowchart illustrating a method of acquiring sub-frame images and reconstructing high-resolution images in an electronic device according to an embodiment of the present disclosure. Specifically, FIG. 18 illustrates an operation method of the electronic device acquiring and storing the plurality of sub-frame images, and reconstructing the high-resolution images from the stored sub-frame images at a time desired by the user. The time of acquiring the sub-frame images may be a time of capturing an image and the time of reconstructing the images may be a time at which the user requests processing of high-resolution images.

Referring to FIG. 18, in operation 1811, the electronic device may acquire a plurality of sub-frame images by controlling row lines and column lines of an image sensor according to a set pattern (e.g., an exposure and readout pattern). The sub-frame images may be pixel images corresponding to pixel sets which are set in the whole area of the image sensor. For example, the electronic device may set the number of sub-samplings (or sampling pattern) in the row direction and the column direction of the image sensor based on a set readout sequence (or a coding sequence).

In operation 1811, the electronic device may generate the plurality of sub-frame images (e.g., multi-field sub-sampled data) by controlling an exposure time (length) and a readout time on a row and column basis of the image sensor based on the sampling pattern. In this case, the sub-frame images may have a resolution of 1/N of the resolution of the image sensor and may have the same frame rate as that of the image sensor.

In operation 1813, the electronic device may image-process the acquired plurality of sub-frame images. The image processing operation may be divided into an image pre-processing operation and an image post-processing operation. The image pre-processing operation may perform AWB, AE, AF extraction and processing, lens shading correction, dead pixel correction, knee correction, etc., with respect to each of the sub-frame images.

In operation 1813, the electronic device may output a set sub-frame image from among the image-processed plurality of sub-frame images to a display as a live view (or a preview) image. In addition, the image processing module may use the set sub-frame image from among the plurality of sub-frame images to control a camera module including the image sensor and/or the image processing module (e.g., AF, AE, AWB, IPC, face detection, object tracking, etc.).

In operation 1815, the electronic device may store the image-processed plurality of sub-frame images. Each of the plurality of sub-frame images may be stored as an image for each corresponding sub-frame. The electronic device may encode the plurality of sub-frame images when storing the plurality of sub-frame images.

In operation 1817, the electronic device may access the plurality of sub-frame images stored in the memory and may reconstruct high-resolution images. The sub-frame images may be images acquired by being sampled at different times. The electronic device may decode the sub-frame images that are read out from the memory. The electronic device may reconstruct the high-resolution images from the decoded sub-frame images. The electronic device may calculate an amount of a motion between a current sub-frame image and a previous sub-frame image obtained based on the same location as the current sub-frame image, may estimate non-sampled pixel values based on the calculated amount of the motion, and may reconstruct the high-resolution images from the sub-frame images by filling the sub-frame images with the estimated pixel values. For example, for sub-frame images of a P1 parity, the electronic device may calculate an amount of a motion of the sub-frame images of the P1 parity by using a sub-frame image of a current frame and a sub-frame image of a previous frame, which are acquired based on the P1 parity. The electronic device may estimate pixel values of locations of the P2 to P4 parities, which are not sampled in the P1 parity sub-frame. The electronic device may reconstruct the high-resolution images from the sub-frame images of the P1 parity by filling the locations of the non-sampled P2 to P4 parities of the sub-frame images of the P1 parity with the estimated corresponding pixel values.

In operation 1819, the electronic device may process the reconstructed high-resolution images according to an image processing technique set by the user, and may store the high-resolution images in the memory, and may display the high-resolution images on the display. The electronic device may generate the reconstructed high-resolution images as a new image according to the image processing technique set by the user. The image processing technique set by the user may be still image processing (e.g., best photo processing), burst shot processing, video processing (e.g., high speed video capture), zooming (e.g., high quality digital zooming), HDR processing (e.g., a high speed HDR), etc.

By performing the operation method of FIG. 18, the electronic device may acquire one or more first images (or first sub-frame images) corresponding to a first time through a first pixel (or first parity data) set, and may acquire one or more second images (or second sub-frame images) corresponding to a second time through a second pixel (or second parity data) set. The electronic device may select at least one mode from among a plurality of modes for generating one or more third images based on an input, and may generate one or more third images corresponding to the at least one mode by using at least a part of the one or more first images and at least a part of the one or more second images.

Figure 19:
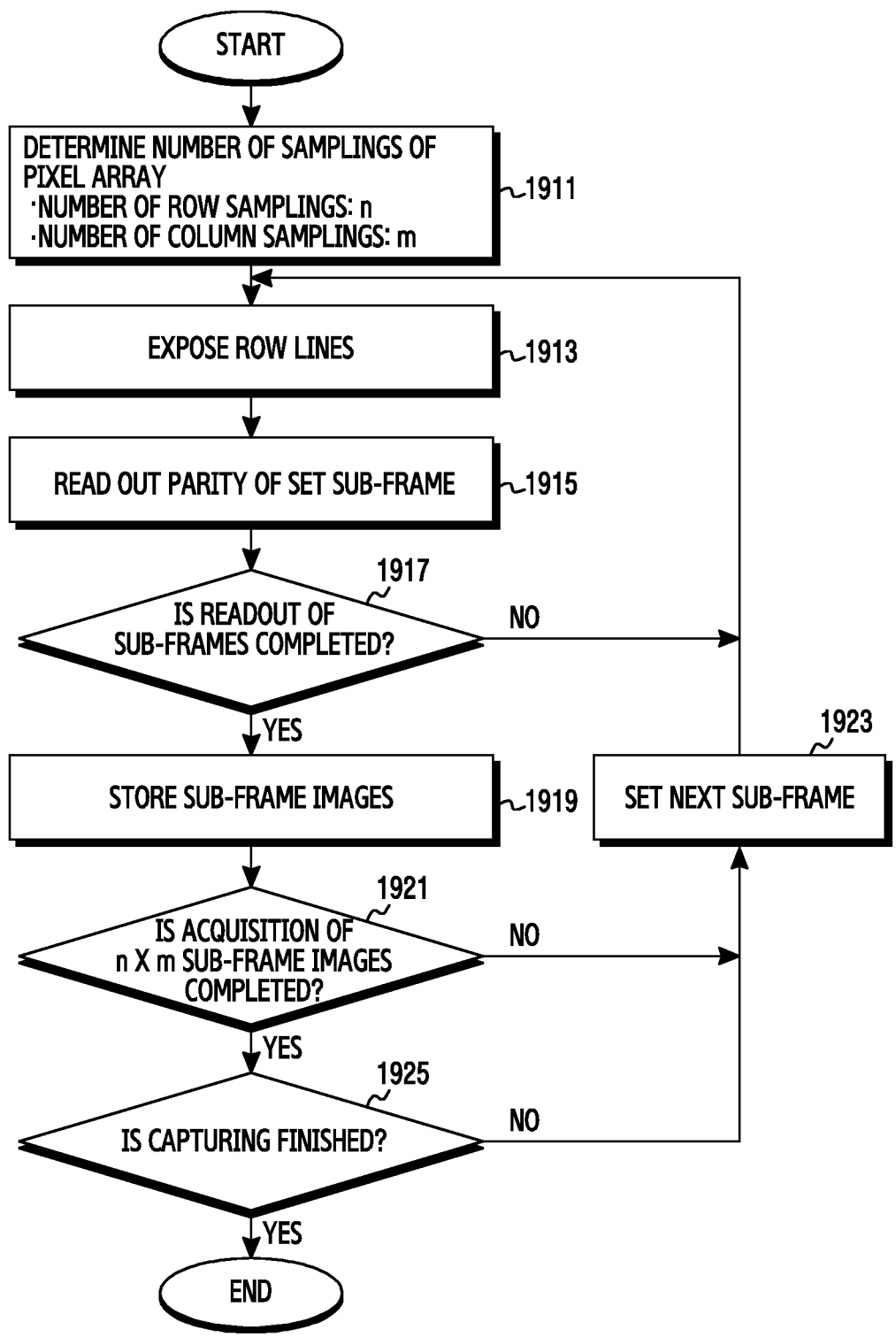
FIG. 19 is a flowchart illustrating a method of acquiring a plurality of sub-frame images in an electronic device according to an embodiment of the present disclosure.

FIG. 19 is a flowchart illustrating a method of acquiring a plurality of sub-frame images in an electronic device according to an embodiment of the present disclosure.

Referring to FIG. 19, in operation 1911, the electronic device may determine a number of sub-samples of a pixel array of an image sensor. The electronic device may acquire a plurality of sub-frame images (or multi-field sub-sampled image data) by sub-sampling the pixel array of the image sensor according to a sequence of a set readout pattern. The sub-sampling operation may be performed in the row direction and the column direction of the image sensor. The number of samplings in the row direction (m) and the number of samplings in the column direction (n) may be given according to a predetermined pattern or may be changed midway through the process.

In operation 1913, the electronic device may expose the row lines of the pixel array. The exposure of the row lines may be deactivated at a readout time and a reset time, and may be activated at the other times except for the readout time and the reset time. In addition, the exposure of the row lines may be activated differently according to a parity location of a sub-frame image.

In operation 1915, the electronic device may deactivate the exposure of the row line of a parity location of a set sub-frame, and may read out the pixel values of the parity location.

In operation 1917, the electronic device may determine if the readout of the sub-frame is completed.

When the readout of the corresponding sub-frame is not completed in operation 1917, the method returns to operation 1913. The electronic device may read out the pixel values of the parity location of the set sub-frame located in the row line.

When the readout of the corresponding sub-frame is completed in operation 1917, the electronic device stores the read-out pixel values as sub-frame images of the corresponding sub-frame in operation 1919.

In operation 1921, the electronic device may determine whether the stored sub-frame image is a final sub-frame (e.g., the n*m-th sub-frame). When the stored sub-frame image is not final sub-frame, the electronic device may set the next sub-frame in operation 1923 and then the method may return to operation 1913.

When the stored sub-frame image is the final sub-frame in operation 1921, the electronic device may determine whether capturing is finished in operation 1925.

When the capturing is still ongoing in operation 1925, the electronic device may set the first sub-frame in operation 1923 and then the method may return to operation 1913. However, when the capturing is finished in operation 1925, the method ends.

For example, when P1-P4 parities are located and sub-frame images are acquired in an order of P1, P3, P2, and P4 parities, as illustrated in FIG. 8A, the electronic device may activate the exposure of the odd-numbered row lines (e.g., RL1, RL3, RL5, RL7, . . . ) of the pixel array in sequence, and then may activate the exposure of the even-numbered row lines (e.g., RL2, RL4, RL6, RL8, . . . ) in sequence, as illustrated in FIG. 8B, in operation 1913.

When the exposure time of RL1 expires, the electronic device may stop the exposure of the RL1 row line and may read out the pixel values of the column lines (e.g., CL1, CL3, CL5, CL7, . . . ) where the P1 parity is located in operation 1915. The electronic device may recognize that the sub-frame images of the P1 parity are not acquired in operation 1917, and may activate the exposure of the RL1 row line again in operation 1913. Thereafter, when the exposure time of the RL3 row line expires, the electronic device may stop the exposure of the RL3 row line and read out pixel values of the column lines (for example, CL1, CL3, CL5, CL7, . . . ) where the P1 parity is located in operation 1915.

When the electronic device reads out the pixel values of the column lines where the P1 parity is located in the final row line (e.g., RN-1) where the P1 parity is located by repeating the above-described operation, the electronic device may recognize that the readout of the pixel values of the locations of the P1 parity is completed in operation 1917, and may store the read-out pixel values as a first sub-frame image. Thereafter, the electronic device may recognize that the stored sub-frame image is not the image of the final sub-frame (e.g., a fourth sub-frame) in operation 1921, and may set the next sub-frame (e.g., a second sub-frame) in operation 1923 and perform operation 1913.

When the exposure time of RL2 expires in operation 1913, the electronic device may stop the exposure of the RL2 row line and may read out pixel values of column lines (for example, CL1, CL3, CL5, CL7, . . . ), where the P3 parity is located, in operation 1915. The electronic device may recognize that the sub-frame images of the P3 parity are not acquired in operation 1917, and may activate the exposure of the RL2 row line again in operation 1913. Thereafter, when the exposure time of the RL4 row line expires, the electronic device may stop the exposure of the RL4 row line and may read out the pixel values of the column lines (e.g., CL1, CL3, CL5, CL7, . . . ), where the P1 parity is located, in operation 1915.

When images of a second sub-frame are acquired in this way, the electronic device may recognize this in operation 1917 and may store the read-out pixel values as a second sub-frame image in operation 1919. When the second sub-frame image is acquired, the electronic device may recognize that the second sub-frame image is not the final sub-frame image in operation 1921, and may set a third sub-frame as the next sub-frame in operation 1923.

When the exposure time of RL1 expires when the third sub-frame image is acquired, the electronic device may stop the exposure of the RL1 row line and may read out the pixel values of the column lines (e.g., CL2, CL4, CL6, CL8, . . . ), where the P2 parity is located, in operation 1915. The electronic device may recognize that the sub-frame images of the P2 parity are not acquired in operation 1917, and may activate the exposure of the RL1 row line again in operation 1913. Thereafter, when the exposure time of the RL3 row line expires, the electronic device may stop the exposure of the RL3 row line and may read out the pixel values of the column lines (e.g., CL2, CL4, CL6, CL8, . . . ), where the P2 parity is located, in operation 1915.

When images of the third sub-frame are acquired in this way, the electronic device may recognize this in operation 1917 and may store the read-out pixel values as the third sub-frame image in operation 1919. When the third sub-frame image is acquired, the electronic device may recognize that the third sub-frame image is not the final sub-frame image in operation 1921, and may set a fourth sub-frame as the next sub-frame in operation 1923.

When the fourth sub-frame image is acquired, the electronic device may recognize that the final sub-frame image is acquired in operation 1921, and determine whether capturing is finished or not in operation 1925. When capturing is ongoing, the electronic device may proceed to operation 1923 to set the first sub-frame and then perform the above-described operation of acquiring the sub-frame images again. When capturing is finished, the electronic device may finish the operation of acquiring the sub-frame images through the image sensor.

Figure 20:
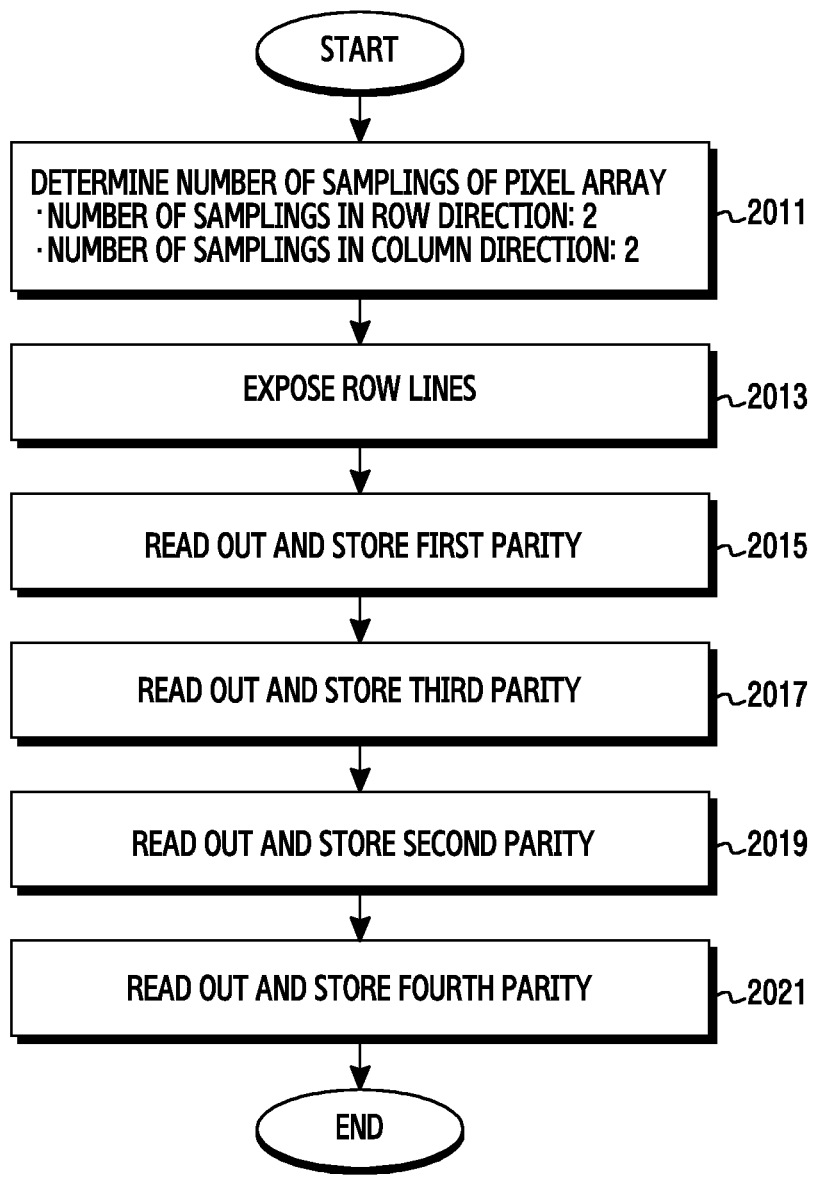
FIG. 20 is a flowchart illustrating a method of acquiring four sub-frame images in an electronic device according to an embodiment of the present disclosure.

FIG. 20 is a flowchart illustrating a method of acquiring four sub-frame images in an electronic device according to an embodiment of the present disclosure.

Referring to FIG. 20, the electronic device may determine a number of samplings of a pixel array in operation 2011. When four sub-frame images are generated, the number of samplings in the row direction (m) may equal 2 (m=2) and the number of samplings in the column direction (n) may equal 2 (n=2). In this case, parities P1-P4 set in the pixel array of the image sensor may have a structure as illustrated in FIG. 8A, where the first row line may be RL1, RL3, RL5, RL7, . . . , and the second row line may be RL2, RL4, RL6, RL8, . . . . In FIG. 8A, the first column line may be CL1, CL3, CL5, CL7, . . . , and the second column line may be CL2, CL4, CL6, CL7, . . . . The electronic device may activate the exposure of the row lines of the pixel array in operation 2013.

In operation 2015, at a time of acquiring the first sub-frame image, the electronic device may read out pixel data of the first parity located at the intersection of the first row line and the first column line, and may store the pixel data as the first sub-frame image.

In operation 2017, at a time of acquiring the second sub-frame image, the electronic device may read out pixel data of the third parity located at the intersection of the second row line and the first column line, and may store the pixel data as the second sub-frame image.

In operation 2019, at a time of acquiring the third sub-frame image, the electronic device may read out pixel data of the second parity located at the intersection of the first row line and the second column line, and may store the pixel data as the third sub-frame image.

In operation 2021, at a time of acquiring the fourth sub-frame image, the electronic device may read out pixel data of the fourth parity located at the intersection of the second row line and the second column line, and may store the pixel data as the fourth sub-frame image.

The electronic device may store read-out pixel values of the parities as corresponding sub-frame images by repeating operation 2015-2021 until capturing the image is finished. The four sub-frame images (or 4-field sub-sampled image data) may have a resolution of ¼ of the maximum resolution (of full resolution) of the image sensor, and, when performing an image reconstruction operation, the electronic device may reconstruct high-resolution images from the four sub-frame images.

Figure 21:
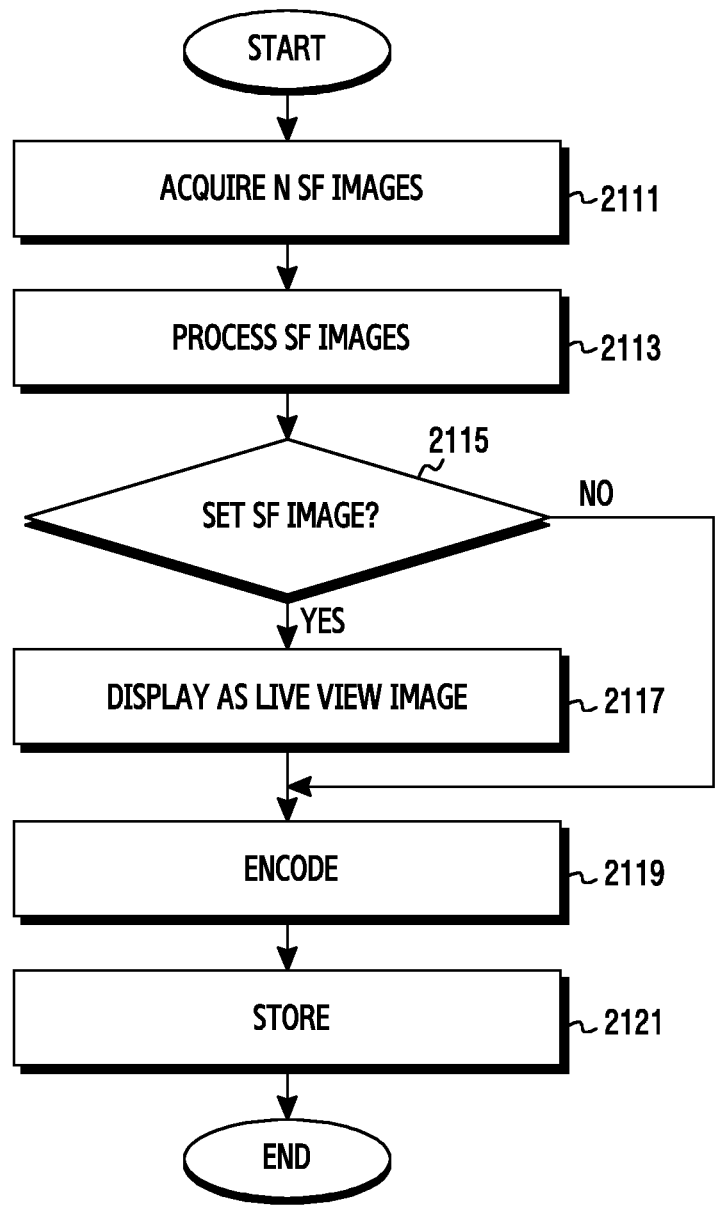
FIG. 21 is a flowchart illustrating a method of storing an acquired plurality of sub-frame images in an electronic device according to an embodiment of the present disclosure.

FIG. 21 is a flowchart illustrating a method of storing an acquired plurality of sub-frame images in an electronic device according to an embodiment of the present disclosure.

Referring to FIG. 21, in operation 2111, the electronic device may acquire N sub-frame images, e.g., as illustrated in FIG. 20.

In operation 2113, the electronic device may perform an image pre-processing operation and an image post-processing operation with respect to the acquired N sub-frame images. When the sub-frame image after the image processing operation is performed is a set sub-frame image in operation 2115, the electronic device may output the set sub-frame image to the display and display the set sub-frame image as a preview image in operation 2117.

When the sub-frame image is not the set sub-frame image in operation 2115 or after performing operation 2117, the electronic device may encode the sub-frame images in operation 2119 and may store the encoded sub-frame images in the memory in operation 2121. The image-processed sub-frame images may be separately stored in the memory (according to the same field image) to be reconstructed as high-resolution images. The sub-frame images acquired in the image acquisition module may be stored in the memory without being image-processed.

Figure 22:
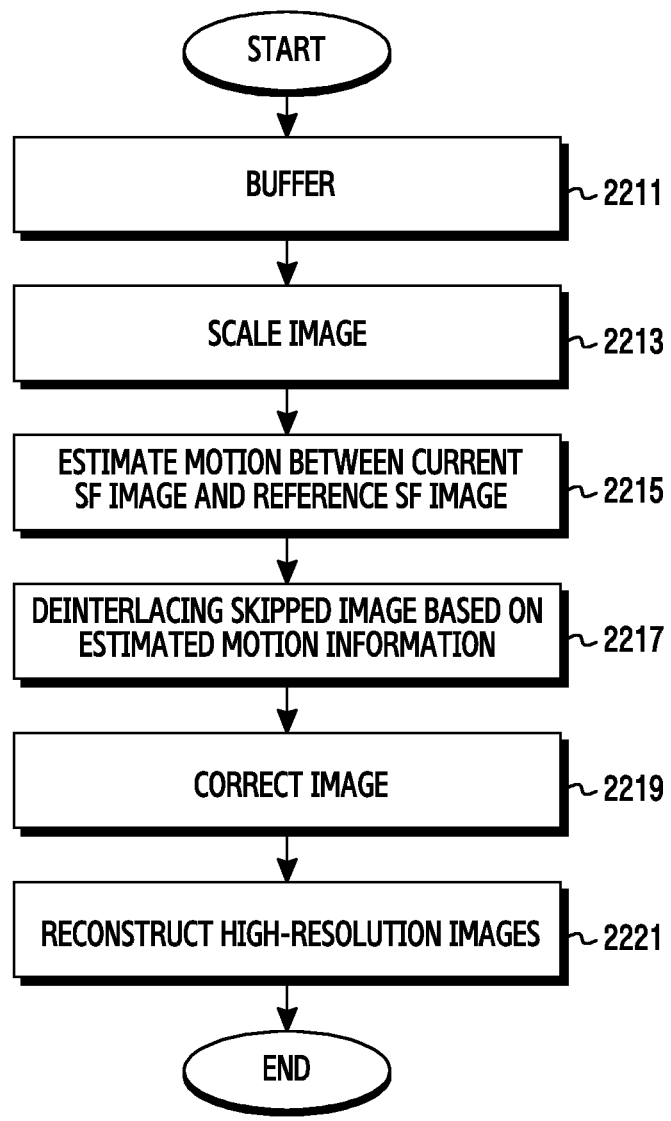
FIG. 22 is a flowchart illustrating a method of reconstructing high-resolution images in an electronic device according to an embodiment of the present disclosure.

FIG. 22 is a flowchart illustrating a method of reconstructing high-resolution images in an electronic device according to an embodiment of the present disclosure.

Referring to FIG. 22, in operation 2211, the electronic device may read out sub-frame images from the memory and may buffer the sub-frame images in order to reconstruct high-resolution images. When the sub-frame images stored in the memory are encoded images, the electronic device may decode the sub-frame images.

The electronic device may scale the sub-frame images (e.g., perform multi-scale pyramid generation) in operation 2213. The electronic device may reconstruct according to the resolution of the sub-frame images, but may consider pyramid scaling (or pyramid multi-resolution)-based motion calculation to enhance a speed or accuracy of calculation.

In operation 2213, the electronic device may generate an image pyramid (e.g., a series of image sets generated by reducing a scale) by changing (e.g., reducing) the size of the sub-frame image in phases.

In operation 2215, the electronic device may estimate motion information of the scaled sub-frame images. The electronic device may calculate an amount of a motion of a pixel between a current sub-frame image and a previous sub-frame image of the sub-frame image for reconstructing. For example, for the sub-frame image of the P1 parity, the electronic device may calculate an amount of a motion of a pixel value between a current P1 parity sub-frame image and a previous P1 parity sub-frame image. By repeating the operation of calculating an amount of a motion of a pixel between a reference sub-frame image and a current sub-frame for reconstructing, the electronic device may estimate a motion map corresponding to the resolution of the sub-frame image size with respect to all times.

In operation 2217, the electronic device may estimate pixel values of the other sub-frame images, which are not sampled, by using the estimated motion information of the sub-frame image. For example, for the sub-frame image of the P1 parity, the electronic device may estimate pixel values of the locations of the P2, P3, and P4 parities, which are not sampled, based on the amount of the motion of the pixel value between the current P1 parity sub-frame image and the previous P1 parity sub-frame image.

In operation 2219, the electronic device may mitigate a motion compensation error that may occur while compensating a motion. The motion compensation error may occur in an area, e.g., an edge, of an image.

In operation 2219, the electronic device may reduce an error occurring in an edge area by applying an edge adaptive deinterlacing scheme.

In operation 2221, the electronic device may reconstruct high-resolution images by filling a sub-frame image with pixels of the compensated other sub-frame images. For example, for the sub-frame image of the P1 parity, the electronic device may reconstruct high-resolution images from the sub-frame images by filling the current P1 parity sub-frame image with the estimated pixel values of the locations of the P2, P3, and P4 parities, which are not sampled.

Figure 23:
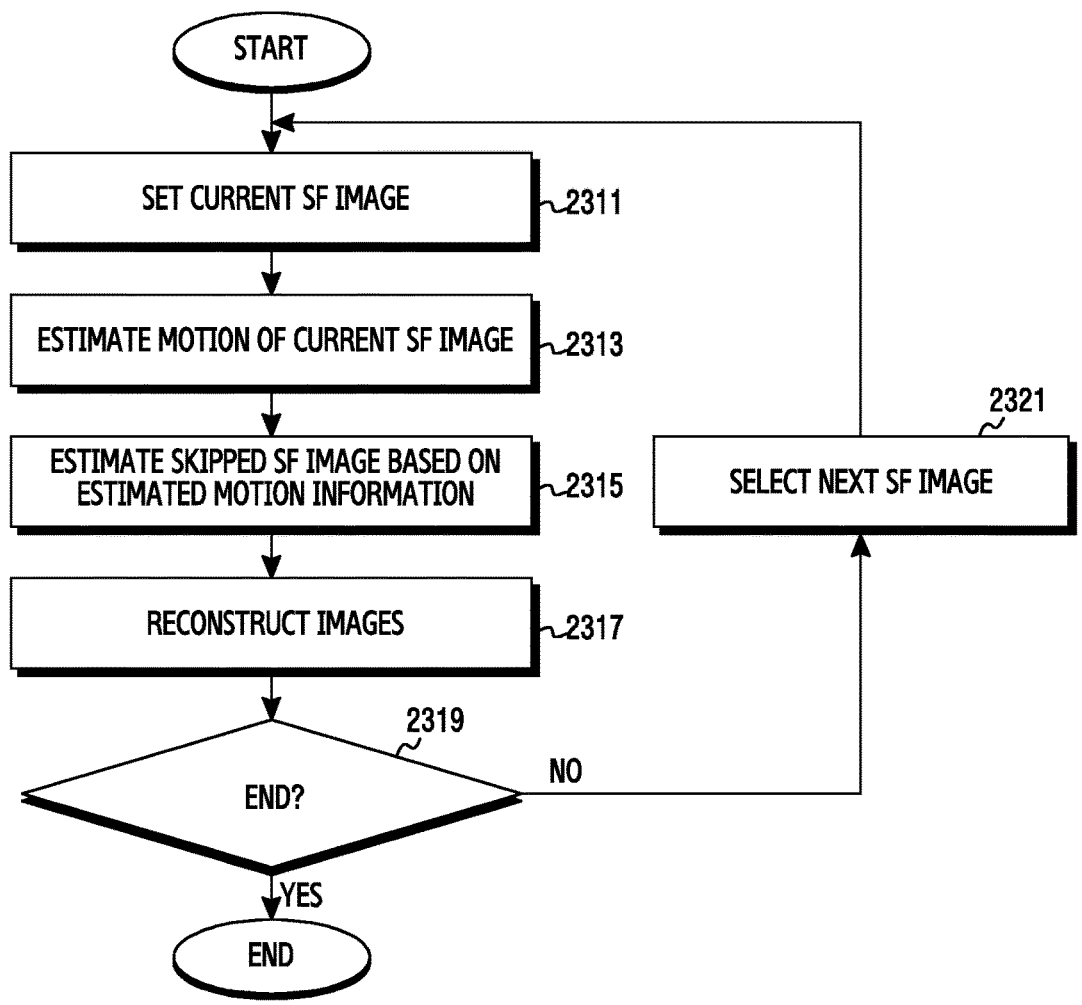
FIG. 23 is a flowchart illustrating a method of reconstructing high-resolution images from sub-frame images in an electronic device according to an embodiment of the present disclosure.

FIG. 23 is a flowchart illustrating a method of reconstructing high-resolution images from sub-frame images in an electronic device according to an embodiment of the present disclosure.

Referring to FIG. 23, when acquiring a plurality of sub-frame images, the electronic device may acquire the plurality of sub-frame images by reading out pixels located at the other locations of the pixel at a different time. In addition, when reconstructing high-resolution images from the plurality of sub-frame images, the electronic device may reconstruct the high-resolution images in order of acquisition of the sub-frame images.

In operation 2311, the electronic device may decode and buffer the sub-frame images stored in the memory. The sub-frame images may be buffered in order of acquisition of the sub-frame images. When reconstructing from the buffered sub-frame images, the electronic device may set a current sub-frame image and a reference sub-frame image. Herein, the current sub-frame image may be an image for reconstructing a high-resolution image, and the reference sub-frame image may be the same sub-frame image as the current sub-frame image and may be a sub-frame image, which was acquired N frames before the current sub-frame image (where N is the number of sub-frame images). For example, the current sub-frame image and the reference sub-frame image may be images acquired at the same parity location, and the reference sub-frame image may be an image acquired N frames before the current sub-frame image.

In operation 2313, the electronic device may estimate motion information of the current sub-frame image by calculating an amount of a motion of a pixel between the current sub-frame image and the reference sub-frame image.

In operation 2315, the electronic device may estimate and compensate pixel values of the other sub-frame images, which are not sampled, by using the estimated motion information.

In operation 2317, the electronic device may correct an error (e.g., compensates an edge component) of the motion-compensated pixels. In operation 2317, the electronic device may reconstruct high-resolution images by filling the current sub-frame image with the corrected pixel values of the other sub-frame images.

In operation 2319, the electronic device may determine if reconstruction from the sub-frame images is finished.

When the reconstruction from the sub-frame images is not finished in operation 2319, the electronic device may select a next sub-frame image in operation 2321 and the method may return to operation 2311.

When the reconstruction from the sub-frame images is finished in operation 2319, the method ends.

The sub-frame images may be acquired as sub-images of N frames in a frame section of the image sensor. In addition, the electronic device may continue acquiring the sub-frame images while a shutter is turned on according to a capturing mode. For example, the electronic device may include a pixel array of 12M of the image sensor, and may generate images of 60 frames per second (12M*60 fps). When the electronic device is able to acquire four field sub-sampled images (or four sub-frame images), the acquired sub-frame images may have a size of 3M, and 240 sub-frame images (3M*4*60 fps) may be acquired for 1 second. The electronic device may reconstruct high-resolution images of 12M*240 fps from the sub-frame images of 3M*240 fps by repeating the operations of FIG. 23.

Figure 24:
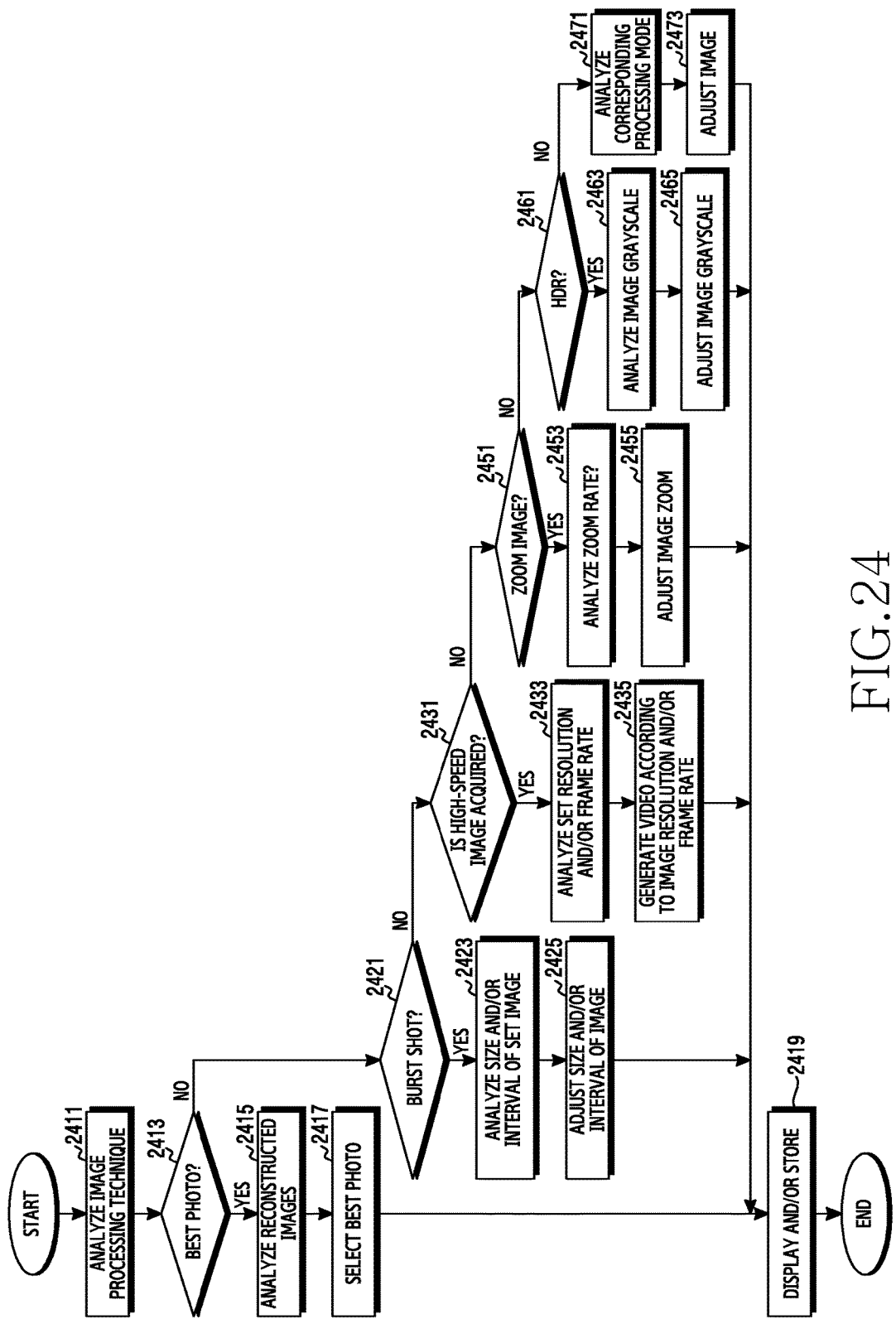
FIG. 24 is a flowchart illustrating a method of processing reconstructed high-resolution images according to a set mode in an electronic device according to an embodiment of the present disclosure.

FIG. 24 is a flowchart illustrating a method of processing reconstructed high-resolution images according to a set mode in an electronic device according to an embodiment of the present disclosure.

Referring to FIG. 24, the electronic device may generate the reconstructed high-resolution images as a new image based on a user's input. For example, the user may select an image processing technique to process the high-resolution images.

In operation 2411, the electronic device may analyze the image processing technique selected by the user. The image processing technique may include a technique for selecting a best photo, a technique for processing a burst shot, a technique for processing a high-speed image, a technique for zooming an image, and/or a technique for processing an HDR.

When the best photo image processing technique is selected in operation 2413, the electronic device may analyze the reconstructed high-resolution images in operation 2415, and may select a best photo in operation 2417. The reconstructed high-resolution image may have the same effect as when a still image is captured at a high-speed frame rate. When capturing a still image, the electronic device may reconstruct high-resolution images from sub-frame images which are acquired at a high-speed frame rate at a time that a capture button is turned on. The electronic device may select a best image by analyzing a blur and/or a person's facial expression in the reconstructed high-resolution images.

In operation 2419, the electronic device may display the selected best image on the display and may store the best image in the memory.

When the best photo image processing technique is selected in operation 2413 but the burst shot processing technique is selected in operation 2421, the electronic device may analyze a size and/or an interval of a set image in operation 2423, and may generate burst shot images by adjusting the size and/or the interval of the images in operation 2425. The reconstructed high-resolution image may have a video frame rate. When the electronic device selects an image in the reconstructed high-resolution high-speed image sequence at specific intervals, the electronic device may acquire an image of the same result as when a burst shot is captured. In addition, the electronic device may generate the burst shot images by changing the image size of the high-resolution image sequence and adjusting the interval between images. After generating the burst shot images, the electronic device may adjust image quality or a resolution of the burst shot images by applying a burst utilization scenario (e.g., Shot and More, Best Photo, Eraser, etc.). The electronic device may display and store the acquired burst shot images in operation 2419.

When the burst shot processing technique is not selected in operation 2421 but the high-speed video processing technique is selected in operation 2431, the electronic device may analyze a set resolution and/or a set frame rate in operation 2433, and may generate a video according to the image resolution and/or the frame rate in operation 2435. The reconstructed high-resolution image may be a high-speed video. For example, when four-field sub-sampled sub-frame images are generated, the electronic device may generate high-resolution images having a high frame rate (e.g., a full resolution video having a frame rate N times higher than of the frame rate of a prior art). The electronic device may generate a video having various resolutions (e.g., UHD, FHD, or HD) according to a user settings, and may adjust the size of the image by cropping and/or resizing. The electronic device may adjust the frame rate of the video by selecting a high-resolution and high-speed video at specific intervals. The electronic device may display and store the adjusted video in operation 2419.

When the high-speed video processing technique is not selected in operation 2431 but the image zooming technique is selected in operation 2451, the electronic device may analyze a zooming rate in operation 2453, and may control to zoom a high-resolution image in operation 2455. Since the electronic device is able to generate high-speed and high-resolution images, the electronic device may avoid using an upscaler (S/W upscaler) when zooming. The electronic device may implement a digital zooming operation by using the high-resolution image as is because the electronic device reconstructs the high-resolution image from a space-time volume (e.g., a set of multi-field sub-sampled data), and an amount of information of the reconstructed image is larger than an amount of information of a normal video. The electronic device displays and stores a digital zooming image in operation 2419.

When the image zooming technique is not selected in operation 2451 but the HDR processing technique is selected in operation 2461, the electronic device may analyze an image grayscale in operation 2463, and may correct the image grayscale in operation 2465. Because the electronic device acquires an image by reading out pixels in the row direction and the column direction of the image sensor, the electronic device can obtain an advantage for HDR image quality. The electronic device may apply motion detection and compensation and a motion and edge adaptive deinterlacing technique when reconstructing the HDR image. The electronic device may display and store the HDR image in operation 2419.

When the image zooming technique is selected in operation 2451 but another image processing technique is selected (e.g., a panorama image processing technique), the electronic device analyzes the corresponding image processing technique in operation 2471, and may process an image according to the selected image processing technique (e.g., may generate a panorama image by combining images in a single image in the panorama mode) in operation 2473. The electronic device may display and store the processed image in operation 2419.

Figure 25:
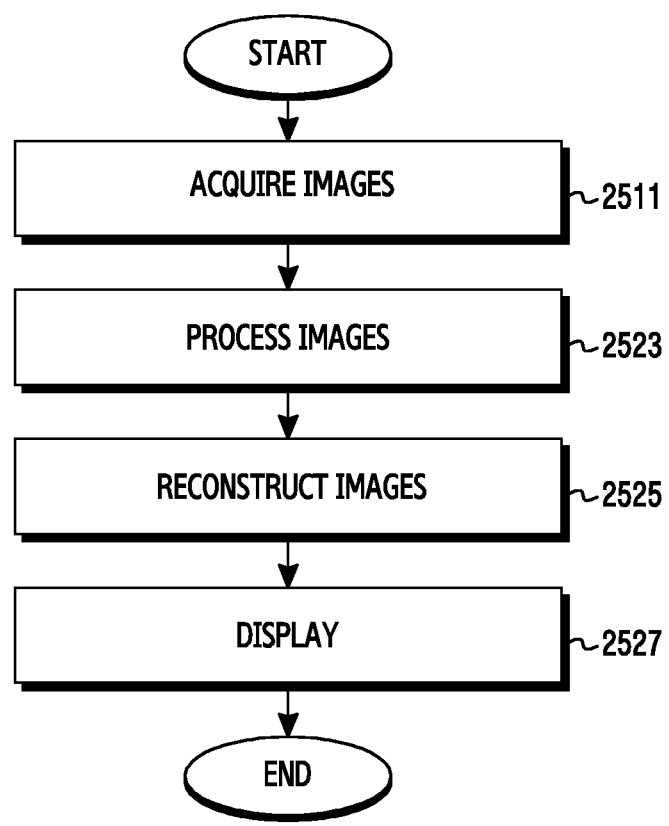
FIG. 25 is a flowchart illustrating a method of acquiring an image and reconstructing a high-resolution image in an electronic device according to an embodiment of the present disclosure.

FIG. 25 is a flowchart illustrating a method of acquiring an image and reconstructing a high-resolution image in an electronic device according to an embodiment of the present disclosure.

The electronic device may acquire and store a plurality of sub-frame images at a time of capturing an image. In addition, the electronic device may reconstruct high-resolution images from the stored plurality of sub-frame images at a time that the user requests processing of images, and may generate a new image by processing the reconstructed images based on an image processing technique selected by the user.

Alternatively, the electronic device may acquire a plurality of sub-frame images at a time of capturing an image, and may reconstruct high-resolution images from the acquired sub-frame images and then store the high-resolution images. In addition, when the user requests processing of images, the electronic device may generate a new image by processing the reconstructed high-resolution images based on a selected image processing technique.

Referring to FIG. 25, in operation 2511, the electronic device may acquire a plurality of sub-frame images according to a set readout sequence. The acquiring of the plurality of sub-frame images may be performed in the same way as illustrated in FIG. 19.

In operation 2523, the electronic device may image-process the acquired sub-frame images, display a set sub-frame image from among the image-processed sub-frame images as a live view image, and may use the set sub-frame image to control the function of a camera.

In operation 2525, the electronic device may reconstruct high-resolution images from the image-processed sub-frame images. The method for reconstructing the high-resolution images from the sub-frame images may use the methods as illustrated in FIGS. 22 and 23.

In operation 2527, the electronic device may process the reconstructed high-resolution images according to a set mode, and may display and store the high-resolution images. The method for processing the reconstructed high-resolution images according to the set mode may use the method as illustrated in FIG. 24.

The electronic device provided with the image sensor may perform a preview operation when the camera is turned on, and may perform an image capturing operation when a shutter-on operation is performed. In order to obtain an image, the user of the electronic device may turn on the function of the camera, set a desired capturing mode, and perform the shutter-on operation. Accordingly, when the camera-on function is performed, the electronic device may display the preview image on the display, without performing the image processing operation and the high-resolution image reconstruction operation.

Figure 26:
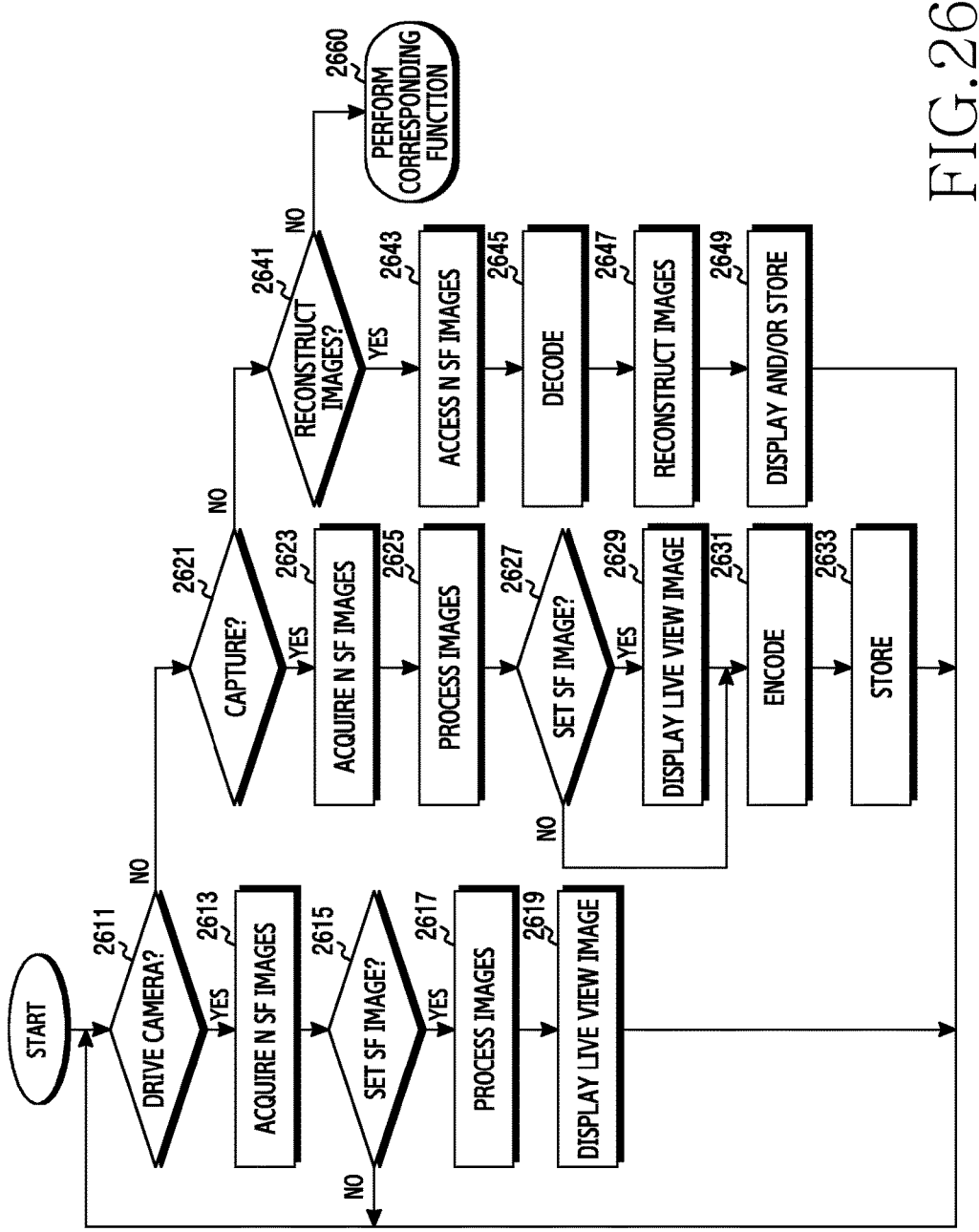
FIG. 26 is a flowchart illustrating a method of driving a camera, capturing, and reconstructing in an electronic device according to an embodiment of the present disclosure.

FIG. 26 is a flowchart illustrating a method of driving a camera, capturing, and reconstructing in an electronic device according to an embodiment of the present disclosure.

Referring to FIG. 26, the electronic device may determine whether a camera drive event is occurred in operation 2611. If the camera drive event is occurred, the electronic device may drive the camera, and may not store sub-frame images acquired in the image sensor. In operation 2613, the electronic device may acquire sub-frame images. When a set sub-frame image is acquired in operation 2615, the electronic device may process the set sub-frame image in operation 2617, and may display the image-processed sub-frame image on the display in operation 2619.

After the camera is driven, the electronic device may not acquire images of all sections of the image sensor and may acquire images from only a set sub-frame section in operation 2613. For example, when the camera is driven, the electronic device may acquire only the set sub-frame image in the image sensor, may process the acquired sub-frame image, and may display the sub-frame image as a live view image.

If the camera drive event is not occurred, the electronic device may determine whether a capture event is occurred in operation 2621. For example, the electronic device may determine whether the capture event is occurred in a situation which the camera being driven. When a shutter-on (or capturing start) operation occurs while the camera being driven in operation 2621, the electronic device may acquire a plurality of sub-frame images by sub-sampling the image sensor according to a set readout pattern in operation 2623, and may image-process the acquired sub-frame images in operation 2625.

The electronic device may recognize a set sub-frame image from among the image-processed sub-frame images in operation 2627, and may display the set sub-frame image on the display as a preview image in operation 2629. The electronic device may encode the image-processed plurality of sub-frame images in operation 2631, and may store the encoded plurality of sub-frame images in respective set areas of the memory in operation 2633.

The electronic device may reconstruct images according to a set mode. When the set mode is a still image reconstruction mode in operation 2641, the electronic device may access the sub-frame images stored in the memory in operation 2643, and may decode the sub-frame images in operation 2645. The electronic device may reconstruct high-resolution images from the decoded sub-frame images in operation 2647. The electronic device may reconstruct high-resolution images from the plurality of sub-frame images by repeating the above-described operations.

After reconstructing the high-resolution images, the electronic device may display the reconstructed high-resolution images on the display, and may store the high-resolution images in the memory in operation 2649.

When the camera is not driven in operation 2611, the shutter-on (or capturing start) operation is not performed in operation 2621, and a still image reconstruction mode is not performed in operation 2641, the electronic device may perform a different corresponding function in operation 2660.

FIG. 26 illustrates an example of reconstructing high-resolution images and processing as a best photo according to the set mode. The electronic device may use the method illustrated in FIG. 23 when reconstructing the high-resolution images from the sub-frame images, and may process the reconstructed high-resolution images according to the set in the method illustrated in FIG. 24.

FIG. 26 illustrates the operations of acquiring and storing the sub-frame images, and then reconstructing the high-resolution images from the sub-frame images according to the set mode and processing the high-resolution images according to the set mode. The electronic device may reconstruct the high-resolution images from the sub-frame images acquired at the time of capturing, and may process the high-resolution images.

Figure 27:
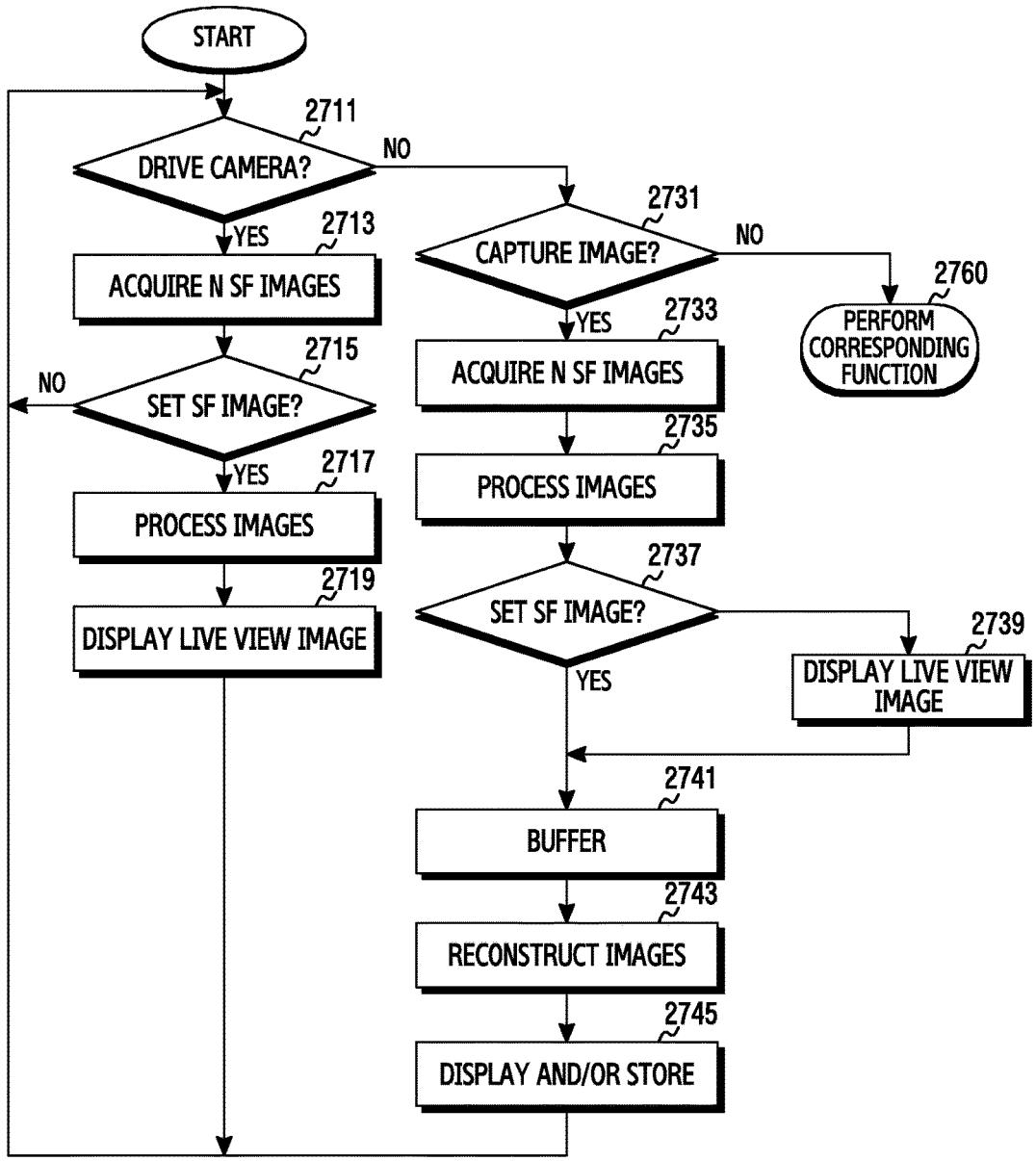
FIG. 27 is a flowchart illustrating a method of driving a camera, capturing, and reconstructing in an electronic device according to an embodiment of the present disclosure.

FIG. 27 is a flowchart illustrating a method of driving a camera, capturing, and reconstructing in the electronic device according to an embodiment of the present disclosure.

Referring to FIG. 27, the electronic device may determine whether a camera drive event is occurred in operation 2711. If the camera drive event is occurred, the electronic device may drive the camera, and may acquire sub-frame images in operation 2713. When a set sub-frame image is acquired in operation 2715, the electronic device may process the set sub-frame image in operation 2717, and may display the image-processed sub-frame image on the display in operation 2719.

If the camera drive event does not occur, the electronic device may determine whether a capture event is occurred in operation 2731. For example, the electronic device may determine whether the capture event has occurred while the camera being driven. When a shutter-on (capturing start) operation is occurred in the situation which the camera being driven, the electronic device may acquire a plurality of sub-frame images by sub-sampling the image sensor according to a set readout pattern in operation 2733, and may image-process the acquired sub-frame images in operation 2735. The electronic device may recognize a set sub-frame image from among the image-processed sub-frame images in operation 2737, and may display the set sub-frame image on the display as a preview image in operation 2739.

The electronic device may buffer the image-processed plurality of sub-frame images in operation 2741. The electronic device may reconstruct images according to a set capturing mode. When the capturing mode is a still image capturing mode, the electronic device may reconstruct high-resolution images from the sub-frame images in operation 2743. The electronic device may reconstruct high-resolution images from the plurality of sub-frame images by repeating the above-described operations.

After reconstructing the high-resolution images, the electronic device may display the reconstructed high-resolution images on the display and may store the high-resolution images in the memory in operation 2745.

When the camera is not driven in operation 2711 and the shutter-on (or capturing start) operation is not performed in operation 2721, the electronic device may perform a different corresponding function in operation 2760.

The electronic device may use the method illustrated in FIG. 23 when reconstructing the high-resolution images from the sub-frame images, and may process the reconstructed high-resolution images according to the set in the method illustrated in FIG. 24.

According to an embodiment of the present disclosure, an operating method of an electronic device may include acquiring one or more first images corresponding to a first time through a first pixel set of an image sensor, the image sensor configured to acquire an image through a plurality of pixels including the first pixel set and a second pixel set; acquiring one or more second images corresponding to a second time through the second pixel set of the image sensor; based on an input, selecting at least one mode of a plurality of modes for generating one or more third images; and generating the one or more third images corresponding to the at least one mode by using at least a part of the one or more first images and at least a part of the one or more second images.

At least one pixel of the first pixel set and at least one pixel of the second pixel set may be adjacent to each other.

The first pixel set or the second pixel set may include at least one sub-pixel set.

The sub-pixel set may include at least one RGB pixel of a Bayer pattern.

Generating the third images may include estimating pixels of a second image, which is not sampled, by estimating a motion of the first image, and generating a third image by deinterlacing the estimated second image with respect to the first image; and estimating pixels of a first image, which is not sampled, by estimating a motion of the second image, and generating a third image by deinterlacing the estimated first image with respect to the second image.

Generating the third images may include, in a still image capturing mode, generating a best photo determined by analyzing the plurality of third images as a still image.

Generating the third images may include, in a video capturing mode, adjusting a resolution and/or a frame rate of the plurality of third images according to a set resolution and/or a set frame rate, and generating the third images as a video.

Generating the third images may include, in a burst shot mode, adjusting a resolution and/or an interval of the plurality of third images according to a set image size and a set interval, and generating the third images as a burst shot image.

Generating the third images may include, in an HDR capturing mode, generating a dynamic range-adjusted third image by analyzing a plurality of third images.

According to an embodiment of the present disclosure, an operating method of an electronic device may include acquiring one or more first images through a first pixel set of an image sensor, the image sensor configured to acquire an image through a plurality of pixels including the first pixel set and a second pixel set; acquiring one or more second images through the second pixel set of the image sensor; and generating one or more third images according to at least one mode selected from a plurality of modes for generating the one or more third images, by using at least a part of the one or more first images and at least a part of the one or more second images.

An operating method of an electronic device according to an embodiment of the present disclosure may include acquiring a plurality of sub-frame images by sub-sampling row lines and column lines of the image sensor according to a set readout sequence; and reconstructing high-resolution images by deinterlacing non-sampled sub-frame images with respect to each of the stored plurality of sub-frame images.

Acquiring the sub-frame images may acquire a plurality of multi-field sampled sub-frame images by controlling an exposure and a readout on a row and column basis of the image sensor.

The number of the plurality of sub-frame images may be determined by the number of samplings in the row direction (m) and the number of samplings in the column direction (n), and acquiring the sub-frame images may acquire the sub-frame images by reading out the sub-frame images in the column direction and then moving in the row direction and reading out the sub-frame images in the next column direction.

Acquiring the sub-frame images may include acquiring the plurality of sub-frame images at a first timing, and image-processing and storing the acquired images, and reconstructing the high-resolution images may reconstruct the high-resolution images from the stored plurality of sub-frame images at a second timing.

Acquiring the sub-frame images may further include displaying a set sub-frame image from among the image-processed plurality of sub-frame images as a live view image.

Acquiring the sub-frame images may further include using the set sub-frame image from among the image-processed plurality of sub-frame images to control the image sensor.

Reconstructing the high-resolution images may include estimating motion information between a current sub-frame image and a reference sub-frame image that is obtained based on the same location as the current sub-frame image; deinterlacing pixels of non-sampled other sub-frame images based on the estimated motion information; and reconstructing the high-resolution images by incorporating the sub-frame images and the deinterlaced pixels.

Reconstructing the high-resolution images may further include, in a still image capturing mode, processing a best photo which is determined by analyzing the reconstructed high-resolution images as a still image.

Reconstructing the high-resolution images may further include, in a video capturing mode, adjusting a resolution and/or a frame rate of the reconstructed high-resolution images according to a set resolution and/or frame rate, and processing the images as a video.

An electronic device and an operating method thereof according to an embodiment of the present disclosure may acquire a plurality of row-resolution sub-frame images by controlling a pixel array in a row and column basis, and may reconstruct high-resolution frame images from the acquired sub-frame images. Accordingly, the electronic device may acquire the plurality of sub-frame images by reading out a small area of a specific pattern, instead of reading out the whole area of the image sensor, and may generate high-resolution images according to the frame rate of the sub-frame image by reconstructing high-resolution images (or having a resolution of the image sensor) from the sub-frame images.

An electronic device and an operating method thereof according to an embodiment of the present disclosure may acquire a plurality of sub-frame images at a first time, and may reconstruct high-resolution frame images from the acquired plurality of sub-frame images at a second time. Accordingly, the electronic device may reconstruct the high-resolution frame images after performing the capturing operation based on the sub-frame images that are generated and stored during the capturing operation, and may reconstruct the high-resolution images at each time based on the sub-frame images, and may acquire a high-speed and high-resolution image sequence. In addition, the electronic device may generate images of a category desired by the user (e.g., a best photo, a burst shot, a slow motion, etc.) by adjusting the size and the frame rate of the images by using the acquired high-resolution and high-speed image sequence.

While the present disclosure has been shown and described with reference to certain embodiments thereof, it will be apparent to those skilled in the art that the present disclosure is not limited to these embodiments, and various changes in form and details may be made therein without departing from the spirit and scope of the present disclosure as defined by the appended claims.

What is claimed is:

1. An electronic device, comprising:
   an image sensor configured to acquire an image through a plurality of pixels including a first pixel set and a second pixel set;
   a memory; and
   a processor configured to:
   acquire a first image at a first time through the first pixel set;
   acquire a second image at a second time through the second pixel set;
   acquire a third image at a third time through the first pixel set;
   acquire a fourth image at a fourth time through the second pixel set;
   store the first image, the second image, the third image, and the fourth image in the memory;
   reconstruct the stored third image based on the stored first image;
   reconstruct the stored fourth image based on the stored second image; and
   generate a fifth image corresponding to a camera function by using at least one of the reconstructed third image and the reconstructed fourth image.

2. The electronic device of claim 1, wherein at least one pixel of the first pixel set and at least one pixel of the second pixel set are adjacent to each other.

3. The electronic device of claim 1, wherein at least one of the first pixel set and the second pixel set comprises a sub-pixel set.

4. The electronic device of claim 3, wherein the sub-pixel set comprises at least one RGB pixel of a Bayer pattern.

5. The electronic device of claim 1, wherein the processor is further configured to reconstruct the stored third image based on the stored first image by:
   detecting a first motion between the stored first image and the stored third image,
   estimating first data of first pixels of among the plurality of pixels based on the detected first motion, and
   reconstructing the stored third image by deinterlacing the first pixels with the estimated first data, wherein the first pixels are not sampled when the stored third image is acquired, and
   wherein the processor is configured to reconstruct the stored fourth image based on the stored second image by:
   detecting a second motion between the stored second image and the stored fourth image,
   estimating second data of second pixels among the plurality of pixels based on the detected second motion, and
   reconstructing the stored fourth image by deinterlacing the second pixels with the estimated second data, wherein the second pixels are not sampled when the stored fourth image is acquired.

6. The electronic device of claim 5, wherein, when the camera function is a still image capturing function, the processor is further configured to generate the fifth image by:
   selecting a best photo of the reconstructed third image and the reconstructed fourth image based on an analysis of the reconstructed third image and the reconstructed fourth image, and
   generate the fifth image with the best photo as a still image.

7. The electronic device of claim 5, wherein, when the camera function is a video capturing function, the processor is further configured to generate the fifth image by:
   identifying at least one of a set resolution and a set frame rate, and
   generating the fifth image by using the reconstructed third image and the reconstructed fourth image according to the at least one of the set resolution and the set frame rate as a video.

8. The electronic device of claim 5, wherein, when the camera function is a burst shot function, the processor is further configured to generate the fifth image by:
   identifying at least one of a set image size and a set interval, and
   generating the fifth image by using the reconstructed third image and the reconstructed fourth image according to the at least one of the set image size and the set interval as a burst shot image.

9. The electronic device of claim 5, wherein, when the camera function is a high dynamic range (HDR) capturing function, the processor is further configured to generate the fifth image by:

analyzing a first image grayscale of the reconstructed third image and a second image grayscale of the reconstructed fourth image, correcting the first image grayscale and the second image grayscale, and generating the fifth image by using the reconstructed third image having the corrected first image grayscale and the reconstructed fourth image having the corrected second image grayscale.

10. An electronic device, comprising:
an image sensor configured to acquire an image through a plurality of pixels including a first pixel set and a second pixel set;
a memory; and
a processor configured to:
acquire a plurality of first images through the first pixel set;
acquire a plurality of second images through the second pixel set;
store the plurality of first images and the plurality of second images;
reconstruct at least one first image among the plurality of stored first images based on a first reference image among the plurality of stored first images, the first reference image being acquired in advance of the at least one first image;
reconstruct at least one second image among the plurality of stored second images based on a second reference image among the plurality of stored second images, the second reference image being acquired in advance of the at least one second image; and
generate at least one third image according to a camera function, by using at least one of the at least one reconstructed first image and the at least one reconstructed second image.

11. An image processing method of an electronic device, the image processing method comprising:
acquiring a first image at a first time through a first pixel set among a plurality of pixels of an image sensor of the electronic device;
acquiring a second image at a second time through a second pixel set among the plurality of pixels of the image sensor;
acquiring a third image at a third time through the first pixel set;
acquiring a fourth image at a fourth time through the second pixel set;
storing the first image, the second image, the third image, and the fourth image in a memory of the electronic device;
reconstructing the stored third image based on the stored first image;
reconstructing the stored fourth image based on the stored second image; and
generating a fifth image corresponding to a camera function by using at least one of the reconstructed third image and the reconstructed fourth image.

12. The image processing method of claim 11, wherein at least one pixel of the first pixel set and at least one pixel of the second pixel set are adjacent to each other.

13. The image processing method of claim 11, wherein at least one of the first pixel set and the second pixel set comprises a sub-pixel set.

14. The image processing method of claim 13, wherein the sub-pixel set comprises at least one RGB pixel of a Bayer pattern.

15. The image processing method of claim 11, wherein reconstructing the stored third image comprises:
detecting a first motion between the stored first image and the stored third image;
estimating first data of first pixels among the plurality of pixels based on the detected first motion; and
reconstructing the stored third image by deinterlacing the first pixels with the estimated first data, wherein the first pixels are not sampled when the stored third image is acquired, and
wherein reconstructing the stored fourth image comprises:
detecting a second motion between the stored second image and the stored fourth image;
estimating second data of second pixels among the plurality of pixels based on the detected second motion; and
reconstructing the stored fourth image by deinterlacing the second pixels with the estimated second data, wherein the second pixels are not sampled when the stored fourth image is acquired.

16. The image processing method of claim 15, wherein, when the camera function is a still image capturing function, generating the fifth image comprises:
selecting a best photo of the reconstructed third image and the reconstructed fourth image based on an analysis of the reconstructed third image and the reconstructed fourth image; and
generating the fifth image with the best photo as a still image.

17. The image processing method of claim 15, wherein, when the camera function is a video capturing function, generating the fifth image comprises:
identifying at least one of a set resolution and a set frame rate; and
generating the fifth image by using the reconstructed third image and the reconstructed fourth image according to the at least one of the set resolution and the set frame rate as a video.

18. The image processing method of claim 15, wherein, when the camera function is a burst shot function, generating the fifth image comprises:
identifying at least one of a set image size and a set interval; and
generating the fifth image by using the reconstructed third image and the reconstructed fourth image according to the at least one of the set image size and the set interval as a burst shot image.

19. The image processing method of claim 15, wherein, when the camera function is a high dynamic range (HDR) capturing function, generating the fifth image comprises:
analyzing a first image grayscale of the reconstructed third image and a second image grayscale of the reconstructed fourth image;
correcting the first image grayscale and the second image grayscale; and
generating the fifth image by using the reconstructed third image having the corrected first image grayscale and the reconstructed fourth image having the corrected second image grayscale.

* * * * *